(12) United States Patent
Zheng et al.

(10) Patent No.: US 10,640,873 B2
(45) Date of Patent: May 5, 2020

(54) OPTICAL PRINTING SYSTEMS AND METHODS

(71) Applicant: BOARD OF REGENTS, THE UNIVERSITY OF TEXAS SYSTEM, Austin, TX (US)

(72) Inventors: Yuebing Zheng, Austin, TX (US); Bharath Bangalore Rajeeva, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 26 days.

(21) Appl. No.: 16/227,292

(22) Filed: Dec. 20, 2018

(65) Prior Publication Data
US 2019/0264327 A1    Aug. 29, 2019

Related U.S. Application Data

(60) Provisional application No. 62/635,768, filed on Feb. 27, 2018.

(51) Int. Cl.
*G01J 3/44* (2006.01)
*C23C 18/16* (2006.01)
(Continued)

(52) U.S. Cl.
CPC ...... *C23C 18/1612* (2013.01); *C23C 18/1667* (2013.01); *C23C 18/182* (2013.01);
(Continued)

(58) Field of Classification Search
CPC ............ C23C 18/1612; C23C 18/1817; C23C 18/1868; C23C 18/1865; C23C 18/182;
(Continued)

(56) References Cited

U.S. PATENT DOCUMENTS

| 4,425,261 A | 1/1984 | Stenius et al. |
| 6,016,226 A | 1/2000 | Arisawa et al. |

(Continued)

FOREIGN PATENT DOCUMENTS

| WO | 2017184741 | 10/2017 |
| WO | 2018049109 | 3/2018 |

OTHER PUBLICATIONS

Aizpurua J et al., "Optical Properties of Gold Nanorings", Phys. Rev. Lett. 2003, 90, 057401.
(Continued)

*Primary Examiner* — Abdullahi Nur
(74) *Attorney, Agent, or Firm* — Meunier Carlin & Curfman LLC

(57) ABSTRACT

Disclosed herein are methods comprising: illuminating a first location of an optothermal substrate with electromagnetic radiation; wherein the optothermal substrate converts at least a portion of the electromagnetic radiation into thermal energy; and wherein the optothermal substrate is in thermal contact with a liquid sample comprising a plurality of thermally reducible metal ions; thereby: generating a confinement region at a location in the liquid sample proximate to the first location of the optothermal substrate; trapping at least a portion of the plurality of thermally reducible metal ions within the confinement region; and thermally reducing the trapped portion of the plurality of thermally reducible metal ions; thereby: depositing a metal particle on the optothermal substrate at the first location. Also disclosed herein are systems for performing the methods described herein. Also disclosed herein are patterned substrates made by the methods described herein, and methods of use thereof.

27 Claims, 39 Drawing Sheets

(51) Int. Cl.
G01N 21/65 (2006.01)
C23C 18/18 (2006.01)
(52) U.S. Cl.
CPC ...... *C23C 18/1817* (2013.01); *C23C 18/1865* (2013.01); *C23C 18/1868* (2013.01); *G01N 21/658* (2013.01); *G01N 2021/651* (2013.01)
(58) Field of Classification Search
CPC ..... C23C 18/1667; C23C 18/08; C23C 18/14; G01N 21/658; G01N 2021/651; G01N 21/65; G01N 21/64; G01J 3/44
See application file for complete search history.

(56) References Cited

U.S. PATENT DOCUMENTS

| 8,431,903 | B2 | 4/2013 | Duhr et al. | |
|---|---|---|---|---|
| 2004/0079195 | A1* | 4/2004 | Perry | B22F 1/0018 75/345 |
| 2005/0281944 | A1 | 12/2005 | Jang et al. | |
| 2008/0245430 | A1 | 10/2008 | Adleman et al. | |
| 2009/0034053 | A1 | 2/2009 | King et al. | |
| 2010/0142038 | A1 | 6/2010 | Sugiura et al. | |
| 2011/0084218 | A1 | 4/2011 | Duhr et al. | |
| 2015/0111199 | A1 | 4/2015 | Hart et al. | |
| 2015/0204810 | A1 | 7/2015 | Pan et al. | |
| 2015/0316480 | A1 | 11/2015 | Baaske et al. | |
| 2015/0380120 | A1 | 12/2015 | Nnanna et al. | |
| 2018/0236486 | A1 | 8/2018 | Zheng et al. | |
| 2018/0348128 | A1 | 12/2018 | Zheng et al. | |

OTHER PUBLICATIONS

Aksu S et al. "Plasmonically Enhanced Vibrational Biospectroscopy Using Low-Cost Infrared Antenna Arrays by Nanostencil Lithography", Adv. Opt. Mater. 2013, 1, 798-803.
Arias-González, et al., "Optical forces on small particles: Attractive and repulsive nature and plasmon-resonance conditions", J. Opt. Soc. Am. A 20, 1201-1209 (2003).
Babayan Y et al., "Confining Standing Waves in Optical Corrals", ACS Nano. 2009, 3, 615.
Baffou, et al., "Nanoscale Control of Optical Heating in Complex Plasmonic Systems.", ACS Nano 2010, 4(2), 709-716.
Baffou, et al., "Photoinduced Heating of Nanoparticle Arrays.", ACS Nano 2013, 7(8), 6478-6488.
Baffou, et al., "Super-Heating and Micro-Bubble Generation around Plasmonic Nanoparticles under cw Illumination", J Phys Chem C 2014, 118(9), 4890-4898.
Baffou, et al., "Thermo-plasmonics: Using metallic nanostructures as nano-sources of heat", Laser Photonics Rev. 7, 171-187 (2013).
Bagheri S et al., "Fabrication of Square-Centimeter Plasmonic Nanoantenna Arrays by Femtosecond Direct Laser Writing Lithography: Effects of Collective Excitations on SEIRA Enhancement", ACS Photonics. 2015, 2, 779-786.
Banaee MG et al., "Gold nanorings as substrates for surface-enhanced Raman scattering", Opt. Lett. 2010, 35, 760-762.
Bao Y et al., "Self-Organizing Arrays of Size Scalable Nanoparticle Rings", ACS Nano. 2016, 10, 8947-8955.
Bao, et al., "Optical Printing of Electrodynamically Coupled Metallic Nanoparticle Arrays", J. Phys. Chem. C 2014, 118, 19315-19321.
Bao, et al., "Patterning Fluorescent Quantum Dot Nanocomposites by Reactive Inkjet Printing", Small 2015, 11(14), 1649-1654.
Baral, et al., "Comparison of Vapor Formation of Water at the Solid/Water Interface to Colloidal Solutions Using Optically Excited Gold Nanostructures", ACS Nano 2014, 8, 1439-1448.
Barnes, et al., "Surface plasmon subwavelength optics", Nature 2003, 424(6950): 824-830.
Bendix, et al., "Optical trapping of nanoparticles and quantum dots", IEEE J. Sel. Top. Quantum Electron. 20, 1 4800112 (2014).

Berthelot, et al., "Three-dimensional manipulation with scanning near-field optical nanotweezers", Nat Nano 2014, 9(4): 295-299.
Blattmann, et al., "Plasmonic coupling dynamics of silver nanoparticles in an optical trap", Nano Lett. 15, 7816-7821 (2015).
Bockris, et al., "On the Structure of Charged Interfaces", Proc. R. Soc. London, A 1963, 274(1356): 55-79.
Boltasseva, et al., "Low-loss plasmonic metamaterials", Science 331, 290-291 (2011).
Bosanac, et al., "Efficient optical trapping and visualization of silver nanoparticles", Nano Lett. 8, 1486-1491 (2008).
Braun, et al., "Optically Controlled Thermophoretic Trapping of Single Nano-Objects", ACS Nano 2013, 7(12): 11200-11208.
Braun, et al., "Single molecules trapped by dynamic inhomogeneous temperature fields", Nano Lett. 15, 5499-5505 (2015).
Braun, et al., "Trapping of DNA by Thermophoretic Depletion and Convection", Phys. Rev. Lett. 2002, 89(18): 188103.
Braun, et al., "Trapping of Single Nano-Objects in Dynamic Temperature Fields", Phys. Chem. Chem. Phys. 2014, 16, 15207-15213.
Bregulla, et al., "Thermo-osmotic flow in thin films", Phys. Rev. Lett. 116, 188303 (2016).
Cetin AE et al., "Fano Resonant Ring/Disk Plasmonic Nanocavities on Conducting Substrates for Advanced Biosensing", ACS Nano. 2012, 6, 9989-9995.
Chen J et al., Evaporation-Induced Assembly of Quantum Dots into Nanorings, ACS Nano. 2008, 3, 173-180.
Chen, et al., "How to Light Special Hot Spots in Multiparticle-Film Configurations", ACS Nano 2015, 10, 581-587.
Chickaraddy, et al., "Single-Molecule Strong Coupling at Room Temperature in Plasmonic Nanocavities", Nature 2016, 535, 127-130.
Chiou, et al., "Massively parallel manipulation of single cells and microparticles using optical images", Nature 2005, 436(7049): 370-372.
Curto, et al., "Unidirectional Emission of a Quantum Dot Coupled to a Nanoantenna", Science 2010, 329(5994), 930-933.
Duhr, et al., "Why molecules move along a temperature gradient", Proc. Natl. Acad. Sci. 103, 19678-19682 (2006).
Edwards, et al., "Depletion-Mediated Potentials and Phase Behavior for Micelles, Macromolecules, Nanoparticles, and Hydrogel Particles", Langmuir 2012, 28(39): 13816-13823.
Enders M et al., "Plasmonic Nanofabrication through Optical Heating", J. Phys. Chem. C. 2016, 120, 6723-6732.
Fan, et al., "Self-assembled plasmonic nanoparticle cluster", Science 328, 1135-1138 (2010).
Fang, et al., "Evolution of Light-Induced Vapor Generation at a Liquid-Immersed Metallic Nanoparticle", Nano Lett 2013, 13(4), 1736-1742.
Fazio, et al., "SERS Detection of Biomolecules at Physiological Ph Via Aggregation of Gold Nanorods Mediated by Optical Forces and Plasmonic Heating", Sci. Rep. 2016, 6, 26952.
Friedrich, et al., "Surface Imaging Beyond the Diffraction Limit with Optically Trapped Spheres", Nat. Nanotechnol. 2015, 10, 1064-1069.
Fujii et al. "Simultaneous Formation and Spatial Patterning of ZnO on ITO Surfaces by Local Laser-Induced Generation of Microbubbles in Aqueous Solutions of [Zn(NH3)4]2+," ACS Appl. Mater. Interfaces, 2017, 9(9), 8413-8419.
Fujii, et al., "Fabrication and Placement of a Ring Structure of Nanoparticles by a Laser-Induced Micronanobubble on a Gold Surface", Langmuir, 2011, 27(14), 8605-8610.
Galatsis, et al., "Patterning and Templating for Nanoelectronics", Adv Mater 2010, 22(6), 769-778.
Garces-Chavez, et al., "Simultaneous Micromanipulation in Multiple Planes Using a Self-Reconstructing Light Beam", Nature 2002, 419, 145-147.
Garcia-Leis, et al., "Silver Nanostars with High SERS Performance", J. Phys. Chem. C 2013, 117, 7791-7795.
Gargiulo, et al., "Connecting Metallic Nanoparticles by Optical Printing", Nano Lett. 2016, 16, 1224-1229.
Geissler, et al., "Patterning: Principles and Some New Developments", Adv. Mater. 2004, 16, 1249-1269.
Gluckstad, J, "Microfluidics: Sorting Particles with Light", Nat. Mater. 2004, 3, 9-10.

(56) References Cited

OTHER PUBLICATIONS

Govorov, et al., "Generating heat with metal nanoparticles", Nano Today 2, 30-38 (2007).
Grier, DG, "A Revolution in Optical Manipulation", Nature 2003, 424, 810-816.
Grigorenko, et al., "Nanometric Optical Tweezers Based on Nanostructured Substrates", Nat. Photonics 2008, 2, 365-370.
Gu, et al., "Tweezing and Manipulating Micro- and Nanoparticles by Optical Nonlinear Endoscopy", Light Sci Appl 2014, 3, e126.
Guck, et al., "The Optical Stretcher: A Novel Laser Tool to Micromanipulate Cells", Biophys. J. 2001, 81, 767-784.
Guffey, et al., "All-Optical Patterning of Au Nanoparticles on Surfaces Using Optical Traps", Nano Lett. 2010, 10, 4302-4308.
Halas, et al., "Plasmons in Strongly Coupled Metallic Nanostructures", Chem. Rev. 2011, 111, 3913-3961.
Halpern AR et al., "Lithographically patterned electrodeposition of gold, silver, and nickel nanoring arrays with widely tunable near-infrared plasmonic resonances", ACS Nano. 2013, 7, 1755-1762.
Hansen, et al., "Expanding the optical trapping range of gold nanoparticles", Nano Lett. 5, 1937-1942 (2005).
Hansen, et al., "Nano-Optical Conveyor Belt, Part I: Theory", Nano Lett. 2014, 14(6): 2965-2970.
Hao F et al., "Symmetry Breaking in Plasmonic Nanocavities: Subradiant LSPR Sensing and a Tunable Fano Resonance", Nano Lett. 2008, 8, 3983-3988.
Hashmi, et al., "Oscillating bubbles: a versatile tool for lab on a chip applications", Lab Chip 2012, 12, 4216-4227.
Helden, et al., "Direct measurement of thermophoretic forces", Soft Matter 11, 2379-2386 (2015).
Hernandez-Santana, et al., "Nanolithography: Written with Light", Nature Nanotechnol. 2010, 5, 629-630.
Hoang, et al., "Ultrafast Room-Temperature Single Photon Emission from Quantum Dots Coupled to Plasmonic Nanocavities", Nano Lett 2016, 16(1), 270-275.
Hoang, et al., "Ultrafast Spontaneous Emission Source Using Plasmonic Nanoantennas", Nat. Commun. 2015, 6, 7788.
Hu, et al., "Hydrogel microrobots actuated by optically generated vapour bubbles", Lab Chip 2012, 12, 3821-3826.
Huang CJ et al., "Gold nanoring as a sensitive plasmonic biosensor for on-chip DNA detection", Appl. Phys. Lett. 2012, 100, 173114.
Huang, "Optoelectronic tweezers integrated with lensfree holographic microscopy for wide-field interactive cell and particle manipulation on a chip", Lab Chip 2013, 13, 2278-2284.
Huang, et al., "Microfluidic integrated optoelectronic tweezers for single-cell preparation and analysis", Lab Chip 2013, 13, 3721-3727.
Huang, et al., "Reversal of the optical force in a plasmonic trap", Opt. Lett. 33, 3001-3003 (2008).
Huo, et al., "Beam pen lithography", Nanotechnol. 2010, 5, 637-640.
Huo, et al., "Polymer pen lithography", Science 2008, 321, 1658-1660.
Ilic, et al., "Exploiting Optical Asymmetry for Controlled Guiding of Particles with Light", ACS Photonics 2016, 3, 197-202.
Iracki, et al., "Charged Micelle Depletion Attraction and Interfacial Colloidal Phase Behavior", Langmuir 2010, 26(24): 18710-18717.
Ito, et al., "Pushing the limits of lithography", Nature 2000, 406, 1027-1031.
Jamshidi, et al., "NanoPen: Dynamic, Low-Power, and Light-Actuated Patterning of Nanoparticles", Nano Lett. 2009, 9, 2921-2925.
Jensen L et al., "Resonance Raman Scattering of Rhodamine 6G as Calculated Using Time-Dependent Density Functional Theory", J. Phys. Chem. A. 2006, 110, 5973-5977.
Jensen, et al., "Optical trapping and two-photon excitation of colloidal quantum dots using bowtie apertures", ACS Photonics, 2016, 3(3), 423-427.
Juan, et al., "Plasmon nano-optical tweezers", Nat. Photonics 2011, 5(6): 349-356.
Juan, et al., "Self-induced back-action optical trapping of dielectric nanoparticles", Nat. Phys. 5, 915-919 (2009).
Kang, et al., "Low-power nano-optical vortex trappling via plasmonic diabolo nanaantennas", Nature Comm., 2011, 2, 1-6.
Kang, Zhiwen, Jiajie Chen, and Ho-Pui Ho. "Surface-enhanced Raman scattering via entrapment of colloidal plasmonic nanocrystals by laser generated microbubbles on random gold nano-islands." Nanoscale 8.19 (2016): 10266-10272.
Kim, et al., "Full-colour quantum dot displays fabricated by transfer printing", Nat Photon 2011, 5(3), 176-182.
Kim, et al., "High-Resolution Patterns of Quantum Dots Formed by Electrohydrodynamic Jet Printing for Light-Emitting Diodes", Nano Lett 2015, 15(2), 969-973.
Kim, et al., "Multilayer Transfer Printing for Pixelated, Multicolor Quantum Dot Light-Emitting Diodes", ACS Nano 2016, 10(5), 4920-4925.
Klajn, et al., "Light-Controlled Self-Assembly of Reversible and Irreversible Nanoparticle Suprastructures", Proc. Natl. Acad. Sci. 2007, 104, 10305-10309.
Kraft, et al., "Surface roughness directed self-assembly of patchy particles into colloidal micelles", Proc. Natl. Acad. Sci. 109, 10787-10792 (2012).
Kramer, et al., "Plasmonic properties of silicon nanocrystals doped with boron and phosphorus", Nano Lett. 15, 5597-5603 (2015).
Kreysing, et al., "The Optical Cell Rotator", Opt. Express 2008, 16, 16984-16992.
Kundu, et al., "Light-Controlled Self-Assembly of Non-Photoresponsive Nanoparticles", Nat. Chem 2015, 7, 646-652.
Kyrsting, et al., "Heat Profiling of Three-Dimensionally Optically Trapped Gold Nanoparticles Using Vesicle Cargo Release", Nano Lett. 2011, 11, 888-892.
Lan, et al., "Ordering, positioning and uniformity of quantum dot arrays", Nano Today 2012, 7(2), 94-123.
Larsson EM et al., "Sensing Characteristics of NIR Localized Surface Plasmon Resonances in Gold Nanorings for Application as Ultrasensitive Biosensors", Nano Lett. 2007, 7, 1256-1263.
Lehmuskero, et al., "Laser trapping of colloidal metal nanoparticles", ACS Nano 9, 3453-3469 (2015).
Lewicka ZA et al., "Nanorings and nanocrescents formed via shaped nanosphere lithography: a route toward large areas of infrared metamaterials", Nanotechnology. 2013, 24, 115303.
Li, et al., "Absorption spectroscopy of single optically trapped gold nanorods", Nano Lett. 15, 7731-7735 (2015).
Lin et al. "Optimizing plasmonic nanoantennas via coordinated multiple coupling," Scientific Reports, 2015, 14788.
Lin, et al., "Bubble-Pen Lithography", Nano Lett 2016, 16(1), 701-708.
Lin, et al., "Light-directed reversible assembly of plasmonic nanoparticles using plasmon-enhanced thermophoresis", ACS Nano 10, 9659-9668 (2016).
Liu, et al., "Formation and dissolution of microbubbles on highly-ordered plasmonic nanopillar arrays", Scientific Reports, 2015, 5, 18515.
Liu, et al., "Thermoresponsive Assembly of Charged Gold Nanoparticles and Their Reversible Tuning of Plasmon Coupling", Chem. Int. Ed. 2012, 51, 6373-6377.
Lohse, "Surface nanobubbles and nanodroplets", Rev Mod Phys 2015, 87(3), 981-1035.
McHale, et al., "Bubble nucleation characteristics in pool boiling of a wetting liquid on smooth and rough surfaces", Int J Multiphas Flow 2010, 36(4), 249-260.
Meinzer N et al., "Plasmonic meta-atoms and metasurfaces", Nat. Photon. 2014, 8, 889.
Min, et al., "Focused plasmonic trapping of metallic particles", Nat Commun 2013, 4, 2891.
Ndukaife, et al., "Long-range and rapid transport of individual nano-objects by a hybrid electrothermoplasmonic nanotweezer", Nat Nano 2016, 11(1): 53-59.
Nedev, et al., "Optical Force Stamping Lithography", Nano Lett. 2011, 11, 5066-5070.
Neubrech F et al., "Surface-Enhanced Infrared Spectroscopy Using Resonant Nanoantennas", Chem. Rev. 2017, 117, 5110-5145.

(56) References Cited

OTHER PUBLICATIONS

Neumann, et al., "Solar Vapor Generation Enabled by Nanoparticles", ACS Nano 2013, 7(1), 42-49.
Nordlander P., "The ring: a leitmotif in plasmonics", ACS Nano. 2009, 3, 488-492.
Ohlinger, et al., "Optothermal escape of plasmonically coupled silver nanoparticles from a three-dimensional optical trap", Nano Lett. 11, 1770-1774 (2011).
Ozel, et al., "Coaxial Lithography", Nat. Nanotechnol. 2015, 10, 319-324.
Patra, et al., "Plasmofluidic Single-Molecule Surface-Enhanced Raman Scattering from Dynamic Assembly of Plasmonic Nanoparticles", Nat. Commun. 2014, 5, 4357.
Pauzauskie, et al., "Optical trapping and integration of semiconductor nanowire assemblies in water", Nat. Mater. 2006, 5(2): 97-101.
Pelton, et al., "Optical trapping and alignment of single gold nanorods by using plasmon resonances", Opt. Lett. 31, 2075-2077 (2006).
Piner, et al., "Dip-Pen Nanolithography", Science 1999, 283, 661-663.
Prikulis, et al., "Optical spectroscopy of single trapped metal nanoparticles in solution", Nano Lett. 4, 115-118 (2004).
Putnam, et al., "Temperature Dependence of Thermodiffusion in Aqueous Suspensions of Charged Nanoparticles", Langmuir 2007, 23, 9221-9228.
Rajeeva BB et al., "High-Resolution Bubble Printing of Quantum Dots", ACS Appl. Mater. Inter. 2017, 9, 16725-16733.
Rajeeva BB et al., "Patterning and fluorescence tuning of quantum dots with haptic-interfaced bubble printing", J. Mater. Chem. C. 2017, 5, 5693-5699.
Rajeeva BB et al., "Molecular Plasmonics: From Molecular-Scale Measurements and Control to Applications", Nanotechnology: Delivering on the Promise, vol. 2. 2016, 1224, 23-52.
Reichl, et al., "Why charged molecules move across a temperature gradient: The role of electric fields", Phys. Rev. Lett. 112, 198101 (2014).
Righini, et al., "Parallel and selective trapping in a patterned plasmonic landscape", Nat Phys 2007, 3(7): 477-480.
Roxworthy, et al., "Application of Plasmonic Bowtie Nanoantenna Arrays for Optical Trapping, Stacking, and Sorting", Nano Lett. 2012, 12, 796-801.
Roy, et al., "Self-Assembly of Mesoscopic Materials to Form Controlled and Continuous Patterns by Thermo-Optically Manipulated Laser Induced Microbubbles", Langmuir, 2013m 29(47), 14733-14742.
Ruijgrok, et al., "Brownian fluctuations and heating of an optically aligned gold nanorod", Phys. Rev. Lett. 107, 037401 (2011).
Rycenga, et al., "Controlling the synthesis and assembly of silver nanostructures for plasmonic applications", Chem. Rev. 2011, 111, 3669-3712.
Salaita, et al., "Nat. Applications of dip-pen nanolithography", Nanotechnol. 2007, 2, 145-155.
Sear RP., "Nucleation: theory and applications to protein solutions and colloidal suspensions", J. Phys. Condens. Matter. 2007, 19, 033101.
Selhuber-Unkel, et al., "Quantitative optical trapping of single gold nanorods", Nano Lett. 8, 2998-3003 (2008).
Sounas DL et al., "Angular-Momentum-Biased Nanorings to Realize Magnetic-Free Integrated Optical Isolation", ACS Photonics. 2014, 1, 198.
Srivastava, et al., "Light-controlled self-assembly of semiconductor nanoparticles into twisted ribbons", Science 327, 1355-1359 (2010).
Stetciura, et al., "Composite SERS-Based Satellites Navigated by Optical Tweezers for Single Cell Analysis", Analyst 2015, 140, 4981-4986.
Svedberg, et al., "Creating Hot Nanoparticle Pairs for Surface-Enhanced Raman Spectroscopy through Optical Manipulation", Nano Lett. 2006, 6, 2639-2641.
Tanaka, et al., "Nanostructured potential of optical trapping using a plasmonic nanoblock pair", Nano Lett. 13, 2146-2150 (2013).
Taylor AB et al., "Electron-beam lithography of plasmonic nanorod arrays for multilayered optical storage", Opt. Express. 2014, 22, 13234-13243.
Tokel O et al., "Advances in Plasmonic Technologies for Point of Care Applications", Chem. Rev. 2014, 114, 5728.
Tong, et al., "Alignment, rotation, and spinning of single plasmonic nanoparticles and nanowires using polarization dependent optical forces", Nano Lett. 10, 268-273 (2010).
Tong, et al., "Plasmon hybridization reveals the interaction between individual colloidal gold nanoparticles confined in an optical potential well", Nano Lett. 11, 4505-4508 (2011).
Vigolo, et al., "Thermophoresis and thermoelectricity in surfactant solutions", Langmuir 26, 7792-7801 (2010).
Walker SB et al., Reactive silver inks for patterning high-conductivity features at mild temperatures, J. Am. Chem. Soc. 2012, 134, 1419-1421.
Wang, et al., "A general strategy for nanocrystal synthesis", Nature 2005, 437, 121-124.
Wang, et al., "Plasmonic trapping with a gold nanopillar", ChemPhysChem 2012, 13, 2639-2648.
Wang, et al., "Photo-oxidation-enhanced coupling in densely packed CdSe quantum-dot films", Appl Phys Lett, 2003, 83, 162-164.
Weinert, et al., "Observation of Slip Flow in Thermophoresis", Phys. Rev. Lett. 2008, 101, 168301.
Willets, et al., "Localized surface plasmon resonance spectroscopy and sensing", Annual Review of Physical Chemistry, vol. 58, 2007, pp. 267-297.
Wilson, et al., "Scalable nano-particle assembly by efficient light-induced concentration and fusion", Opt. Express 2008, 16(22), 17276-17281.
Winkler R et al., "Direct-Write 3D Nanoprinting of Plasmonic Structures", ACS Appl. Mater. Inter. 2016, 9, 8233-8240.
Wolf O et al., "Phased-array sources based on nonlinear metamaterial nanocavities", Nat. Commun. 2015, 6, 7667.
Wu, MC, "Optoelectronic tweezers", Nat. Photonics 2011, 5(6): 322-324.
Xia, et al., "One-dimensional nanostructures: synthesis, characterization, and applications", Adv. Mater. 2003, 15, 353-389.
Xie Y et al., "In Situ Fabrication of 3D Ag@ZnO Nanostructures for Microfluidic Surface-Enhanced Raman Scattering Systems", ACS Nano. 2014, 8, 12175-12184.
Xie YL et al., "Optoacoustic tweezers: a programmable, localized cell concentrator based on opto-thermally generated, acoustically activated, surface bubbles", Lab Chip. 2013, 13, 1772-1779.
Xie, et al., "Nanoscale and Single-Dot Patterning of Colloidal Quantum Dots", Nano Lett 2015, 15(11), 7481-7487.
Xu BB et al., "On-chip fabrication of silver microflower arrays as a catalytic microreactor for allowing in situ SERS monitoring", Chem. Commun. 2012, 48, 1680-1682.
Yan, et al., "Controlling the position and orientation of single silver nanowires on a surface using structured optical fields", ACS Nano 6, 8144-8155 (2012).
Yan, et al., "Fabrication of a Material Assembly of Silver Nanoparticles Using the Phase Gradients of Optical Tweezers", Phys. Rev. Lett. 114, 143901 (2015).
Yan, et al., "Reconfiguring active particles by electrostatic imbalance", Nature Mater. 15, 1095-1099 (2016).
Yan, et al., "Why single-beam optical tweezers trap gold nanowires in three dimensions", ACS Nano 7, 8794-8800 (2013).
Yang, et al., "Breakthroughs in Photonics 2014: Advances in Plasmonic Nanolasers", IEEE Photonics J 2015, 7(3).
Ye J et al., "Observation of plasmonic dipolar anti-bonding mode in silver nanoring structures", Nanotechnology. 2009, 20, 465203.
Yoshikawa, et al., "Reversible Assembly of Gold Nanoparticles Confined in an Optical Microcage", Phys. Rev. E 2004, 70, 061406.
Yu, et al., "Formation of high-quality CdS and other II-VI semiconductor nanocrystals in noncoordinating solvents: Tunable reactivity of monomers", Angew Chem Int Edit 2002, 41(13), 2368-2371.
Zhang, et al., "Trapping and sensing 10 nm metal nanoparticles using plasmonic dipole antennas", Nano Lett. 10, 1006-1011 (2010).

(56) References Cited

OTHER PUBLICATIONS

Zhao J et al., "Hole-mask colloidal nanolithography combined with tilted-angle-rotation evaporation: A versatile method for fabrication of low-cost and large-area complex plasmonic nanostructures and metamaterials", J. Nanotechnol. 2014, 5, 577-586.

Zhao, et al., "Theory and experiment on particle trapping and manipulation via optothermally generated bubbles", Lab Chip 2014, 14, 384-391.

Zheng Y et al., "Fabrication of large area ordered metal nanoring arrays for nanoscale optical sensor", J. Non-Cryst. Solids. 2006, 352 (23-25), 2532-2535.

Zheng, et al., "Nano-Optical Conveyor Belt, Part II: Demonstration of Handoff Between Near-Field Optical Traps.", Nano Lett. 14, 2971-2976 (2014).

\* cited by examiner

OPTICAL PRINTING SYSTEMS AND METHODS

CROSS-REFERENCE TO RELATED APPLICATIONS

This application claims the benefit of priority to U.S. Provisional Application No. 62/635,768, filed Feb. 27, 2018, which is hereby incorporated herein by reference in its entirety.

STATEMENT OF GOVERNMENT SUPPORT

This invention was made with government support under Grant No. W911NF-17-1-0561 awarded by the Army Research Office and Grant No. 80NSSC17K0520 awarded by the National Aeronautics and Space Administration. The government has certain rights in the invention.

BACKGROUND

The realization of optically active structures with direct-write printing has been challenging, particularly in spatially constrained microfluidic devices for point-of-care (POC) sensing and diagnostics. The existing techniques are limited by resolution, accessibility, and multi-step fabrication constraints. There remains a need for new light-based techniques that can create the arbitrary patterns of particles immobilized on the substrates. The systems and methods discussed herein address these and other needs.

SUMMARY

Disclosed herein are methods comprising illuminating a first location of an optothermal substrate with electromagnetic radiation. The electromagnetic radiation can, for example, have a power density of from 0.2 mW/$\mu$m$^2$ to 1.2 mW/$\mu$m$^2$ (e.g., from 0.4 mW/$\mu$m$^2$ to 1.2 mW/$\mu$m$^2$). The electromagnetic radiation can, for example, be provided by a light source. The light source can be any type of light source. In some examples, the light source can be an artificial light source. In some examples, the light source is a laser, such as a continuous wave laser.

In some examples, the light source is configured to illuminate a mirror, the mirror being configured to reflect the electromagnetic radiation from the light source to illuminate the first location of the optothermal substrate. In some examples, the mirror can comprise a plurality of mirrors, such as an array of micromirrors (e.g., a digital micromirror device).

As used herein, an optothermal substrate is any substrate that can convert at least a portion of the electromagnetic radiation into thermal energy. The optothermal substrate can, for example, comprise a plasmonic substrate, a metal film, a metal oxide film, or a combination thereof.

In some examples, the optothermal substrate comprises a plasmonic substrate and the electromagnetic radiation comprises a wavelength that overlaps with at least a portion of the plasmon resonance energy of the substrate. The plasmonic substrate can, in some examples, comprise a plurality of plasmonic particles. In some examples, the plurality of plasmonic particles can comprise a plurality of metal particles. The plurality of metal particles can, for example, comprise a metal selected from the group consisting of Au, Ag, Pd, Cu, Cr, Al, and combinations thereof. In some examples, the plurality of plasmonic particles can comprise a plurality of gold particles. The plurality of plasmonic particles can, for example, have an average particle size of from 10 nm to 300 nm (e.g., from 20 nm to 40 nm). In some examples, the plurality of plasmonic particles are substantially spherical. In some examples, each plasmonic particle within the plurality of plasmonic particles on the substrate is separated from its neighboring plasmonic particles by an average distance of from 5 nm to 100 nm (e.g., from 5 nm to 20 nm). The density of the plurality of plasmonic particles on the plasmonic substrate can, for example, be from $10^{10}$ particles/cm$^2$ to $10^{11}$ particles/cm$^2$.

The methods can further comprise, for example, making the plasmonic substrate by depositing the plurality of plasmonic particles on a substrate. Depositing the plurality of plasmonic particles can comprise, for example, printing, lithographic deposition, electron beam deposition, thermal deposition, spin coating, drop-casting, zone casting, dip coating, blade coating, spraying, vacuum filtration, or combinations thereof.

The methods can further comprise, for example, making the plasmonic substrate by thermally annealing a film of a plasmonic metal deposited on a substrate, thereby forming the plurality of plasmonic particles on the substrate. In some examples, the methods can further comprise depositing the film of the plasmonic metal on the substrate. In some examples, the film of the plasmonic metal can have a thickness of from 2 nm to 15 nm (e.g., from 2 nm to 6 nm). Thermally annealing the film can, for example, comprise heating the film at a temperature from 300° C. to 600° C. (e.g., 550° C.). In some examples, the film can be thermally annealed for from 1 hour to 12 hours (e.g., 2 hours).

In some examples, the optothermal substrate can comprise a metal film, such as a metal film deposited on a substrate. The metal film can, for example, comprise a metal selected from the group consisting of Al, Ti, Cr, Mn, Fe, Co, Ni, Cu, Mo, Pd, Ag, Cd, Pt, Au, and combinations thereof. In some examples, the methods can further comprise making the optothermal substrate by depositing the metal film on a substrate. The metal film can, for example, have a thickness of from 2 nm to 200 nm.

In some examples, the optothermal substrate can comprise a metal oxide film, such as a metal oxide film deposited on a substrate. The metal oxide film can, for example, comprise an oxide of a metal wherein the metal is selected from the group consisting of Al, Ti, Cr, Mn, Fe, Co, Ni, Cu, Mo, Pd, Ag, Cd, Pt, Au, In, Sn, Zn, and combinations thereof. In some examples, the methods can further comprise making the optothermal substrate by depositing the metal oxide film on a substrate. The metal oxide film can, for example, have a thickness of from 2 nm to 1000 nm.

The optothermal substrate is in thermal contact with a liquid sample comprising a plurality of thermally reducible metal ions, the liquid sample having a first temperature. The liquid sample can further comprise, for example, an aqueous solvent. The first temperature can, for example, be from 273 K to 320 K.

The concentration of the plurality of thermally reducible metal ions in the liquid sample can be, for example, from 10 wt % to 60 wt % (e.g., from 20 wt % to 22 wt %). The plurality of thermally reducible metal ions can, for example, comprise ions of a metal selected from the group consisting of Al, Ti, Cr, Mn, Fe, Co, Ni, Cu, Mo, Pd, Ag, Cd, Pt, Au, Rh, Ir, and combinations thereof. In some examples, the plurality of thermally reducible metal ions comprise ions of a plasmonic metal selected from the group consisting of Au, Ag, Pd, Cu, Cr, Al, and combinations thereof.

The methods further comprise generating a confinement region at a location in the liquid sample proximate to the first location of the optothermal substrate, wherein at least a portion of the confinement region has a second temperature that is greater than the first temperature such that the confinement region is bound by a temperature gradient. The second temperature can be, for example, from 276 K to 373 K. The second temperature can, for example, be greater than the first temperature by from 3 K to 100 K. The confinement region can, for example, be generated by plasmon-enhanced photothermal effects. The confinement region can, for example, have a diameter from 500 nm to 10 µm.

The methods further comprise trapping at least a portion of the plurality of thermally reducible metal ions within the confinement region. The portion of the plurality of thermally reducible metal ions can, for example, be trapped by convection (e.g., natural convection, and/or Marangoni convection), surface tension, gas pressure, substrate adhesion, an electrostatic force, a thermophoretic force, van der Waals force, or combinations thereof.

The methods further comprise thermally reducing the trapped portion of the plurality of thermally reducible metal ions, thereby depositing a metal particle comprising the reduced metal ions on the optothermal substrate at the first location. In some examples, the metal particle can be deposited in an amount of time of from 1 milliseconds to 1 second. In some examples, the deposited metal particle can comprise a metal selected from the group consisting of Al, Ti, Cr, Mn, Fe, Co, Ni, Cu, Mo, Pd, Ag, Cd, Pt, Au, Rh, Ir, and combinations thereof. In some examples, the deposited metal particle can comprise a plasmonic metal selected from the group consisting of Au, Ag, Pd, Cu, Cr, Al, and combinations thereof.

In some examples, the deposited metal particle can have a shape that is substantially linear, gammadion, U-shaped, or a combination thereof. The deposited linear, gammadion, and/or U-shaped metal particle can, for example, each be formed by one or more linear segments. Each of the one or more linear segments forming the deposited linear, gammadion, and/or U-shaped metal particle can, for example, have an average line thickness of from 200 nm to 2 µm. In some examples, the deposited linear, gammadion, and/or U-shaped metal particle can have an average height of from 100 nm to 250 nm.

In some examples, illuminating the first location of the optothermal substrate further: generates a bubble at a location in the liquid sample proximate to the first location of the optothermal substrate, the bubble having a gas-liquid interface with the liquid sample, and the bubble being within the confinement region; such that: trapping at least a portion of the plurality thermally reducible metal ions within the confinement region comprises trapping at least a portion of the plurality of thermally reducible metal ions at the gas-liquid interface of the bubble and the liquid sample; and the deposited metal particle comprises a substantially ring shaped particle having an average inner diameter, an average outer diameter, an average wall thickness defined by the difference between the average outer diameter and the average inner diameter, and an average height. In some examples, the bubble is generated by plasmon-enhanced photothermal effects. The bubble can, for example, have a diameter of from 100 nm to 50 µm. The substantially ring shaped particle can, for example, have an average inner diameter of from 250 nm to 3 µm; an average outer diameter of from 700 nm to 4 µm; an average a wall thickness of from 150 nm to 800 nm; an average height of from 100 nm to 250 nm; or combinations thereof.

The methods can further comprise, for example, illuminating a second location of the optothermal substrate thereby: generating a second confinement region at a location in the liquid sample proximate to the second location of the optothermal substrate, wherein at least a portion of the second confinement region has a third temperature that is greater than the first temperature such that the second confinement region is bound by a temperature gradient; trapping at least a second portion of the plurality of thermally reducible metal ions within the second confinement region; and thermally reducing the trapped portion of the plurality of thermally reducible metal ions to thereby deposit a second metal particle comprising the reduced metal ions on the optothermal substrate at the second location. In some examples, the optothermal substrate, the light source, the mirror, or a combination thereof can be translocated to illuminate the second location.

In some examples, illuminating the second location of the optothermal substrate further: generates a second bubble at a location in the liquid sample proximate to the second location of the optothermal substrate, the second bubble having a gas-liquid interface within the sample, and the second bubble being within the second confinement region; such that: trapping at least a second portion of the plurality thermally reducible metal ions within the second confinement region comprises trapping at least a second portion of the plurality of thermally reducible metal ions at the gas-liquid interface of the second bubble and the liquid sample; and the second deposited metal particle comprises a second substantially ring shaped particle.

In some examples, the methods can further comprise annealing the deposited metal particle and the second deposited metal particle, if present. The deposited metal particle and the second deposited metal particle, if present, can, for example, be annealed in a vacuum. In some examples, the deposited metal particle and the second deposited metal particle, if present, can be annealed at a temperature of from 100° C. to 200° C. (e.g., 120° C.). In some examples, the deposited metal particle and the second deposited metal particle, if present, can be annealed for from 1 hour to 4 hours (e.g., 1.5 hours).

Also disclosed herein are patterned substrate made using the methods described herein. Also disclosed herein are methods of use of patterned substrates made using the methods described herein, for example using the patterned substrates for single-particle sensing, functional optical devices, or combinations thereof. In some examples, the patterned sample can be used for surface-enhanced Raman spectroscopy (SERS), surface-enhanced infrared Raman spectroscopy (SEIRS), or a combination thereof. In some examples, the patterned substrate can be used for sensing in a microfluidic device. Also disclosed herein are methods of use of the patterned substrate, for example, in catalysis. In some examples, the patterned substrate can have an inverse-opal configuration. In some examples, the patterned substrate having an inverse-opal configuration can be used in high-surface areal catalysis.

Also disclosed herein are microfluidic devices comprising a channel defining a path for fluid flow from a fluid inlet to a fluid outlet, and the patterned sample disposed within the channel. In some examples, the patterned sample can be made in situ within the channel of the microfluidic device by any of the meth described herein.

Also disclosed herein are methods of detecting an analyte comprising flowing fluid along the channel of the microfluidic devices described herein, thereby contacting the analyte with the patterned sample, and spectroscopically detecting the analyte in contact with the patterned sample. The analyte can, for example, comprise Rhodamine 6G, Crystal Violet, 2,4,6-trinitrotoluene, or a combination thereof. In some examples, spectroscopically detecting the analyte comprises surface-enhanced Raman spectroscopy (SERS), surface-enhanced infrared Raman spectroscopy (SEIRS), or a combination thereof.

Also disclosed herein are systems for performing the methods described herein. The systems 100 can comprise an optothermal substrate 102 in thermal contact with a liquid sample 104 comprising a plurality of thermally reducible metal ions 106, the liquid sample 104 having a first temperature; and a light source 108 configured to illuminate the optothermal substrate 102 at a first location 110 with electromagnetic radiation. In some examples, the systems can further comprise a means for translocating the optothermal substrate 102 and/or the light source 108.

In some examples, further comprise a mirror 111, wherein the system 100 can be aligned such that the light source 108 is configured to illuminate the mirror 111 and the mirror 111 is configured to reflect the electromagnetic radiation from the light source 108 to illuminate the first location 110 of the optothermal substrate 102. In some examples, the system 100 can further comprise a means for translocating the mirror 111.

In some examples, the system 100 can further comprise a first lens 114. In some examples, the system 100 can be configured such that the light source 108 is below the first lens 114 and the optothermal substrate 102 is above the first lens 114.

In some examples, the systems 100 can further comprise a shutter 116 having an open state and a close state. The system 100 can, for example, be aligned such that the closed state of the shutter 116 interrupts the illumination of the optothermal substrate 102 at the first location 110 by the light source 108.

The system 100 can, in some examples, further comprise an instrument 112 configured to capture an electromagnetic signal from the optothermal substrate 102. In some example, the systems 100 can further comprise a computing device 118 configured to receive and process electromagnetic signals from the instrument 112. In certain examples, system memory 122 comprises computer-executable instructions stored thereon that, when executed by the processor 120, cause the processor 120 to receive an electromagnetic signal from the instrument 112, process the electromagnetic signal to obtain a characteristic of the optothermal substrate 102; and output the characteristic of the optothermal substrate 102.

The instrument can comprise, for example, a camera, an optical microscope, an electron microscope, a spectrometer, or combinations thereof. Examples of spectrometers include, but are not limited to, Raman spectrometers, UV-vis absorption spectrometers, IR absorption spectrometers, fluorescence spectrometers, and combinations thereof.

In some examples, the electromagnetic signal received by the processor from the instrument can comprise an image, a spectrum (e.g., Raman, UV-vis, IR, fluorescence), a micrograph, or combinations thereof.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
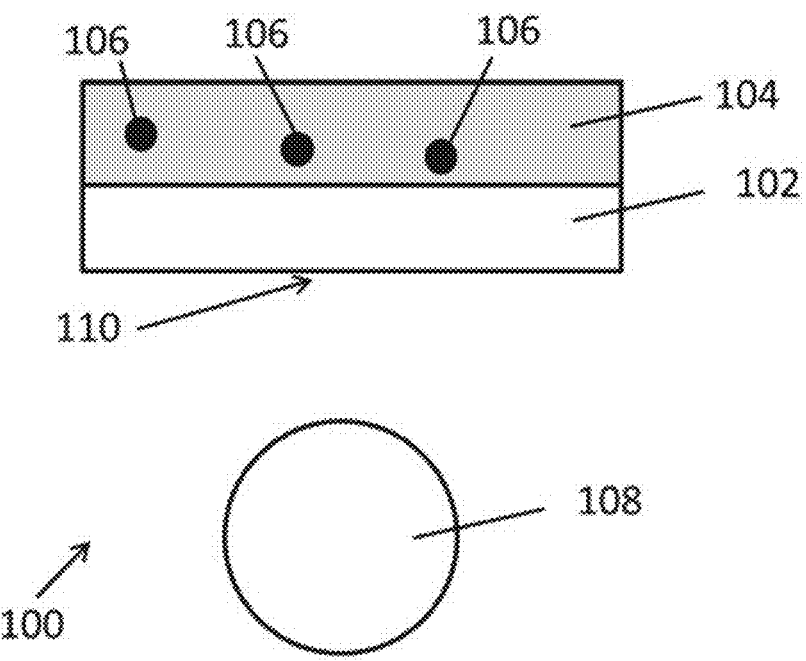
FIG. 1 is a schematic of an exemplary system as disclosed herein for lithography.

The systems and methods described herein may be understood more readily by reference to the following detailed description of specific aspects of the disclosed subject matter and the Examples included therein.

Before the present systems and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Disclosed herein are methods comprising illuminating a first location of an optothermal substrate with electromagnetic radiation. As used herein, "a first location" and "the first location" are meant to include any number of locations in any arrangement on the optothermal substrate. Thus, for example "a first location" includes one or more first locations. In some embodiments, the first location can comprise a plurality of locations. In some embodiments, the first locations can comprise a plurality of locations arranged in an ordered array.

The electromagnetic radiation can, for example, have a power density of 0.2 mW/$\mu$m$^2$ or more (e.g., 0.3 mW/$\mu$m$^2$ or more, 0.4 mW/$\mu$m$^2$ or more, 0.5 mW/$\mu$m$^2$ or more, 0.6 mW/$\mu$m$^2$ or more, 0.7 mW/$\mu$m$^2$ or more, 0.8 mW/$\mu$m$^2$ or more, 0.9 mW/$\mu$m$^2$ or more, or 1.0 mW/$\mu$m$^2$ or more). In some examples, the electromagnetic radiation can have a power density of 1.2 mW/$\mu$m$^2$ or less (e.g., 1.1 mW/$\mu$m$^2$ or less, 1.0 mW/$\mu$m$^2$ or less, 0.9 mW/$\mu$m$^2$ or less, 0.8 mW/$\mu$m$^2$ or less, 0.7 mW/$\mu$m$^2$ or less, 0.6 mW/$\mu$m$^2$ or less, 0.5 mW/$\mu$m$^2$ or less, or 0.4 mW/$\mu$m$^2$ or less). The power density of the electromagnetic radiation can range from any of the minimum values described above to any of the maximum values described above. For example, the electromagnetic radiation can have a power density of from 0.2 mW/$\mu$m$^2$ to 1.2 mW/$\mu$m$^2$ (e.g., from 0.2 mW/$\mu$m$^2$ to 0.7 mW/$\mu$m$^2$, from 0.7 mW/$\mu$m$^2$ to 1.2 mW/$\mu$m$^2$, from 0.2 mW/$\mu$m$^2$ to 0.4 mW/$\mu$m$^2$, from 0.4 mW/$\mu$m$^2$ to 0.6 mW/$\mu$m$^2$, from 0.6 mW/$\mu$m$^2$ to 0.8 mW/$\mu$m$^2$, from 08 mW/$\mu$m$^2$ to 1.0 mW/$\mu$m$^2$, from 1.0 mW/$\mu$m$^2$ to 1.2 mW/$\mu$m$^2$, or from 0.4 mW/$\mu$m$^2$ to 1.2 mW/$\mu$m$^2$).

The electromagnetic radiation can, for example, be provided by a light source. The light source can be any type of light source. Examples of suitable light sources include natural light sources (e.g., sunlight) and artificial light sources (e.g., incandescent light bulbs, light emitting diodes, gas discharge lamps, arc lamps, lasers etc.). In some examples, the light source is a laser, such as a continuous wave laser.

In some examples, the light source is configured to illuminate a mirror, the mirror being configured to reflect the electromagnetic radiation from the light source to illuminate the first location of the optothermal substrate. In some examples, the mirror can comprise a plurality of mirrors, such as an array of micromirrors (e.g., a digital micromirror device).

As used herein, an optothermal substrate is any substrate that can convert at least a portion of the electromagnetic radiation into thermal energy. For example, the optothermal substrate can comprise a material with a high absorption efficiency at one or more wavelengths that overlaps with at least a portion of the electromagnetic radiation. The optothermal substrate can, for example, comprise a plasmonic substrate, a metal film, a metal oxide film, or a combination thereof.

In some examples, the optothermal substrate comprises a plasmonic substrate and the electromagnetic radiation comprises a wavelength that overlaps with at least a portion of the plasmon resonance energy of the substrate.

The plasmonic substrate can, in some examples, comprise a plurality of plasmonic particles. In some examples, the plurality of plasmonic particles can comprise a plurality of metal particles. The plurality of metal particles can, for example, comprise a metal selected from the group consisting of Au, Ag, Pd, Cu, Cr, Al, and combinations thereof. In some examples, the plurality of plasmonic particles can comprise a plurality of gold particles.

The plurality of plasmonic particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. Mean particle size can be measured using methods known in the art, such as evaluation by scanning electron microscopy, transmission electron microscopy, and/or dynamic light scattering.

The plurality of plasmonic particles have, for example, an average particle size of 10 nm or more (e.g., 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, 95 nm or more, 100 nm or more, 110 nm or more, 120 nm or more, 130 nm or more, 140 nm or more, 150 nm or more, 160 nm or more, 170 nm or more, 180 nm or more, 190 nm or more, 200 nm or more, 210 nm or more, 220 nm or more, 230 nm or more, 240 nm or more, 250 nm or more, 260 nm or more, 270 nm or more, 280 nm or more, or 290 nm or more).

In some examples, the plurality of plasmonic particles can have an average particle size of 300 nm or less (e.g., 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, 160 nm or less, 150 nm or less, 140 nm or less, 130 nm or less, 120 nm or less, 110 nm or less, 100 nm or less, 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, or 15 nm or less).

The average particle size of the plurality of plasmonic particles can range from any of the minimum values described above to any of the maximum values described above. For example, the plurality of plasmonic particles can have an average particle size of from 10 nm to 300 nm (e.g., from 10 nm to 150 nm, from 150 nm to 300 nm, from 10 nm to 100 nm, from 100 nm to 200 nm, from 200 nm to 300 nm, or from 10 nm to 200 nm). In some examples, the plurality of plasmonic particles can have an average particle size of from 20 nm to 40 nm.

In some examples, the plurality of plasmonic particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

The plurality of plasmonic particles can comprise particles of any shape (e.g., a sphere, a rod, a quadrilateral, an ellipse, a triangle, a polygon, etc.). In some examples, the plurality of plasmonic particles can have an isotropic shape. In some examples, the plurality of plasmonic particles can have an anisotropic shape. In some examples, the plurality of plasmonic particles are substantially spherical.

In some examples, each plasmonic particle within the plurality of plasmonic particles on the substrate is separated from its neighboring plasmonic particles by an average distance of 5 nm or more (e.g., 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more, 19 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, or 95 nm or more).

In some examples, each plasmonic particle within the plurality of plasmonic particles on the substrate is separated from its neighboring plasmonic particles by an average distance of 100 nm or less (e.g., 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 19 nm or less, 18 nm or less, 17 nm or less, 16 nm or less, 15 nm or less, 14 nm or less, 13 nm or less, 12 nm or less, 11 nm or less, 10 nm or less, 9 nm or less, 8 nm or less, 7 nm or less, or 6 nm or less).

The average distance that each plasmonic particle within the plurality of plasmonic particles on the substrate is separated from its neighboring plasmonic particles can range from any of the minimum values described above to any of the maximum values described above. For example, each plasmonic particle within the plurality of plasmonic particles on the substrate is separated from its neighboring plasmonic particles by an average distance of from 5 nm to 100 nm (e.g., from 5 nm to 50 nm, from 50 nm to 100 nm, from 5 nm to 20 nm, from 20 nm to 40 nm, from 40 nm to 60 nm, from 60 nm to 80 nm, from 80 nm to 100 nm, from 5 nm to 40 nm, from 5 nm to 30 nm, or from 5 nm to 20 nm).

The density of the plurality of plasmonic particles on the plasmonic substrate can, for example, be $10^{10}$ particles/cm$^2$ or more (e.g., $1.25\times10^{10}$ particles/cm$^2$ or more, $1.5\times10^{10}$ particles/cm$^2$ or more, $1.75\times10^{10}$ particles/cm$^2$ or more, $2\times10^{10}$ particles/cm$^2$ or more, $2.25\times10^{10}$ particles/cm$^2$ or more, $2.5\times10^{10}$ particles/cm$^2$ or more, $2.75\times10^{10}$ particles/cm$^2$ or more, $3\times10^{10}$ particles/cm$^2$ or more, $3.25\times10^{10}$ particles/cm$^2$ or more, $3.5\times10^{10}$ particles/cm$^2$ or more, $3.75\times10^{10}$ particles/cm$^2$ or more, $4\times10^{10}$ particles/cm$^2$ or more, $4.25\times10^{10}$ particles/cm$^2$ or more, $4.5\times10^{10}$ particles/cm$^2$ or more, $4.75\times10^{10}$ particles/cm$^2$ or more, $5\times10^{10}$ particles/cm$^2$ or more, $5.25\times10^{10}$ particles/cm$^2$ or more, $5.5\times10^{10}$ particles/cm$^2$ or more, $5.75\times10^{10}$ particles/cm$^2$ or more, $6\times10^{10}$ particles/cm$^2$ or more, $6.25\times10^{10}$ particles/cm$^2$ or more, $6.5\times10^{10}$ particles/cm$^2$ or more, $6.75\times10^{10}$ particles/cm$^2$ or more, $7\times10^{10}$ particles/cm$^2$ or more, $7.25\times10^{10}$ particles/cm$^2$ or more, $7.5\times10^{10}$ particles/cm$^2$ or more, $7.75\times10^{10}$ particles/cm$^2$ or more, $8\times10^{10}$ particles/cm$^2$ or more, $8.25\times10^{10}$ particles/cm$^2$ or more, $8.5\times10^{10}$ particles/cm$^2$ or more, $8.75\times10^{10}$ particles/cm$^2$ or more, $9\times10^{10}$ particles/cm$^2$ or more, $9.25\times10^{10}$ particles/cm$^2$ or more, $9.5\times10^{10}$ particles/cm$^2$ or more, or $9.75\times10^{10}$ particles/cm$^2$ or more).

In some examples, the density of the plurality of plasmonic particles on the plasmonic substrate can be $10^{11}$ particles/cm$^2$ or less (e.g., $9.75\times10^{10}$ particles/cm$^2$ or less, $9.5\times10^{10}$ particles/cm$^2$ or less, $9.25\times10^{10}$ particles/cm$^2$ or less, $9\times10^{10}$ particles/cm$^2$ or less, $8.75\times10^{10}$ particles/cm$^2$ or less, $8.5\times10^{10}$ particles/cm$^2$ or less, $8.25\times10^{10}$ particles/cm$^2$ or less, $8\times10^{10}$ particles/cm$^2$ or less, $7.75\times10^{10}$ particles/cm$^2$ or less, $7.5\times10^{10}$ particles/cm$^2$ or less, $7.25\times10^{10}$ particles/cm$^2$ or less, $7\times10^{10}$ particles/cm$^2$ or less, $6.75\times10^{10}$ particles/cm$^2$ or less, $6.5\times10^{10}$ particles/cm$^2$ or less, $6.25\times10^{10}$ particles/cm$^2$ or less, $6\times10^{10}$ particles/cm$^2$ or less, $5.75\times10^{10}$ particles/cm$^2$ or less, $5.5\times10^{10}$ particles/cm$^2$ or less, $5.25\times10^{10}$ particles/cm$^2$ or less, $5\times10^{10}$ particles/cm$^2$ or less, $4.75\times10^{10}$ particles/cm$^2$ or less, $4.5\times10^{10}$ particles/cm$^2$ or less, $4.25\times10^{10}$ particles/cm$^2$ or less, $4\times10^{10}$ particles/cm$^2$ or less, $3.75\times10^{10}$ particles/cm$^2$ or less, $3.5\times10^{10}$ particles/cm$^2$ or less, $3.25\times10^{10}$ particles/cm$^2$ or less, $3\times10^{10}$ particles/cm$^2$ or less, $2.75\times10^{10}$ particles/cm$^2$ or less, $2.5\times10^{10}$ particles/cm$^2$ or less, $2.25\times10^{10}$ particles/cm$^2$ or less, $2\times10^{10}$ particles/cm$^2$ or less, $1.75\times10^{10}$ particles/cm$^2$ or less, $1.5\times10^{10}$ particles/cm$^2$ or less, or $1.25\times10^{10}$ particles/cm$^2$ or less).

The density of the plurality of plasmonic particles on the plasmonic substrate can range from any of the minimum values described above to any of the maximum values described above. For example, the density of the plurality of plasmonic particles on the plasmonic substrate can be from $10^{10}$ particles/cm$^2$ to $10^{11}$ particles/cm$^2$ (e.g., from $1\times10^{10}$ particles/cm$^2$ to $5\times10^{10}$ particles/cm$^2$, from $5\times10^{10}$ particles/cm$^2$ to $1\times10^{11}$ particles/cm$^2$, from $1\times10^{10}$ particles/cm$^2$ to $2.5\times10^{10}$ particles/cm$^2$, from $2.5\times10^{10}$ particles/cm$^2$ to $5\times10^{10}$ particles/cm$^2$, from $5\times10^{10}$ particles/cm$^2$ to $7.5\times10^{10}$ particles/cm$^2$, from 7.5×10$^{10}$ particles/cm$^2$ to 1×10$^{11}$ particles/cm$^2$, or from 2×10$^{10}$ particles/cm$^2$ to 9×10$^{10}$ particles/cm$^2$).

The size, shape, and/or composition of the plurality of plasmonic particles; the separation between each particle within the plurality of plasmonic particles; the density of the plasmonic particles on the substrate; or combinations thereof can be selected in view of a variety of factors. In some examples, the size, shape, and/or composition of the plurality of plasmonic particles can be selected to maximize the electromagnetic field enhancement. For example, the size, shape, and/or composition of the plurality of plasmonic particles; the separation between each particle within the plurality of plasmonic particles; the density of the plasmonic particles on the substrate; or combinations thereof can be selected such that the intensity of an incident electromagnetic field is enhanced by a factor of 5 or more by the plurality of plasmonic particles (e.g., 10 or more, 20 or more, 30 or more, 40 or more, 50 or more, 60 or more 70 or more, 80 or more, 90 or more, or 100 or more). In some examples, the size, shape, and/or composition of the plurality of plasmonic particles; the separation between each particle within the plurality of plasmonic particles; the density of the plasmonic particles on the substrate; or combinations thereof can be selected such that the plasmon resonance energy of the plasmonic substrate overlaps with at least a portion of the electromagnetic radiation used to illuminate the plasmonic substrate.

The methods can further comprise, for example, making the plasmonic substrate by depositing the plurality of plasmonic particles on a substrate. Depositing the plurality of plasmonic particles can comprise, for example, printing, lithographic deposition, electron beam deposition, thermal deposition, spin coating, drop-casting, zone casting, dip coating, blade coating, spraying, vacuum filtration, or combinations thereof.

The methods can further comprise, for example, making the plasmonic substrate by thermally annealing a film of a plasmonic metal deposited on a substrate, thereby forming the plurality of plasmonic particles on the substrate. In some examples, the methods can further comprise depositing the film of the plasmonic metal on the substrate. The film of plasmonic metal can be deposited on the substrate, for example, by thin film processing techniques, such as sputtering, pulsed layer deposition, molecular beam epitaxy, evaporation, atomic layer deposition, or combinations thereof. In some examples, the film of the plasmonic metal can have a thickness of 2 nm or more (e.g., 2.5 nm or more, 3 nm or more, 3.5 nm or more, 4 nm or more, 4.5 nm or more, 5 nm or more, 5.5 nm or more, 6 nm or more, 6.5 nm or more, 7 nm or more, 7.5 nm or more, 8 nm or more, 8.5 nm or more, 9 nm or more, 9.5 nm or more, 10 nm or more, 10.5 nm or more, 11 nm or more, 11.5 nm or more, 12 nm or more, 12.5 nm or more, 13 nm or more, 13.5 nm or more, 14 nm or more, or 14.5 nm or more). In some examples, the film of the plasmonic metal can have a thickness of 15 nm or less (e.g., 14.5 nm or less, 14 nm or less, 13.5 nm or less, 13 nm or less, 12.5 nm or less, 12 nm or less, 11.5 nm or less, 11 nm or less, 10.5 nm or less, 10 nm or less, 9.5 nm or less, 9 nm or less, 8.5 nm or less, 8 nm or less, 7.5 nm or less, 7 nm or less, 6.5 nm or less, 6 nm or less, 5.5 nm or less, 5 nm or less, 4.5 nm or less, 4 nm or less, 3.5 nm or less, 3 nm or less, or 2.5 nm or less). The thickness of the film of the plasmonic metal can range from any of the minimum values described above to any of the maximum values described above. For example, the film of the plasmonic metal can have a thickness of from 2 nm to 15 nm (e.g., from 2 nm to 8 nm, from 8 nm to 15 nm, from 2 nm to 5 nm, from 5 nm to 10 nm, from 10 nm to 15 nm, from 2 nm to 10 nm, or from 2 nm to 6 nm).

Thermally annealing the film can, for example, comprise heating the film at a temperature of 300° C. or more (e.g., 310° C. or more, 320° C. or more, 330° C. or more, 340° C. or more, 350° C. or more, 360° C. or more, 370° C. or more, 380° C. or more, 390° C. or more, 400° C. or more, 410° C. or more, 420° C. or more, 430° C. or more, 440° C. or more, 450° C. or more, 460° C. or more, 470° C. or more, 480° C. or more, 490° C. or more, 500° C. or more, 510° C. or more, 520° C. or more, 530° C. or more, 540° C. or more, 550° C. or more, 560° C. or more, 570° C. or more, 580° C. or more, or 590° C. or more). In some examples, thermally annealing the film can comprise heating the film at a temperature of 600° C. or less (e.g., 590° C. or less, 580° C. or less, 570° C. or less, 560° C. or less, 550° C. or less, 540° C. or less, 530° C. or less, 520° C. or less, 510° C. or less, 500° C. or less, 490° C. or less, 480° C. or less, 470° C. or less, 460° C. or less, 450° C. or less, 440° C. or less, 430° C. or less, 420° C. or less, 410° C. or less, 400° C. or less, 390° C. or less, 380° C. or less, 370° C. or less, 360° C. or less, 350° C. or less, 340° C. or less, 330° C. or less, 320° C. or less, or 310° C. or less). The temperature at which the film is heated during thermal annealing can range from any of the minimum values described above to any of the maximum values described above. For example, thermally annealing the film can comprise heating the film at a temperature of from 300° C. to 600° C. (e.g., from 300° C. to 450° C., from 450° C. to 600° C., from 300° C. to 400° C., from 400° C. to 500° C., from 500° C. to 600° C., from 400° C. to 600° C., from 450° C. to 600° C., or from 530° C. to 570° C.). In some examples, thermally annealing the film can comprise heating the film at a temperature of 550° C.

In some examples, the film can be thermally annealed for 1 hour or more (e.g., 1.5 hours or more, 2 hours or more, 2.5 hours or more, 3 hours or more, 3.5 hours or more, 4 hours or more, 4.5 hours or more, 5 hours or more, 5.5 hours or more, 6 hours or more, 6.5 hours or more, 7 hours or more, 7.5 hours or more, 8 hours or more, 8.5 hours or more, 9 hours or more, 9.5 hours or more, 10 hours or more, 10.5 hours or more, 11 hours or more, or 11.5 hours or more). In some examples, the film can be thermally annealed for 12 hours or less (e.g., 11.5 hours or less, 11 hours or less, 10.5 hours or less, 10 hours or less, 9.5 hours or less, 9 hours or less, 8.5 hours or less, 8 hours or less, 7.5 hours or less, 7 hours or less, 6.5 hours or less, 6 hours or less, 5.5 hours or less, 5 hours or less, 4.5 hours or less, 4 hours or less, 3.5 hours or less, 3 hours or less, 2.5 hours or less, 2 hours or less, or 1.5 hours or less). The time for which the film can be thermally annealed can range from any of the minimum values described above to any of the maximum values described above. For example, the film can be thermally annealed for from 1 hour to 12 hours (e.g., from 1 hour to 6 hours, from 6 hours to 12 hours, from 1 hour to 4 hours, from 4 hours to 8 hours, from 8 hours to 12 hours, from 1 hour to 10 hours, or from 1 hour to 3 hours). In some examples, the film can be thermally annealed for 2 hours.

In some examples, the optothermal substrate can comprise a metal film, such as a metal film deposited on a substrate. The metal film can, for example, comprise a metal selected from the group consisting of Be, Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, and combinations thereof. In some examples, the metal film can comprise a metal selected from the group consisting of Al, Ti, Cr, Mn, Fe, Co, Ni, Cu, Mo, Pd, Ag, Cd, Pt, Au, and combinations thereof. In some examples, the methods can further comprise making the optothermal substrate by depositing the metal film on a substrate. The metal film can be deposited on the substrate, for example, by thin film processing techniques, such as sputtering, pulsed layer deposition, molecular beam epitaxy, evaporation, thermal deposition, atomic layer deposition, or combinations thereof.

The metal film can, for example, have a thickness of 2 nm or more (e.g., 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, or 175 nm or more). In some examples, the metal film can have a thickness of 200 nm or less (e.g., 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, or 3 nm or less). The thickness of the metal film can range from any of the minimum values described above to any of the maximum values described above. For example, the metal film can have a thickness of from 2 nm to 200 nm (e.g., from 2 nm to 100 nm, from 100 nm to 200 nm, from 2 nm to 50 nm, from 50 nm to 100 nm, from 100 nm to 150 nm, from 150 nm to 200 nm, from 10 nm to 150 nm, or from 2 nm to 10 nm).

In some examples, the optothermal substrate can comprise a metal oxide film, such as a metal oxide film deposited on a substrate. The metal oxide film can, for example, comprise an oxide of a metal wherein the metal is selected from the group consisting of Be, Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, and combinations thereof. In some examples, the metal oxide film can comprise an oxide of a metal wherein the metal is selected from the group consisting of Al, Ti, Cr, Mn, Fe, Co, Ni, Cu, Mo, Pd, Ag, Cd, Pt, Au, In, Sn, Zn, and combinations thereof. In some examples, the methods can further comprise making the optothermal substrate by depositing the metal oxide film on a substrate. In some examples, the methods can further comprise making the optothermal substrate by depositing the metal oxide film on a substrate by depositing a metal film on the substrate and oxidizing the metal film to form the metal oxide film. The metal oxide film can be deposited on the substrate, for example, by thin film processing techniques, such as sputtering, pulsed layer deposition, molecular beam epitaxy, evaporation, thermal deposition, atomic layer deposition, or combinations thereof.

The metal oxide film can, for example, have a thickness of 2 nm or more (e.g., 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 250 nm or more, 300 nm or more, 350 nm or more, 400 nm or more, 450 nm or more, 500 nm or more, 600 nm or more, 700 nm or more, 800 nm or more, or 900 nm or more). In some examples, the metal oxide film can have a thickness of 1000 nm or less (e.g., 900 nm or less, 800 nm or less, 700 nm or less, 600 nm or less, 500 nm or less, 450 nm or less, 400 nm or less, 350 nm or less, 300 nm or less, 250 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, or 3 nm or less). The thickness of the metal oxide film can range from any of the minimum values described above to any of the maximum values described above. For example, the metal oxide film can have a thickness of from 2 nm to 1000 nm (e.g., from 2 nm to 500 nm, from 500 nm to 1000 nm, from 2 nm to 200 nm, from 200 nm to 400 nm, from 400 nm to 600 nm, from 600 nm to 800 nm, from 800 nm to 1000 nm, or from 5 nm to 900 nm).

The optothermal substrate is in thermal contact with a liquid sample comprising a plurality of thermally reducible metal ions, the liquid sample having a first temperature. The liquid sample can further comprise, for example, an aqueous solvent. The first temperature can, for example, be 273 Kelvin (K) or more (e.g., 275 K or more, 280 K or more, 285 K or more, 286 K or more, 287 K or more, 288 K or more, 289 K or more, 290 K or more, 291 K or more, 292 K or more, 293 K or more, 294 K or more, 295 K or more, 296 K or more, 297 K or more, 298 K or more, 299 K or more, 300 K or more, 305 K or more, 310 K or more, or 315 K or more). In some examples, the first temperature can be 320 K or less (e.g., 315 K or less, 310 K or less, 305 K or less, 300 K or less, 299 K or less, 298 K or less, 297 K or less, 296 K or less, 295 K or less, 294 K or less, 293 K or less, 292 K or less, 291 K or less, 290 K or less, 289 K or less, 288 K or less, 287 K or less, 286 K or less, 285 K or less, 280 K or less, or 275 K or less). The first temperature can range from any of the minimum values described above to any of the maximum values described above. For example, the first temperature can be from 273 K to 320 K (e.g., from 273 K to 296 K, from 296 K to 320 K, from 273 K to 283 K, from 283 K to 293 K, from 293 K to 303 K, from 303 K to 313 K, from 313 K to 320 K, from 275 K to 315 K, from 288 K to 298 K, or from 293 K to 295 K).

The concentration of the plurality of thermally reducible metal ions in the liquid sample can be, for example, 10 wt % or more (e.g., 15 wt % or more, 20 wt % or more, 21 wt % or more, 22 wt % or more, 23 wt % or more, 24 wt % or more, 25 wt % or more, 30 wt % or more, 35 wt % or more, 40 wt % or more, 45 wt % or more, 50 wt % or more, or 55 wt % or more). In some examples, the concentration of the plurality of thermally reducible meal ions in the liquid sample can be 60 wt % or less (e.g., 55 wt % or less, 50 wt % or less, 45 wt % or less, 40 wt % or less, 35 wt % or less, 30 wt % or less, 25 wt % or less, 24 wt % or less, 23 wt % or less, 22 wt % or less, 21 wt % or less, 20 wt % or less, or 15 wt % or less). The concentration of the plurality of thermally reducible metal ions in the liquid sample can range from any of the minimum values described above to any of the maximum values described above. For example, the concentration of the plurality of thermally reducible metal ions in the liquid sample can be from 10 wt % to 60 wt % (e.g., from 10 wt % to 35 wt %, from 35 wt % to 60 wt %, from 10 wt % to 20 wt %, from 20 wt % to 30 wt %, form 30 wt % to 40 wt %, from 40 wt % to 50 wt %, from 50 wt % to 60 wt %, from 10 wt % to 50 wt %, from 10 wt % to 40 wt %, from 15 wt % to 25 wt %, or from 20 wt % to 22 wt %).

The plurality of thermally reducible metal ions can, for example, comprise ions of a metal selected from the group consisting of Be, Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, and combinations thereof. In some examples, the plurality of thermally reducible metal ions can comprise ions of a metal selected from the group consisting of Al, Ti, Cr, Mn, Fe, Co, Ni, Cu, Mo, Pd, Ag, Cd, Pt, Au, Rh, Ir, and combinations thereof. In some examples, the plurality of thermally reducible metal ions comprise ions of a plasmonic metal selected from the group consisting of Au, Ag, Pd, Cu, Cr, Al, and combinations thereof.

The methods further comprise generating a confinement region at a location in the liquid sample proximate to the first location of the optothermal substrate, wherein at least a portion of the confinement region has a second temperature that is greater than the first temperature such that the confinement region is bound by a temperature gradient. For example, the confinement region is located within at least a portion of the three-dimensional area within the liquid sample defined by the temperature gradient (e.g., the boundary of the confinement region can be defined by the temperature gradient). The confinement region can comprise a three-dimensional area within the liquid sample where the balance of forces acting on the portion of the plurality of thermally reducible metal ions substantially localizes the portion of the plurality of thermally reducible metal ion.

The second temperature can be, for example, 276 K or more (e.g., 280 K or more, 285 K or more, 290 K or more, 295 K or more, 300 K or more, 305 K or more, 310 K or more, 315 K or more, 320 K or more, 325 K or more, 330 K or more, 335 K or more, 340 K or more, 345 K or more, 350 K or more, 355 K or more, 360 K or more, 365 K or more, or 370 K or more). In some examples, the second temperature can be 373 K or less (e.g., 370 K or less, 365 K or less, 360 K or less, 355 K or less, 350 K or less, 345 K or less, 340 K or less, 335 K or less, 330 K or less, 325 K or less, 320 K or less, 315 K or less, 310 K or less, 305 K or less, 300 K or less, 295 K or less, 290 K or less, 285 K or less, or 280 K or less). The second temperature can range from any of the minimum values described above to any of the maximum values described above. For example, the second temperature can be from 276 K to 373 K (e.g., from 276 K to 325 K, from 325 K to 373 K, from 276 K to 295 K, from 295 K to 315 K, from 315 K to 335 K, from 335 K to 355 K, from 355 K to 373 K, or from 290 K to 370 K).

The second temperature can, for example, be greater than the first temperature by 3 K or more (e.g., 5 K or more, 10 K or more, 15 K or more, 20 K or more, 25 K or more, 30 K or more, 35 K or more, 40 K or more, 45 K or more, 50 K or more, 55 K or more, 60 K or more, 65 K or more, 70 K or more, 75 K or more, 80 K or more, 85 K or more, or 90 K or more). In some examples, the second temperature can be greater than the first temperature by 100 K or less (e.g., 95 K or less, 90 K or less, 85 K or less, 80 K or less, 75 K or less, 70 K or less, 65 K or less, 60 K or less, 55 K or less, 50 K or less, 45 K or less, 40 K or less, 35 K or less, 30 K or less, 25 K or less, 20 K or less, 15 K or less, or 10 K or less). The difference between the first temperature and the second temperature can range from any of the minimum values described above to any of the maximum values described above. For example, the second temperature can be greater than the first temperature by from 3 K to 100 K (e.g., from 3 K to 50 K, from 50 K to 100 K, from 3 K to 20 K, from 20 K to 40 K, form 40 K to 60 K, from 60 K to 80 K, from 80 K to 100 K, or from 5 K to 90 K).

The confinement region can, for example, be generated by plasmon-enhanced photothermal effects. The confinement region can, for example, have a diameter of 500 nm or more (e.g., 550 nm or more, 600 nm or more, 650 nm or more, 700 nm or more, 750 nm or more, 800 nm or more, 850 nm or more, 900 nm or more, 950 nm or more, 1 µm or more, 2 µm or more, 3 µm or more, 4 µm or more, 5 µm or more, 6 µm or more, 7 µm or more, 8 µm or more, or 9 µm or more). In some examples, the confinement region can have a diameter of 10 µm or less (e.g., 9 µm or less, 8 µm or less, 7 µm or less, 6 µm or less, 5 µm or less, 4 µm or less, 3 µm or less, 2 µm or less, 1 µm or less, 950 nm or less, 900 nm or less, 850 nm or less, 800 nm or less, 750 nm or less, 700 nm or less, 650 nm or less, 600 nm or less, or 550 nm or less). The diameter of the confinement region can range from any of the minimum values described above to any of the maximum values described above. For example, the confinement region can have a diameter of from 500 nm to 10 µm (e.g., from 500 nm to 5 µm, from 5 µm to 10 µm, from 500 nm to 2 µm, from 2 µm to 4 µm, from 4 µm to 6 µm, from 6 µm to 8 µm, from 8 µm to 10 µm, or from 600 nm to 9 µm). The diameter of the confinement region can, for example, be controlled by the power density of the electromagnetic radiation used to illuminate the optothermal substrate. The diameter of the confinement region can be selected in view of a number of factors. In some examples, the diameter of the confinement region can be selected relative to the desired average size of the deposited metal particle.

The methods further comprise trapping at least a portion of the plurality of thermally reducible metal ions within the confinement region. The portion of the plurality of thermally reducible metal ions can, for example, be trapped by convection (e.g., natural convection, and/or Marangoni convection), surface tension, gas pressure, substrate adhesion, an electrostatic force, a thermophoretic force, van der Waals force, or combinations thereof.

The methods further comprise thermally reducing the trapped portion of the plurality of thermally reducible metal ions, thereby depositing a metal particle comprising the reduced metal ions on the optothermal substrate at the first location. As used herein, "a metal particle," "a deposited metal particle," "the metal particle," and "the deposited metal particle" are meant to include any number of particles deposited in any arrangement on the optothermal substrate. Thus, for example "a metal particle" includes one or more metal particles. In some embodiments, the deposited metal particle can comprise a plurality of deposited metal particles. In some embodiments, the deposited metal particle can comprise a plurality of metal particles deposited in an ordered array. In some examples, the plurality of deposited metal particles can be substantially monodisperse.

In some examples, the metal particle can be deposited in an amount of time of 1 milliseconds (ms) or more (e.g., 5 ms or more, 10 ms or more, 20 ms or more, 30 ms or more, 40 ms or more, 50 ms or more, 60 ms or more, 70 ms or more, 80 ms or more, 90 ms or more, 100 ms or more, 125 ms or more, 150 ms or more, 175 ms or more, 200 ms or more, 225 ms or more, 250 ms or more, 275 ms or more, 300 ms or more, 325 ms or more, 350 ms or more, 375 ms or more, 400 ms or more, 425 ms or more, 450 ms or more, 475 ms or more, 500 ms or more, 550 ms or more, 600 ms or more, 650 ms or more, 700 ms or more, 750 ms or more, 800 ms or more, 850 ms or more, 900 ms or more, or 950 ms or more).

In some examples, the metal particle can be deposited in an amount of time of 1 second or less (e.g., 950 ms or less, 900 ms or less, 850 ms or less, 800 ms or less, 750 ms or less, 700 ms or less, 650 ms or less, 600 ms or less, 550 ms or less, 500 ms or less, 475 ms or less, 450 ms or less, 425 ms or less, 400 ms or less, 375 ms or less, 350 ms or less, 325 ms or less, 300 ms or less, 275 ms or less, 250 ms or less, 225 ms or less, 200 ms or less, 175 ms or less, 150 ms or less, 125 ms or less, 100 ms or less, 90 ms or less, 80 ms or less, 70 ms or less, 60 ms or less, 50 ms or less, 40 ms or less, 30 ms or less, 20 ms or less, 10 ms or less, 5 ms or less). The time in which the metal particle is deposited can range from any of the minimum values described above to any of the maximum values described above. For example, the metal particle can be deposited in an amount of time from 1 ms to 1 second (e.g., from 1 ms to 500 ms, from 500 ms to 1 second, from 1 ms to 200 ms, from 200 ms to 400 ms, from 400 ms to 600 ms, from 600 ms to 800 ms, from 800 ms to 1 s, or from 100 ms to 900 ms). The time in which metal particle can, for example, depend on the concentration of the plurality of thermally reducible metal ions in the liquid sample, the power density of the electromagnetic radiation, the formation of a bubble, or combinations thereof.

The deposited metal particle, for example, comprise a selected from the group consisting of Be, Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, and combinations thereof. In some examples, the deposited metal particle can comprise a metal selected from the group consisting of Al, Ti, Cr, Mn, Fe, Co, Ni, Cu, Mo, Pd, Ag, Cd, Pt, Au, Rh, Ir, and combinations thereof. In some examples, the deposited metal particle can comprise a plasmonic metal selected from the group consisting of Au, Ag, Pd, Cu, Cr, Al, and combinations thereof. In some examples, the deposited metal particle can comprise a mixture of two or more metals. In some examples, the deposited metal particle can comprise an alloy of two or more metals.

In some examples, the deposited metal particle can have a shape that is substantially linear, gammadion, U-shaped, or a combination thereof. The deposited linear, gammadion, and/or U-shaped metal particle can, for example, each be formed by one or more linear segments. For example, the U-shaped metal particle can comprise three linear segments joined to form a U-shape. Each of the one or more linear segments forming the deposited linear, gammadion, and/or U-shaped metal particle can, for example, have an average line thickness of 200 nm or more (e.g., 250 nm or more, 300 nm or more, 350 nm or more, 400 nm or more, 450 nm or more, 500 nm or more, 550 nm or more, 600 nm or more, 650 nm or more, 700 nm or more, 750 nm or more, 800 nm or more, 850 nm or more, 900 nm or more, 950 nm or more, 1 µm or more, 1.1 µm or more, 1.2 µm or more, 1.3 µm or more, 1.4 µm or more, 1.5 µm or more, 1.6 µm or more, 1.7 µm or more, or 1.8 µm or more). In some examples, each of the one or more linear segments forming the deposited linear, gammadion, and/or U-shaped metal particle can, for example, have an average line thickness of 2 µm or less (e.g., 1.9 µm or less, 1.8 µm or less, 1.7 µm or less, 1.6 µm or less, 1.5 µm or less, 1.4 µm or less, 1.3 µm or less, 1.2 µm or less, 1.1 µm or less, 1 µm or less, 950 nm or less, 900 nm or less, 850 nm or less, 800 nm or less, 750 nm or less, 700 nm or less, 650 nm or less, 600 nm or less, 550 nm or less, 500 nm or less, 450 nm or less, 400 nm or less, 350 nm or less, or 300 nm or less). The average line thickness of each of the one or more linear segments forming the deposited linear, gammadion, and/or U-shaped metal particle can range from any of the minimum values described above to any of the maximum values described above. For example, each of the one or more linear segments forming the deposited linear, gammadion, and/or U-shaped metal particle can, for example, have an average line thickness of from 200 nm to 2 µm (e.g., from 200 nm to 1.1 µm, from 1.1 µm to 2 µm, from 200 nm to 500 nm, from 500 nm to 800 nm, from 800 nm to 1.1 µm, from 1.1 µm to 1.4 µm, from 1.4 µm to 1.7 µm, from 1.7 µm to 2 µm, from 300 nm to 1.8 µm, or from 500 nm to 1.5 µm). The average line thickness can, for example, be determine by electron microscopy.

In some examples, the deposited linear, gammadion, and/or U-shaped metal particle can have an average height (e.g., dimension of the particle measured perpendicular to the plane of the plasmonic substrate) of 100 nm or more (e.g., 110 nm or more, 120 nm or more, 130 nm or more, 140 nm or more, 150 nm or more, 160 nm or more, 170 nm or more, 180 nm or more, 190 nm or more, 200 nm or more, 210 nm or more, 220 nm or more, 230 nm or more, or 240 nm or more). In some examples, the deposited linear, gammadion, and/or U-shaped metal particle can have an average height or 250 nm or less (e.g., 240 nm or less, 230 nm or less, 220 nm or less, 210 nm or less, 200 nm or less, 190 nm or less, 180 nm or less, 170 nm or less, 160 nm or less, 150 nm or less, 140 nm or less, 130 nm or less, 120 nm or less, or 110 nm or less). The average height of the deposited linear, gammadion, and/or U-shaped metal particle can range from any of the minimum values described above to any of the maximum values described above. For example, the deposited linear, gammadion, and/or U-shaped metal particle can have an average height of from 100 nm to 250 nm (e.g., from 100 nm to 180 nm, from 180 nm to 250 nm, from 100 nm to 150 nm, from 150 nm to 200 nm, from 200 nm to 250 nm, or from 110 nm to 240 nm). The average height of the deposited metal particle can, for example, be determined by atomic force microscopy.

In some examples, illuminating the first location of the optothermal substrate further: generates a bubble at a location in the liquid sample proximate to the first location of the optothermal substrate, the bubble having a gas-liquid interface with the liquid sample, and the bubble being within the confinement region; such that: trapping at least a portion of the plurality thermally reducible metal ions within the confinement region comprises trapping at least a portion of the plurality of thermally reducible metal ions at the gas-liquid interface of the bubble and the liquid sample; and the deposited metal particle comprises a substantially ring shaped particle having an average inner diameter, an average outer diameter, an average wall thickness defined by the difference between the average outer diameter and the average inner diameter, and an average height. In some examples, the reaction rate can be increased when a bubble is formed. For example, the metal particle deposited when a bubble is formed can be deposited in a shorted amount of time than the metal particle deposited in the absence of a bubble. In some examples, the increase in reaction rate in the presence of the bubble can be due to a relatively larger increase in the local concentration of the thermally reducible metal ions in the presence of the bubble.

In some examples, the bubble is generated by plasmon-enhanced photothermal effects. The bubble can, for example, have a diameter of 100 nm or more (e.g., 150 nm or more, 200 nm or more, 250 nm or more, 300 nm or more, 350 nm or more, 400 nm or more, 450 nm or more, 500 nm or more, 650 nm or more, 700 nm or more, 750 nm or more, 800 nm or more, 850 nm or more, 900 nm or more, 950 nm or more, 1 µm or more, 2 µm or more, 3 µm or more, 4 µm or more, 5 µm or more, 6 µm or more, 7 µm or more, 8 µm or more, 9 µm or more, 10 µm or more, 20 µm or more, 30 µm or more, 40 µm or more, 50 µm or more, 60 µm or more, 70 µm or more, 80 µm or more, or 90 µm or more). In some examples, the bubble can have a diameter of 100 µm or less (e.g., 90 µm or less, 80 µm or less, 70 µm or less, 60 µm or less, 50 µm or less, 40 µm or less, 30 µm or less, 20 µm or less, 10 µm or less, 9 µm or less, 8 µm or less, 7 µm or less, 6 µm or less, 5 µm or less, 4 µm or less, 3 µm or less, 2 µm or less, 1 µm or less, 950 nm or less, 900 nm or less, 850 nm or less, 800 nm or less, 750 nm or less, 700 nm or less, 650 nm or less, 600 nm or less, 550 nm or less, 500 nm or less, 450 nm or less, 400 nm or less, 350 nm or less, 300 nm or less, 250 nm or less, 200 nm or less, or 150 nm or less).

The diameter of the bubble can range from any of the minimum values described above to any of the maximum values described above. For example, the bubble can have a diameter of from 100 nm to 50 µm (e.g., from 500 nm to 50 µm, from 100 nm to 25 µm, from 100 nm to 10 µm, from 100 nm to 5 µm, or from 100 nm to 1 µm). The diameter of the bubble can, for example, be controlled by the power density of the electromagnetic radiation used to illuminate the optothermal substrate. The diameter of the bubble can be selected in view of a number of factors. In some examples, the diameter of the bubble can be selected relative to the desired average inner diameter, average outer diameter, average wall thickness, and/or average height. of the deposited substantially ring-shaped particle.

The substantially ring shaped particle can, for example, have an average inner diameter of 250 nm or more (e.g., 275 nm or more, 300 nm or more, 325 nm or more, 350 nm or more, 375 nm or more, 400 nm or more, 425 nm or more, 450 nm or more, 475 nm or more, 500 nm or more, 550 nm or more, 600 nm or more, 650 nm or more, 700 nm or more, 750 nm or more, 800 nm or more, 850 nm or more, 900 nm or more, 950 nm or more, 1 µm or more, 1.1 µm or more, 1.2 µm or more, 1.3 µm or more, 1.4 µm or more, 1.5 µm or more, 1.6 µm or more, 1.7 µm or more, 1.8 µm or more, 1.9 µm or more, 2 µm or more, 2.25 µm or more, 2.5 µm or more, or 2.75 µm or more). In some examples, the substantially ring shaped particle can have an average inner diameter of 3 µm or less (e.g., 2.75 µm or less, 2.5 µm or less, 2.25 µm or less, 2 µm or less, 1.9 µm or less, 1.8 µm or less, 1.7 µm or less, 1.6 µm or less, 1.5 µm or less, 1.4 µm or less, 1.3 µm or less, 1.2 µm or less, 1.1 µm or less, 1 µm or less, 950 nm or less, 900 nm or less, 850 nm or less, 800 nm or less, 750 nm or less, 700 nm or less, 650 nm or less, 600 nm or less, 550 nm or less, 500 nm or less, 475 nm or less, 450 nm or less, 425 nm or less, 400 nm or less, 375 nm or less, 350 nm or less, 325 nm or less, or 300 nm or less). The average inner diameter of the substantially ring shaped particle can range from any of the minimum values described above to any of the maximum values described above. For example, the substantially ring shaped particle can have an average inner diameter of from 250 nm to 3 µm (e.g., from 250 nm to 1.6 µm, from 1.6 µm to 2 µm, from 250 nm to 500 nm, from 500 nm to 750 nm, from 750 nm to 1 µm, from 1 µm to 1.2 µm, from 1.2 µm to 1.4 µm, from 1.4 µm to 1.6 µm, from 1.6 µm to 1.8 µm, from 1.8 µm to 2 µm, from 2 µm to 2.5 µm, from 2.5 µm to 3 µm, from 250 µm to 2 µm, or from 300 nm to 1.5 µm).

In some examples, the substantially ring shaped particle can have an average outer diameter of 700 nm or more (e.g., 750 nm or more, 800 nm or more, 850 nm or more, 900 nm or more, 950 nm or more, 1 µm or more, 1.1 µm or more, 1.2 µm or more, 1.3 µm or more, 1.4 µm or more, 1.5 µm or more, 1.6 µm or more, 1.7 µm or more, 1.8 µm or more, 1.9 µm or more, 2.0 µm or more, 2.1 µm or more, 2.2 µm or more, 2.3 µm or more, 2.4 µm or more, 2.5 µm or more, 2.6 µm or more, 2.7 µm or more, 2.8 µm or more, 2.9 µm or more, 3 µm or more, 3.25 µm or more, 3.5 µm or more, or 3.75 µm or more). In some examples, the substantially ring shaped particle can have an average outer diameter of 4 µm or less (e.g., 3.75 µm or less, 3.5 µm or less, 3.25 µm or less, 3 µm or less, 2.9 µm or less, 2.8 µm or less, 2.7 µm or less, 2.6 µm or less, 2.5 µm or less, 2.4 µm or less, 2.3 µm or less, 2.2 µm or less, 2.1 µm or less, 2.0 µm or less, 1.9 µm or less, 1.8 µm or less, 1.7 µm or less, 1.6 µm or less, 1.5 µm or less, 1.4 µm or less, 1.3 µm or less, 1.2 µm or less, 1.1 µm or less, 1 µm or less, 950 nm or less, 900 nm or less, 850 nm or less, or 800 nm or less). The average outer diameter of the substantially ring shape particle can range from any of the minimum values described above to any of the maximum values described above. For example, the substantially ring shaped particle can have an average outer diameter of from 700 nm to 4 µm (e.g., from 700 nm to 2.3 µm, 2.3 µm to 4 µm, from 700 nm to 1 µm, from 1 µm to 1.3 µm, from 1.3 µm to 1.6 µm, from 1.6 µm to 1.9 µm, from 1.9 µm to 2.2 µm, from 2.2 µm to 2.5 µm, from 2.5 µm to 3 µm, from 3 µm to 3.5 µm, from 3.5 µm to 4 µm, from 700 nm to 3 µm, or from 700 nm to 2.5 µm).

The substantially ring shaped particle can, for example, have an average a wall thickness of 150 nm or more (e.g., 175 nm or more, 200 nm or more, 225 nm or more, 250 nm or more, 275 nm or more, 300 nm or more, 325 nm or more, 350 nm or more, 375 nm or more, 400 nm or more, 425 nm or more, 450 nm or more, 475 nm or more, 500 nm or more, 550 nm or more, 600 nm or more, 650 nm or more, 700 nm or more, or 750 nm or more). In some examples, the substantially ring shaped particle can have an average wall thickness of 800 nm or less (e.g., 750 nm or less, 700 nm or less, 650 nm or less, 600 nm or less, 550 nm or less, 500 nm or less, 475 nm or less, 450 nm or less, 425 nm or less, 400 nm or less, 375 nm or less, 350 nm or less, 325 nm or less, 300 nm or less, 275 nm or less, 250 nm or less, 225 nm or less, or 200 nm or less). The average wall thickness of the substantially ring shaped particle can range from any of the minimum values described above to any of the maximum values described above. For example, the substantially ring shaped particle can have an average wall thickness of from 150 nm to 800 nm (e.g., from 150 nm to 475 nm, from 475 nm to 800 nm, from 150 nm to 350 nm, from 350 nm to 550 nm, from 550 nm to 800 nm, from 150 nm to 700 nm, from 150 nm to 600 nm, or from 150 nm to 500 nm). The average inner diameter, average outer diameter, and average wall thickness of the substantially ring-shaped particle can, for example, be determined by electron microscopy.

In some examples, the substantially ring shaped particle can have an average height of 100 nm or more (e.g., 110 nm or more, 120 nm or more, 130 nm or more, 140 nm or more, 150 nm or more, 160 nm or more, 170 nm or more, 180 nm or more, 190 nm or more, 200 nm or more, 210 nm or more, 220 nm or more, 230 nm or more, or 240 nm or more). In some examples, the substantially ring shaped particle can have an average height of 250 nm or less (e.g., 240 nm or less, 230 nm or less, 220 nm or less, 210 nm or less, 200 nm or less, 190 nm or less, 180 nm or less, 170 nm or less, 160 nm or less, 150 nm or less, 140 nm or less, 130 nm or less, 120 nm or less, or 110 nm or less). The average height of the substantially ring shaped particle can range from any of the minimum values described above to any of the maximum values described above. For example, the substantially ring shaped particle can have an average height of from 100 nm to 250 nm (e.g., from 100 nm to 180 nm, from 180 nm to 250 nm, from 100 nm to 150 nm, from 150 nm to 200 nm, from 200 nm to 250 nm, or from 110 nm to 240 nm). The average height of the substantially ring shaped particle can, for example, be determined by atomic force microscopy.

The methods can further comprise, for example, illuminating a second location of the optothermal substrate thereby: generating a second confinement region at a location in the liquid sample proximate to the second location of the optothermal substrate, wherein at least a portion of the second confinement region has a third temperature that is greater than the first temperature such that the second confinement region is bound by a temperature gradient; trapping at least a second portion of the plurality of thermally reducible metal ions within the second confinement region; and thermally reducing the trapped portion of the plurality of thermally reducible metal ions to thereby deposit a second metal particle comprising the reduced metal ions on the optothermal substrate at the second location. As used herein, "a second location" and "the second location" are meant to include any number of locations in any arrangement on the optothermal substrate. Thus, for example "a second location" includes one or more second locations. In some embodiments, the second location can comprise a plurality of locations. In some embodiments, the second location can comprise a plurality of locations arranged in an ordered array. As used herein, "a second metal particle," "a second deposited metal particle," "the second metal particle," and "the second deposited metal particle" are meant to include any number of particles deposited in any arrangement on the optothermal substrate. Thus, for example "a second metal particle" includes one or more metal particles. In some embodiments, the second deposited metal particle can comprise a plurality of deposited metal particles. In some embodiments, the second deposited metal particle can comprise a plurality of metal particles deposited in an ordered array. In some examples, the plurality of second deposited metal particles can be substantially monodisperse.

In some examples, the optothermal substrate, the light source, the mirror, or a combination thereof can be translocated to illuminate the second location. As used herein translocating refers to any type of movement about any axis (e.g., rotation, translation, etc.) In other words, as used herein, translocation refers to a change in position and/or orientation.

In some examples, illuminating the second location of the optothermal substrate further: generates a second bubble at a location in the liquid sample proximate to the second location of the optothermal substrate, the second bubble having a gas-liquid interface within the sample, and the second bubble being within the second confinement region; such that: trapping at least a second portion of the plurality thermally reducible metal ions within the second confinement region comprises trapping at least a second portion of the plurality of thermally reducible metal ions at the gas-liquid interface of the second bubble and the liquid sample; and the second deposited metal particle comprises a second substantially ring shaped particle.

In some examples, the methods can further comprise annealing the deposited metal particle and the second deposited metal particle, if present. The deposited metal particle and the second deposited metal particle, if present, can, for example, be annealed in a vacuum. In some examples, the deposited metal particle and the second deposited metal particle, if present, can be annealed in an annealing gas. The annealing gas can, for example, be air, Ar, $N_2$, $H_2$, or combinations thereof.

In some examples, the deposited metal particle and the second deposited metal particle, if present, can be annealed at a temperature of 100° C. or more (e.g., 110° C. or more, 120° C. or more, 130° C. or more, 140° C. or more, 150° C. or more, 160° C. or more, 170° C. or more, 180° C. or more, or 190° C. or more). In some examples, the deposited metal particle and the second deposited metal particle, if present, can be annealed at a temperature of 200° C. or less (e.g., 190° C. or less, 180° C. or less, 170° C. or less, 160° C. or less, 150° C. or less, 140° C. or less, 130° C. or less, 120° C. or less, or 110° C. or less). The temperature at which the deposited metal particle and the second deposited metal particle, if present, is/are annealed can range from any of the minimum values described above to any of the maximum values described above. For examples, the deposited metal particle and the second deposited metal particle can be annealed at a temperature of from 100° C. to 200° C. (e.g., from 100° C. to 150° C., from 150° C. to 200° C., from 100° C. to 120° C., from 120° C. to 140° C., form 140° C. to 160° C., from 160° C. to 180° C., from 180° C. to 200° C., from 100° C. to 180° C., from 100° C. to 140° C., or from 110° C. to 130° C.). In some examples, the deposited metal particle and the second deposited metal particle, if present, can be annealed at a temperature of 120° C.

In some examples, the deposited metal particle and the second deposited metal particle, if present, can be annealed for 1 hour or more (e.g., 1.25 hours or more, 1.5 hours or more, 1.75 hours or more, 2 hours or more, 2.25 hours or more, 2.5 hours or more, 2.75 hours or more, 3 hours or more, 3.25 hours or more, or 3.5 hours or more). In some examples, the deposited metal particle and the second deposited metal particle, if present, can be annealed for 4 hours or less (e.g., 3.75 hours or less, 3.5 hours or less, 3.25 hours or less, 3 hours or less, 2.75 hours or less, 2.5 hours or less, 2.25 hours or less, 2 hours or less, 1.75 hours or less, or 1.5 hours or less). The time for which the deposited metal particle and the second deposited metal particle, if present, is/are annealed can range from any of the minimum values described above to any of the maximum values described above. For example, the deposited metal particle and the second deposited metal particle, if present, can be annealed for from 1 hour to 4 hours (e.g., from 1 hour to 2.5 hours, from 2.5 hours to 4 hours, from 1 hour to 2 hours, from 2 hours to 3 hours, from 3 hours to 4 hours, or from 1 hour to 3 hours). In some examples, the deposited metal particle and the second deposited metal particle, if present, are annealed for 1.5 hours.

In some examples, the methods can be repeated such that an array comprising a plurality of the metal particles is deposited on the optothermal substrate. In some examples, the array of the plurality of deposited metal particles can be annealed. In some examples, the plurality of deposited metal particles of the array can be substantially monodisperse.

Also disclosed herein are patterned substrate made using the methods described herein. Also disclosed herein are methods of use of patterned substrates made using the methods described herein, for example using the patterned substrates for single-particle sensing, functional optical devices, or combinations thereof. In some examples, the patterned sample can be used for surface-enhanced Raman spectroscopy (SERS), surface-enhanced infrared Raman spectroscopy (SEIRS), or a combination thereof. In some examples, the patterned substrate can be used for sensing in a microfluidic device. Also disclosed herein are methods of use of the patterned substrate, for example, in catalysis. In some examples, the patterned substrate can have an inverse-opal configuration. In some examples, the patterned substrate having an inverse-opal configuration can be used in high-surface areal catalysis.

Also disclosed herein are microfluidic devices comprising a channel defining a path for fluid flow from a fluid inlet to a fluid outlet, and the patterned sample disposed within the channel. In some examples, the patterned sample can be made in situ within the channel of the microfluidic device by any of the meth described herein.

Also disclosed herein are methods of detecting an analyte comprising flowing fluid along the channel of the microfluidic devices described herein, thereby contacting the analyte with the patterned sample, and spectroscopically detecting the analyte in contact with the patterned sample. The analyte can, for example, comprise Rhodamine 6G, Crystal Violet, 2,4,6-trinitrotoluene, or a combination thereof. In some examples, spectroscopically detecting the analyte comprises surface-enhanced Raman spectroscopy (SERS), surface-enhanced infrared Raman spectroscopy (SEIRS), or a combination thereof.

Also disclosed herein are systems for performing the methods described herein. Referring now to FIG. 1, the systems 100 can comprise an optothermal substrate 102 in thermal contact with a liquid sample 104 comprising a plurality of thermally reducible metal ions 106, the liquid sample 104 having a first temperature; and a light source 108 configured to illuminate the optothermal substrate 102 at a first location 110 with electromagnetic radiation. In some examples, the system 100 can include a single light source 108. In other examples, more than one light source 108 can be included in the system 100.

In some examples, the systems can further comprise a means for translocating the optothermal substrate 102 and/or the light source 108.

Figure 2:
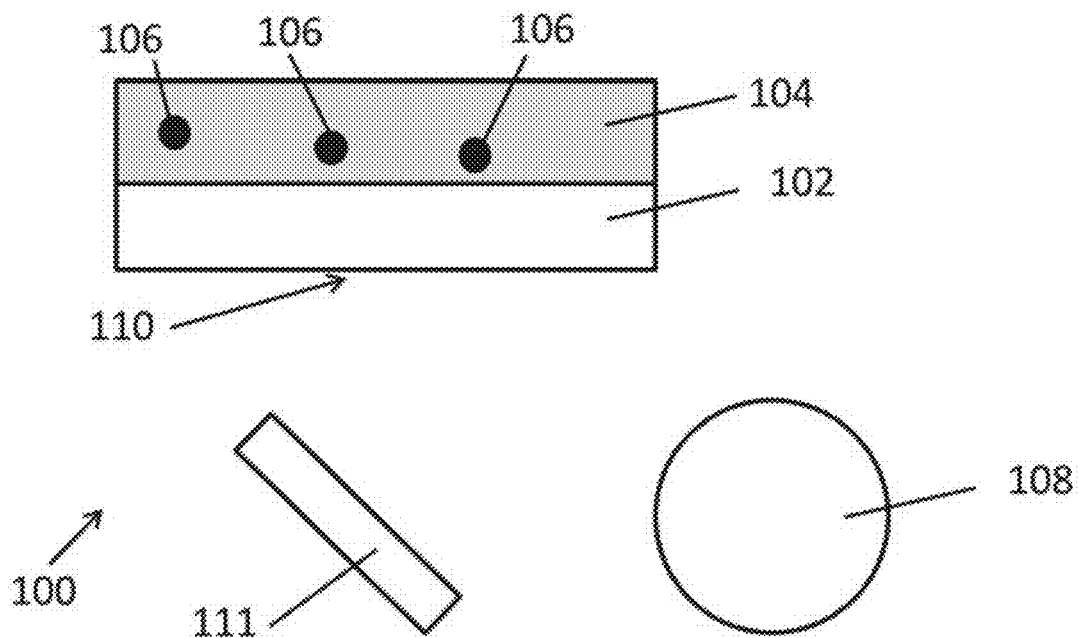
FIG. 2 is a schematic of an exemplary system as disclosed herein for lithography.

Referring now to FIG. 2, the system 100 can, in some examples, further comprise a mirror 111, wherein the system 100 can be aligned such that the light source 108 is configured to illuminate the mirror 111 and the mirror 111 is configured to reflect the electromagnetic radiation from the light source 108 to illuminate the first location 110 of the optothermal substrate 102. In some examples, the system 100 can further comprise a means for translocating the mirror 111.

Figure 3:
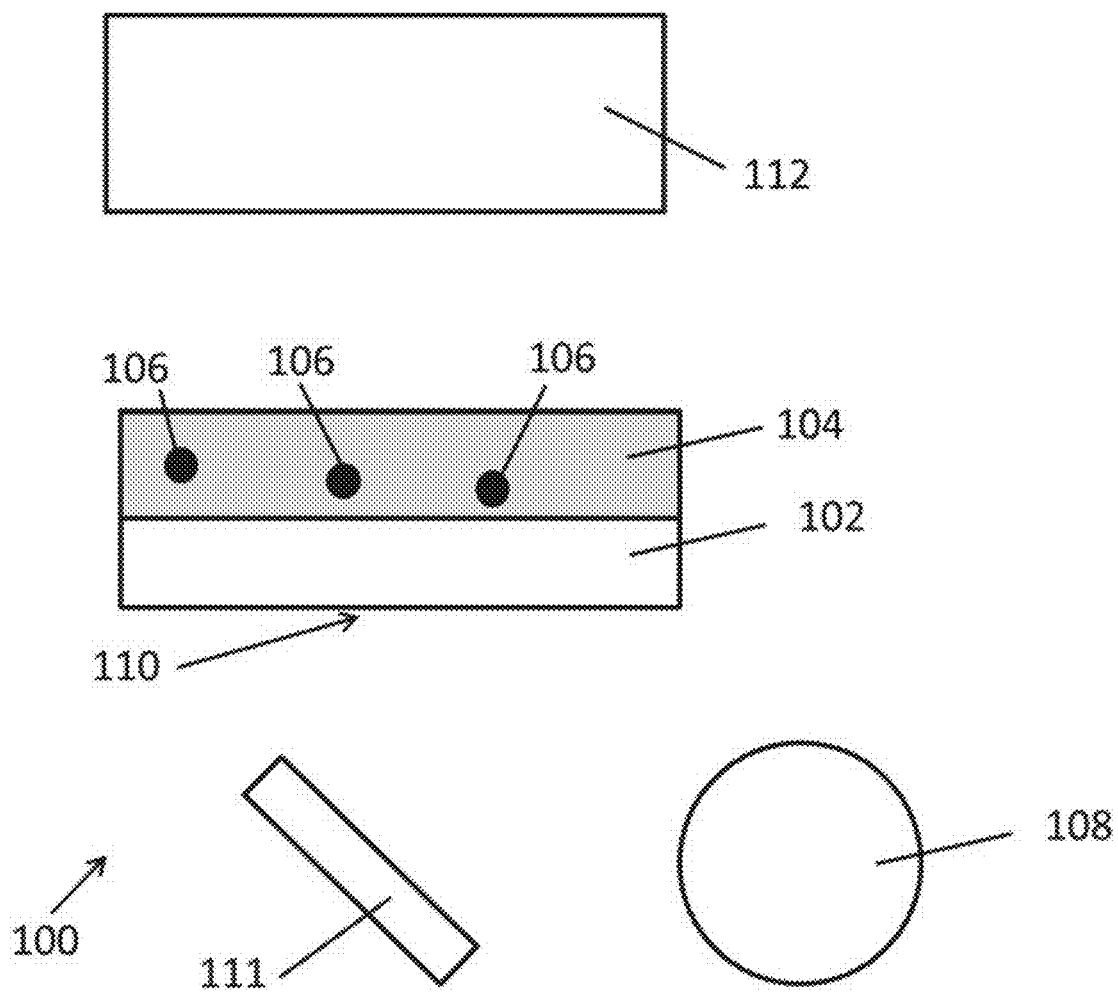
FIG. 3 is a schematic of an exemplary system as disclosed herein for lithography.

Referring now to FIG. 3, the system 100 can, in some examples, further comprise an instrument 112 configured to capture an electromagnetic signal from the optothermal substrate 102.

In some examples, the system 100 can further comprise a first lens 114. The lens can be any type of lens, such as a simple lens, a compound lens, a spherical lens, a toric lens, a biconvex lens, a plano-convex lens, a plano-concave lens, a negative meniscus lens, a positive meniscus lens, a biconcave lens, a converging lens, a diverging lens, a cylindrical lens, a Fresnel lens, a lenticular lens, or a gradient index lens.

Figure 4:
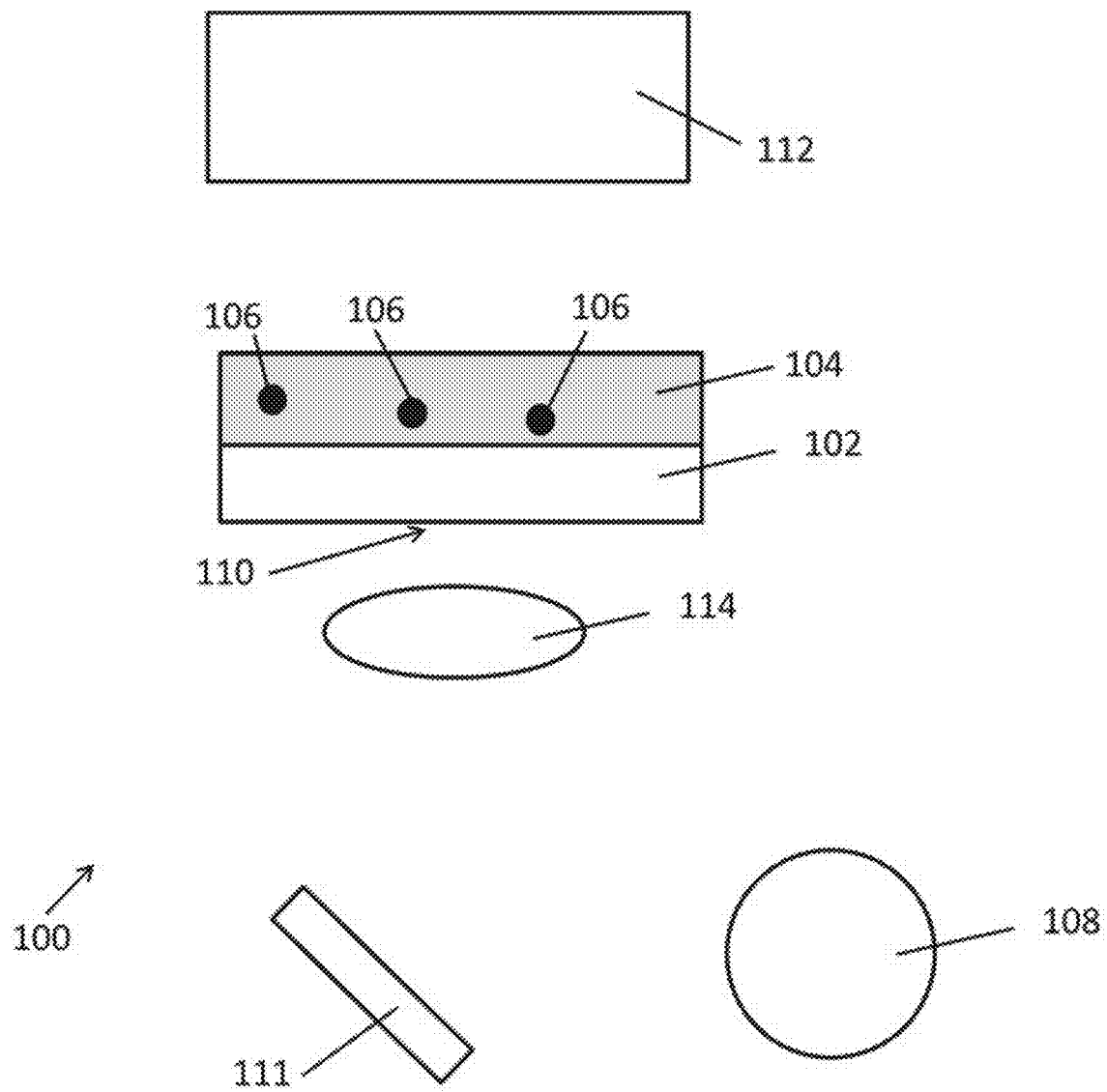
FIG. 4 is a schematic of an exemplary system as disclosed herein for lithography.

Referring now to FIG. 4, in some examples, the system 100 can be configured such that the light source 108 is below the first lens 114 and the optothermal substrate 102 is above the first lens 114.

Figure 5:
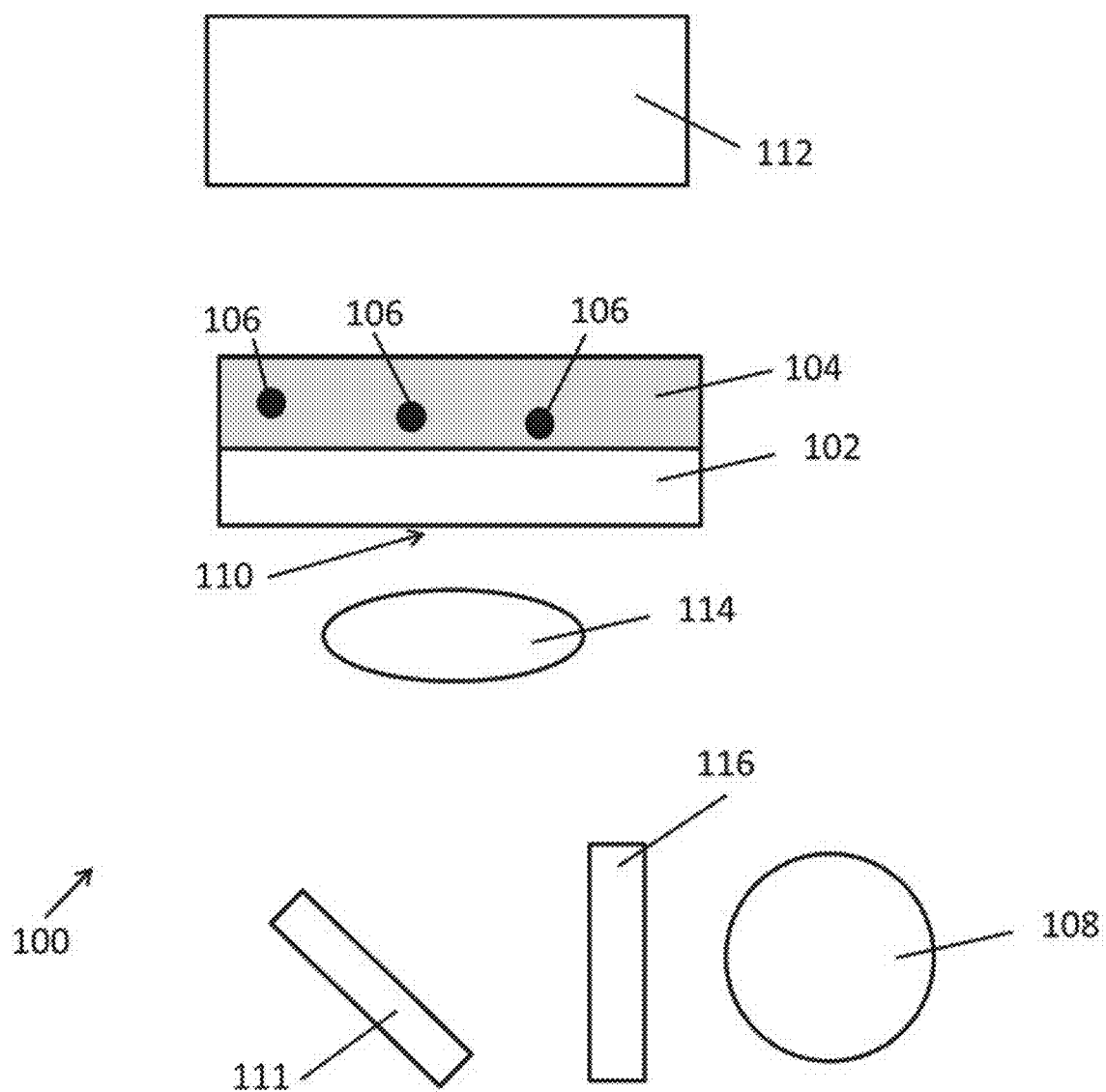
FIG. 5 is a schematic of an exemplary system as disclosed herein for lithography.

In some examples, the systems 100 can further comprise a shutter 116 having an open state and a close state. Referring now to FIG. 5, in some examples, the system 100 is aligned such that the closed state of the shutter 116 interrupts the illumination of the optothermal substrate 102 at the first location 110 by the light source 108.

Figure 6:
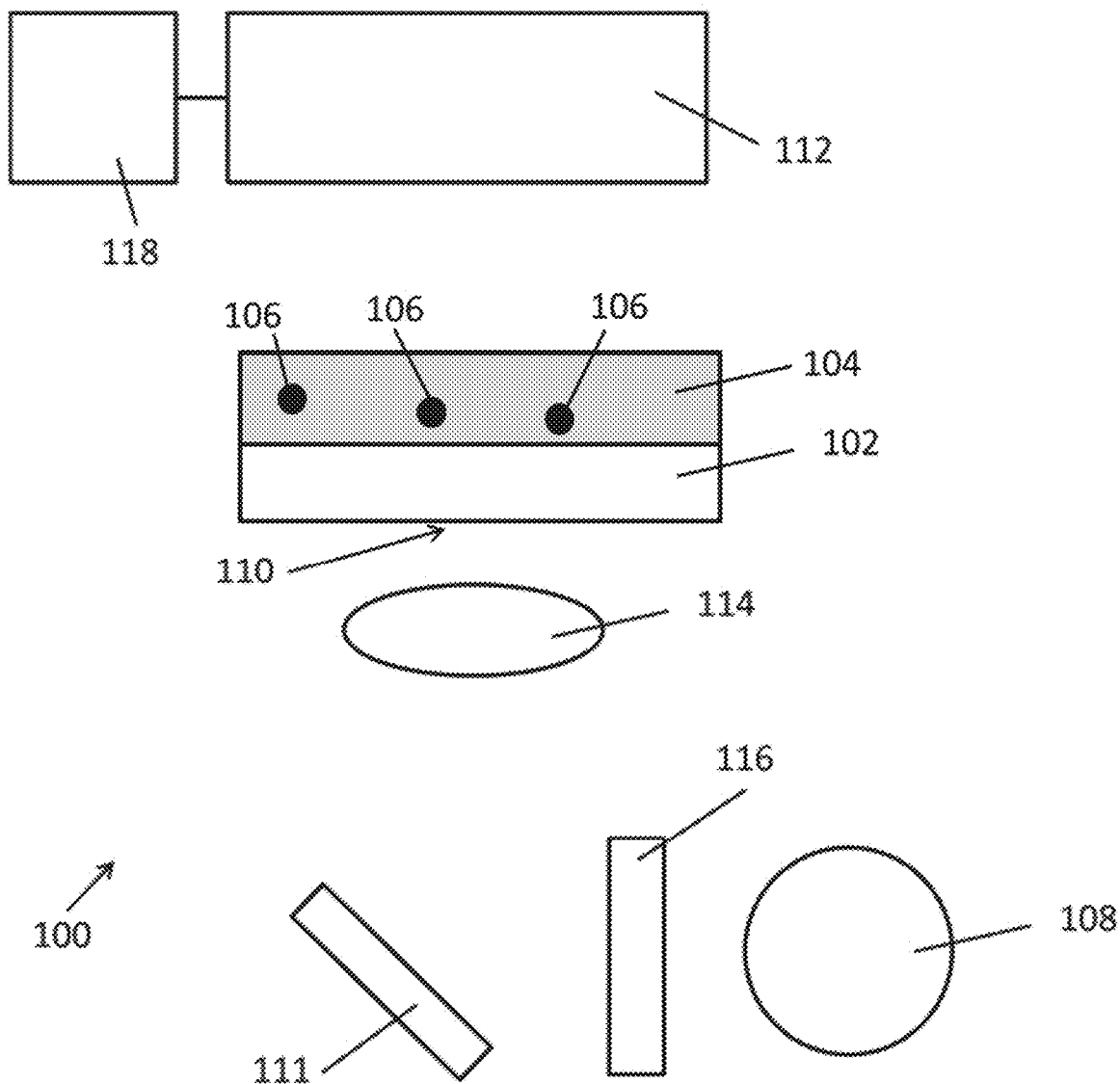
FIG. 6 is a schematic of an exemplary system as disclosed herein for lithography.

In some example, the systems 100 can further comprise a computing device 118 configured to receive and process electromagnetic signals from the instrument 112, for example as shown in FIG. 6.

Figure 7:
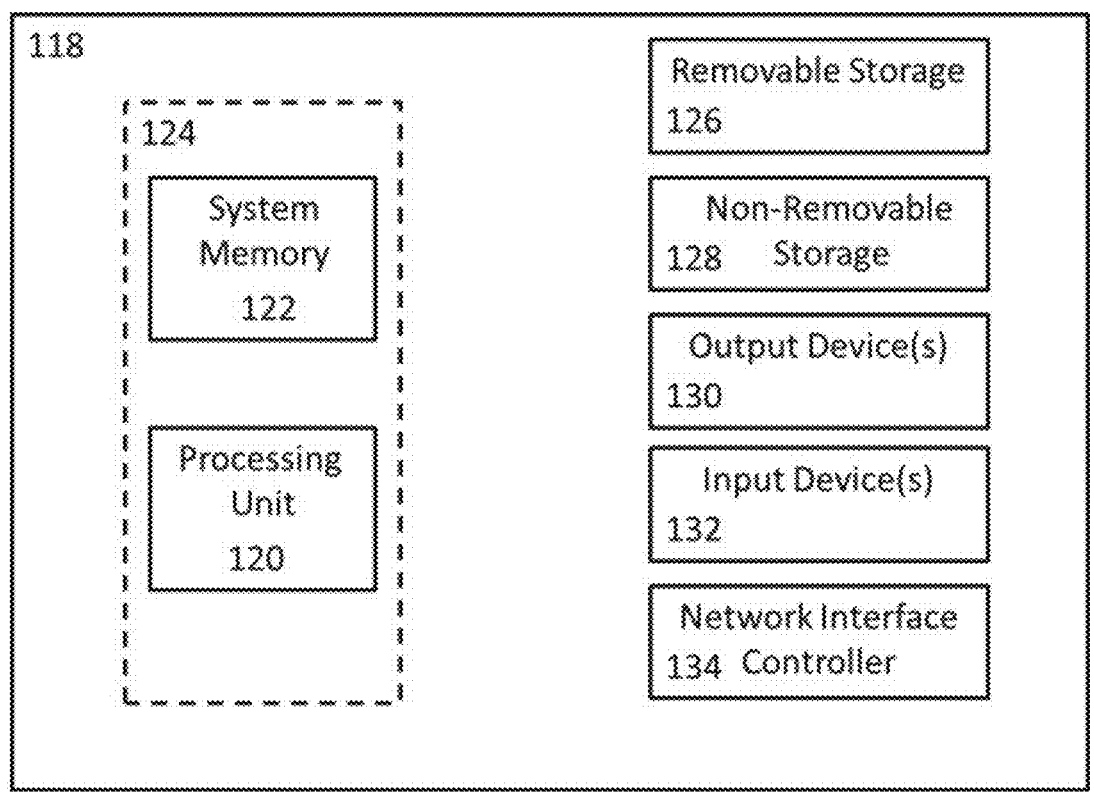
FIG. 7 is a schematic of an exemplary computing device.

FIG. 7 illustrates an example computing device 118 upon which examples disclosed herein may be implemented. The computing device 118 can include a bus or other communication mechanism for communicating information among various components of the computing device 118. In its most basic configuration, computing device 118 typically includes at least one processing unit 120 (a processor) and system memory 122. Depending on the exact configuration and type of computing device, system memory 122 may be volatile (such as random access memory (RAM)), non-volatile (such as read-only memory (ROM), flash memory, etc.), or some combination of the two. This most basic configuration is illustrated in FIG. 6 by a dashed line 124. The processing unit 120 may be a standard programmable processor that performs arithmetic and logic operations necessary for operation of the computing device 118.

The computing device 118 can have additional features/functionality. For example, computing device 118 may include additional storage such as removable storage 126 and non-removable storage 128 including, but not limited to, magnetic or optical disks or tapes. The computing device 118 can also contain network connection(s) 134 that allow the device to communicate with other devices. The computing device 118 can also have input device(s) 132 such as a keyboard, mouse, touch screen, antenna or other systems configured to communicate with the camera in the system described above, etc. Output device(s) 130 such as a display, speakers, printer, etc. may also be included. The additional devices can be connected to the bus in order to facilitate communication of data among the components of the computing device 118.

The processing unit 120 can be configured to execute program code encoded in tangible, computer-readable media. Computer-readable media refers to any media that is capable of providing data that causes the computing device 118 (i.e., a machine) to operate in a particular fashion. Various computer-readable media can be utilized to provide instructions to the processing unit 120 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 120 can execute program code stored in the system memory 122. For example, the bus can carry data to the system memory 122, from which the processing unit 120 receives and executes instructions. The data received by the system memory 122 can optionally be stored on the removable storage 126 or the non-removable storage 128 before or after execution by the processing unit 120.

The computing device 118 typically includes a variety of computer-readable media. Computer-readable media can be any available media that can be accessed by device 118 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 122, removable storage 126, and non-removable storage 128 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 118. Any such computer storage media can be part of computing device 118.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In certain examples, system memory 122 comprises computer-executable instructions stored thereon that, when executed by the processor 120, cause the processor 120 to receive an electromagnetic signal from the instrument 112, process the electromagnetic signal to obtain a characteristic of the optothermal substrate 102; and output the characteristic of the optothermal substrate 102.

The analysis of signals captured by the instrument can be carried out in whole or in part on one or more computing device. For example, the system may comprise one or more additional computing device.

The instrument can comprise, for example, a camera, an optical microscope, an electron microscope, a spectrometer, or combinations thereof. Examples of spectrometers include, but are not limited to, Raman spectrometers, UV-vis absorption spectrometers, IR absorption spectrometers, fluorescence spectrometers, and combinations thereof.

In some examples, the electromagnetic signal received by the processor from the instrument can comprise an image, a spectrum (e.g., Raman, UV-vis, IR, fluorescence), a micrograph, or combinations thereof. The characteristic of the optothermal substrate can comprise, for example, the presence, location, size, shape, and/or quantity of the metal particle(s) deposited thereon; the presence, location, composition, size, shape, and/or quantity of plasmonic particles comprising the optothermal substrate; the presence and/or quantity of an analyte disposed within the liquid sample; the thickness of the metal film comprising the optothermal substrate; the thickness of the metal oxide film comprising the optothermal substrate; or combinations thereof.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Advancements in the fields of plasmonics and metamaterials have enabled exploration of variable materials, architectures and fabrication protocols to achieve multifunctional substrates for surface-enhanced optical spectroscopies. Metallic rings have been actively explored due to their unique optical, electrical and magnetic properties (Nordlander P. *ACS Nano*. 2009, 3, 488; Aizpurua J et al. *Phys. Rev. Lett*. 2003, 90, 057401; Ye J et al. *Nanotechnology*. 2009, 20, 465203). The metallic ring morphology presents high symmetry and surface area. At the excitation of surface plasmons, a uniformly enhanced electric field exists inside the circular cavity, which benefits biosensors, metamaterials, surface-enhanced optical spectroscopies, and other optical applications. Further integration of the plasmonic structures with microfluidics can be important for applications such as microreactors and point-of-care devices.

Several approaches such as colloidal templating and self-assembly have been applied to fabricate metallic ring-shaped architectures (Chen J et al. *ACS Nano.* 2008, 3, 173; Halpern A R et al. *ACS Nano.* 2013, 7, 1755; Bao Y et al. *ACS Nano.* 2016, 10, 8947). Colloidal templating usually includes multiple steps, including colloidal particle assembly, polishing, metal deposition, and selective etching (Zheng Y et al. *J. Non-Cryst. Solids.* 2006, 352, 2532). In contrast to the template-based techniques, direct-writing processes could enable real-time structural configurability, minimal material wastage, and multi-component integration (Winkler R et al. *ACS Appl. Mater. Inter.* 2016, 9, 8233). However, the dominant direct-writing-based approaches, such as electron beam lithography (Taylor A B et al. *Opt. Express.* 2014, 22, 13234; Wolf 0 et al. *Nat. Commun.* 2015, 6, 7667) and femtosecond laser writing technique (Bagheri S et al. *ACS Photonics.* 2015, 2, 779), still require multi-step processes, which involve resist patterning, metal deposition and selective etching, to achieve the metallic rings. The multi-step processes hinder the in-situ ring fabrication within the microfluidic channels. Laser-writing with a precursor ink is a viable strategy to exploit the full advantages of direct-writing process for in-situ fabrication under various spatial constraints (Xie Y et al. *ACS Nano.* 2014, 8, 12175). However, existing strategies for in-situ synthesis in microfluidic channels have limited control over the structural integrity and morphology of the fabricated micro/nanostructures.

Herein, a "point-and-shoot" technique for single-step site-specific fabrication of Ag rings to realize multi-responsive plasmonic substrates for surface-enhanced optical spectroscopies is described. The technique involves direct synthesis and immobilization of Ag rings over an Au nanoisland (AuNI) substrate from an Ag precursor ink using a laser-generated microbubble. By using the low-temperature reducible Ag ink and controlling the laser-induced microbubble growth via highly-localized optothermal effects, optically active Ag rings with tunable diameters between 1 and 2 μm were fabricated. The ring morphology is defined by the immobilization of thermally reduced Ag from the precursor along the bubble/water interface. Analytical modeling of the immobilization process demonstrates the dynamics of Ag post-nucleation, leading to the formation of the ring structures. The tunable mid-IR and visible responses arise from the Ag rings and the underlying Au nanoislands. The multi-responsive ring-Au nanoisland substrate was employed to sequentially perform surface-enhanced infrared spectroscopy (SEIRS) of 2, 4, 6-trinitrotoluene (TNT) and surface-enhanced Raman spectroscopy (SERS) of rhodamine 6G (R6G) and crystal violet (CV). The above analytes were used as model molecules to establish the multi-mode response of the substrate. Furthermore, in-situ fabrication of Ag rings with a versatile structural and optical control for "point-and-shoot" surface-enhanced optical spectroscopy was demonstrated within a single microfluidic channel.

Experimental Section

Preparation of Ag Precursor Ink:

The Ag precursor ink from Electroninks was prepared as per the previously reported procedure (Roxworthy B J et al. *Nano Lett.* 2012, 12, 796). The solution contains diammine-silver (I) cations, acetate anions and formate anions. At elevated temperatures, the ammonia ligands and the low-boiling-point reactants evaporate.

Preparation of Substrates and Ag Rings:

The Au nanoisland substrate was fabricated by depositing a 4 nm Au thin film on a glass substrate using thermal deposition (Denton Thermal evaporator), followed by thermal annealing at 550° C. for 2 hours. The printing of the Ag rings on the substrates was achieved via programmed movement of the automated stage in conjunction with an optical shutter. The sliver ink is confined over the Au nanoisland substrate within a 500 μm spacer. A 532 nm Coherent Genesis MX laser was used as the incident light source for fabrication. Specifically, a Prior Pro-Scan scientific stage with an x-y resolution of 14 nm was used along with a Thorlabs MFF102 flipper mount as an optical shutter. During the printing process, the stage and shutter were synchronized and controlled through a custom-written LabView code. The site-specific printing of the Ag rings in arrays was achieved by inputting (x, y) coordinates into the program. After the Ag structures were printed, the samples were annealed in a vacuum at 120° C. for 1.5 hours. The annealing step improves the structural integrality of the Ag ring/Au nanoisland substrate, thereby yielding superior sensing performance ($\sigma < 15\%$).

Structural Characterizations:

Scanning electron microscopy (SEM) (FEI Quanta650) and atomic force microscopy (AFM) (Park scientific) were applied for the structural characterizations. AFM operated at a non-contact mode. Energy-dispersive X-ray spectroscopy (EDS) was performed with an EDS detector in the SEM.

Optical Measurements:

A Nikon TiE inverted optical microscope in conjunction with an Andor spectrometer was utilized to obtain the site-specific optical spectra in the visible wavelength regime. A WITec micro-Raman spectrometer (Alpha 300) with an excitation wavelength of 532 nm was used for Raman measurements. The measurements were performed with an incident laser power of 0.7 mW, a laser beam diameter of 2 μm and an acquisition time of 1 s. A Nikon 20× objective was used for the spectra measurements, whereas 100× air objective was utilized for high-resolution Raman mapping. As-purchased Rhodamine 6G (R6G) and Crystal Violet (CV) (Sigma Aldrich) solution (1 mM) were diluted in ethanol to desired concentrations. The R6G and CV solutions were drop-casted (~5 μl) onto the substrates for SERS measurements. The SERS spectra were initially recorded from the WITec system, with the laser centered at the Ag ring. Post-acquisition, the background signal subtracted using the second-derivative technique.

To measure the optical spectra in the infrared regime, a Bruker Vertex v80 FTIR was utilized operating in a step-scan mode. The unpolarized broadband infrared light from a thermal Globar source of the FTIR was modulated by an optical chopper at a frequency of 500 Hz and focused onto the sample surface using an objective. The transmitted signal, which was collimated by two ZnSe lenses, was collected and averaged by a mid-infrared HgCdTe detector and lock-in amplifier, respectively. The transmittance of the Ag ring arrays was normalized to that of the Au nanoisland substrate as background. For the SEIRS of TNT, the Ag ring-Au nanoisland substrate was dipped in a $10^{-8}$ M TNT solution and dried in nitrogen.

Optical Simulations:

Electromagnetic simulations were performed using the finite-difference time-domain (FDTD) method. The commercial software package from Lumerical Solutions was used. The Au nanoisland substrate was imported from a high-resolution SEM image, and the mesh size was chosen as 1 nm. A total-field scattered-field source was applied as normal incident light from the top of the structures. The incident light was linearly polarized for all the simulations. A monitor was placed below the structures to obtain the wavelength-dependent transmitted powers, which were then normalized to obtain the transmission spectra. The refractive index of glass slide was set as 1.52. The optical constants of Au and Ag were obtained from Johnson and Cristy (Aksu S et al. *Adv. Opt. Mater.* 2013, 1, 798). Perfectly matched layers were used as boundary conditions in all directions.

In-Situ Ag Ring Fabrication and Surface-Enhanced Optical Spectroscopy in Microfluidics:

Soft lithography was used to fabricate the polydimethylsiloxane (PDMS) microfluidic channel of one inlet and one outlet. Photo-lithographically patterned photoresist on a silicon wafer was used as a mold for the PDMS channel. Fabrication of the PDMS microfluidic channel involved the following steps: (i) mix resin and cross linker at a ratio of 10:1, (ii) degas the mixture in a vacuum oven at room temperature, (iii) pour the degassed mixture onto the mold to a thickness of 5 mm, and (iv) degas and cure the PDMS at 75° C. for 2 hours. Finally, the PDMS layer was bonded onto the Au nanoisland substrate, which was then placed in an oven at 65° C. overnight. The Au nanoisland substrate was prepared in a similar manner as detailed previously, with a thermal deposition step followed by annealing. The Ag precursor was introduced into the microfluidic channel where the Ag rings were fabricated. The sample was then annealed in a vacuum oven at 120° C. for 1.5 hours. The low-temperature annealing was compatible with the PDMS channel and no structural variation was observed in the channel. R6G solution was introduced to the microfluidic channel for the SERS measurements. A washing step with DI water was performed between the Ag ring printing and the R6G SERS.

Results

Figure 8:
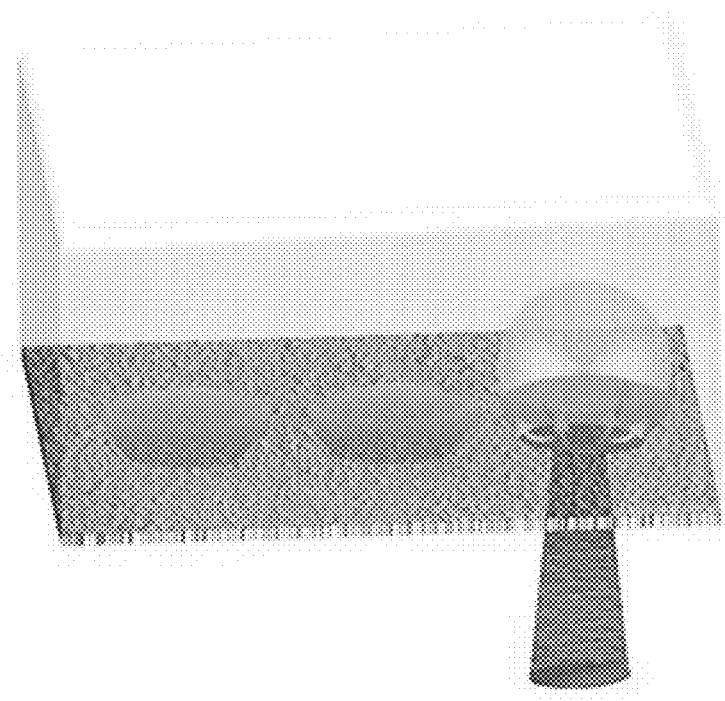
FIG. 8 is an illustration of the bubble-mediated fabrication of Ag rings over the Au nanoisland substrate.
Figure 9:
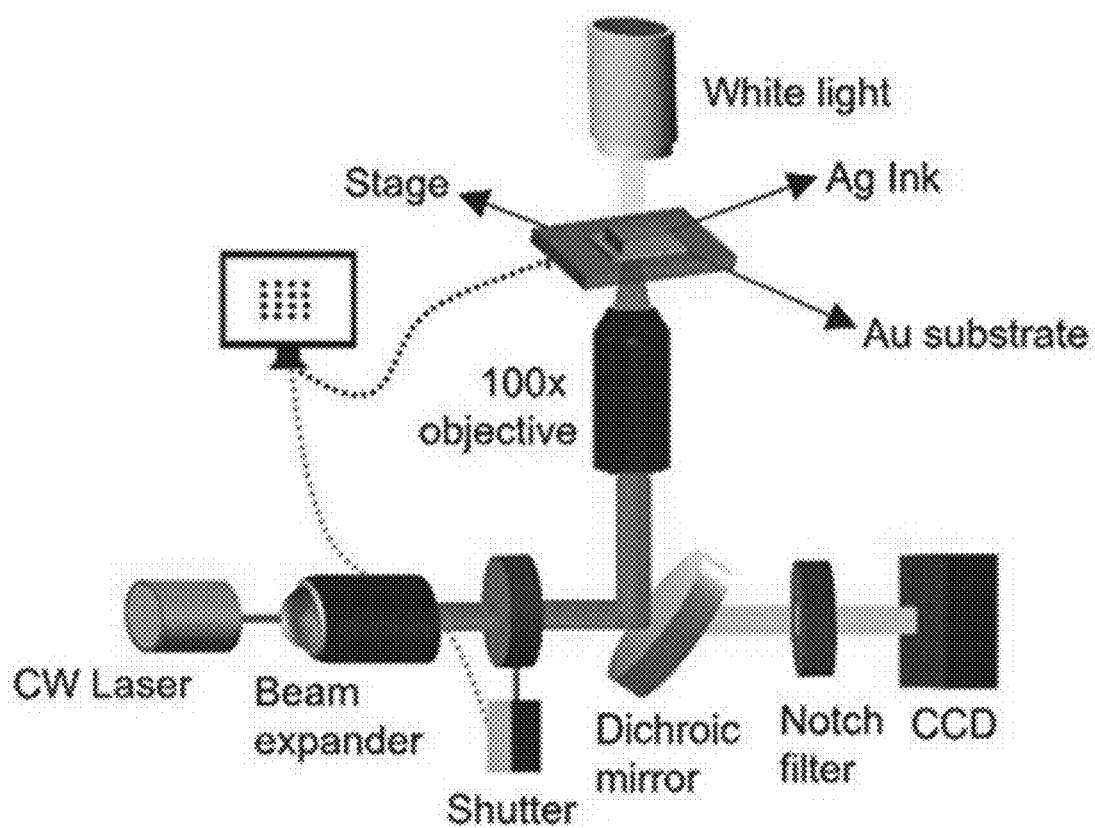
FIG. 9 is a schematic illustration of the optical setup comprising of synchronized automated stage and optical shutter.

FIG. 8 depicts the working mechanism and FIG. 9 depicts the optical setup for the bubble-mediated Ag ring fabrication. The Ag precursor ink was positioned on the Au nanoisland substrate comprising a network of Au nanoparticles (NPs) with an average size of ~30 nm and an inter-particle distance of ~15 nm. Direct synthesis and immobilization of Ag structures on the substrate are achieved via photothermal effects of Au nanoislands upon the excitation of surface plasmons by a continuous-wave laser (532 nm). The laser beam focused on the Au nanoisland substrate results in a highly localized temperature increase due to the non-radiative Landau damping of surface plasmons (Roxworthy B J et al. *Nano Lett.* 2012, 12, 796), which generates a size-controllable microbubble (Lin L et al. *Nano Lett.* 2016, 16, 701; Rajeeva B B et al. *ACS Appl. Mater. Inter.* 2017, 9, 16725; Rajeeva B B et al. *J. Mater. Chem. C.* 2017, 5, 5693). The thermal gradient around the microbubble induces Marangoni convection, which concentrates the $Ag^+$ ions at the bubble surface and thermally reduces the ions into Ag nanoparticles forming a ring-like structure (Fujii S et al. *ACS Appl. Mater. Inter.* 2017, 9, 8413). Thus, the process can be divided into two regimes: (i) reduction and nucleation of $Ag^+$ ions into Ag nanoparticles, and (ii) bubble growth dynamics leading to an Ag ring. The Au nanoisland substrate is placed on an automated stage synchronized with an optical shutter to achieve site-specific fabrication of the Ag rings.

Figure 10:
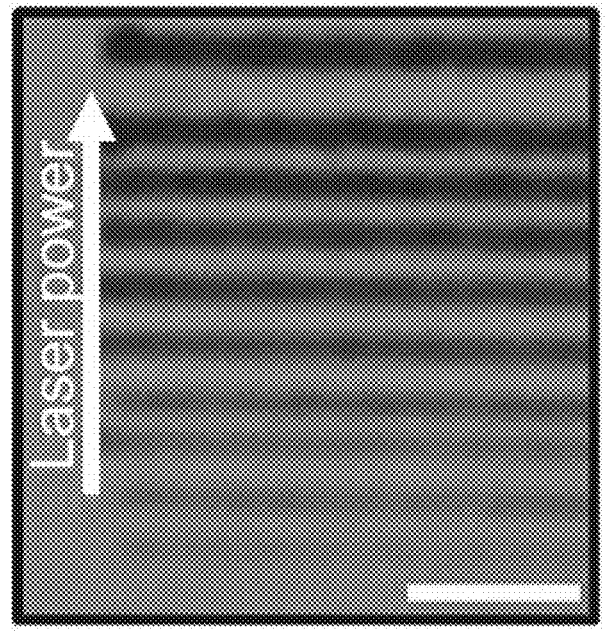
FIG. 10 is an image of the fabrication of Ag lines by a laser beam below the bubble-generation threshold power. The linewidth increases when the laser power is increased from 0.2 mW/$\mu m^2$ to 0.5 mW/$\mu m^2$. The bubble is observable when the laser beam is at the end of the line. Scale bar is 10 µm.
Figure 11:
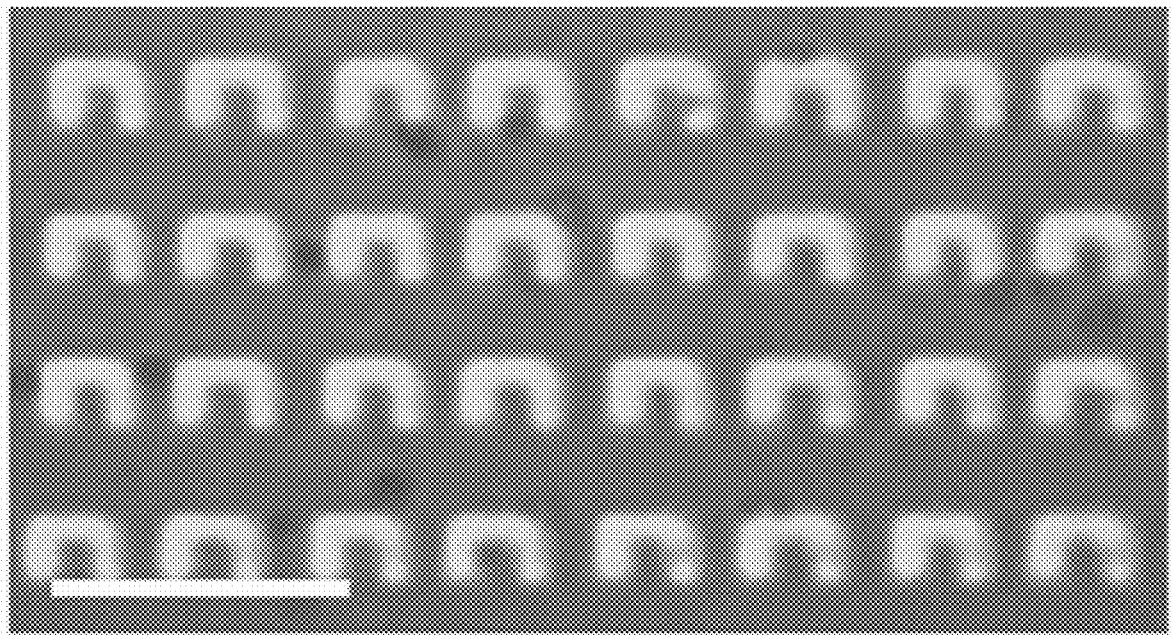
FIG. 11 is an image of an array of Ag inverted-U structures fabricated by a laser beam below the bubble-generation threshold power. Scale bar is 10 µm.
Figure 12:
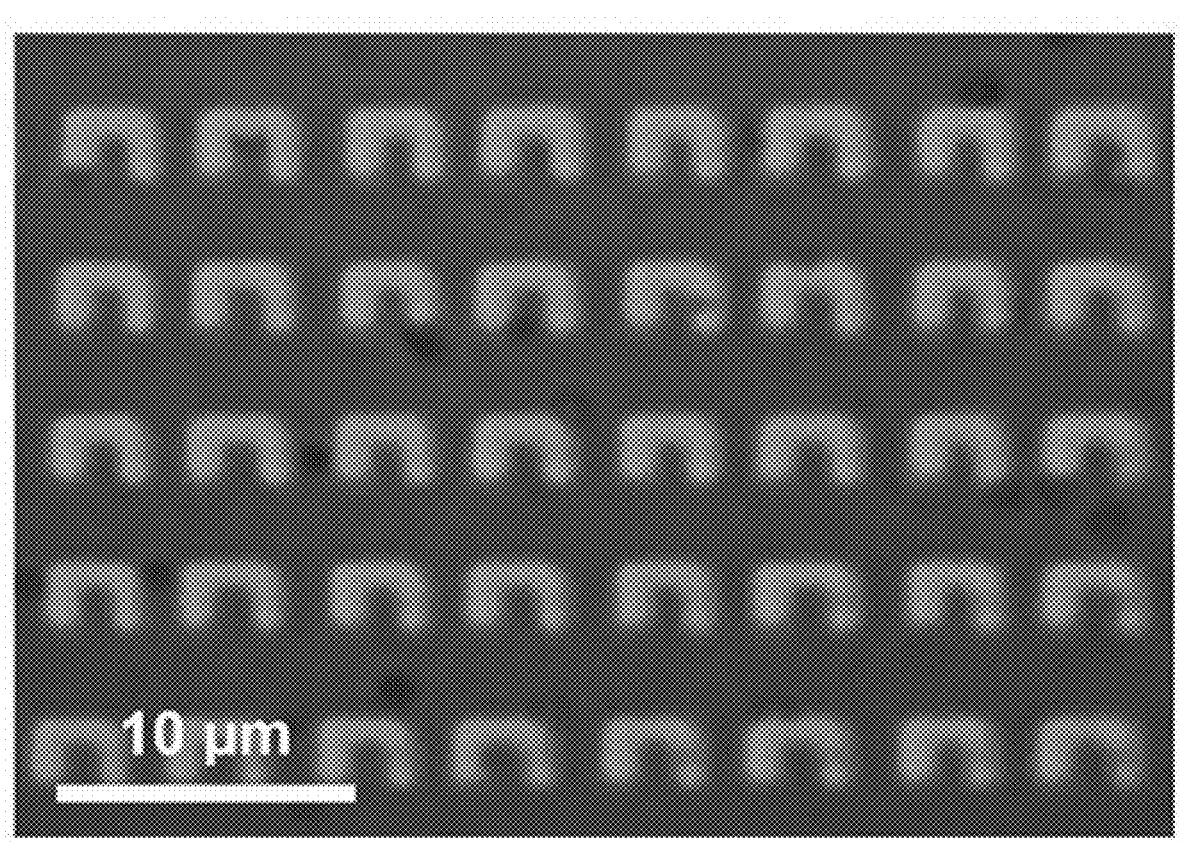
FIG. 12 is a bright-field optical image an array of inverted-U structures with sub-micron linewidth fabricated via bubble writing at the lower laser power (0.35 mW/$\mu m^2$).
Figure 13:
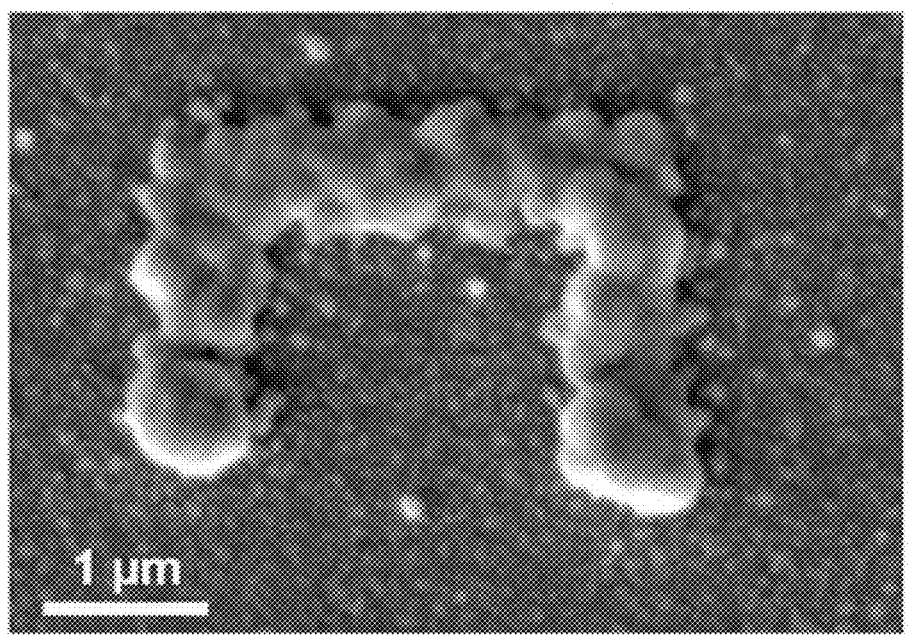
FIG. 13 is a scanning electron microscopy (SEM) image of a single inverted-U structure from the array shown in FIG. 12.
Figure 14:
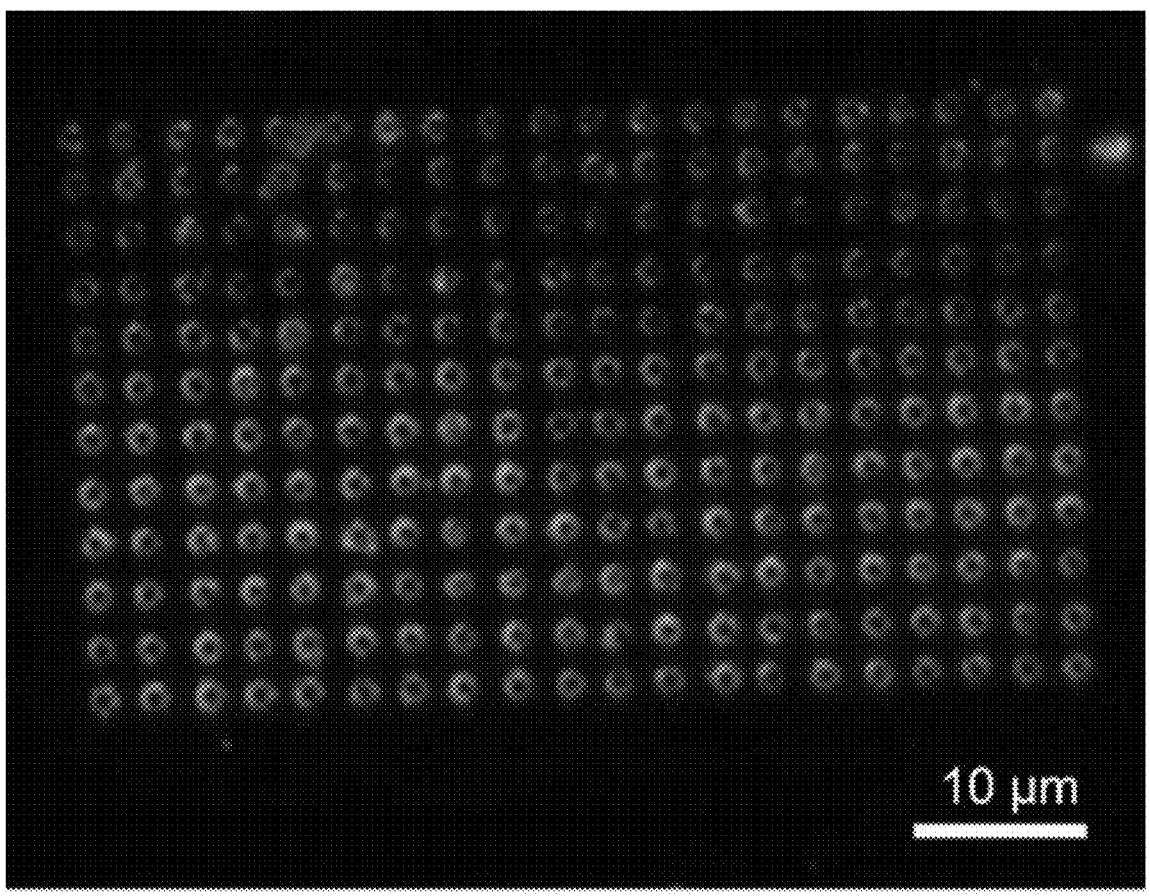
FIG. 14 is a dark-field optical image of an Ag ring array fabricated by microbubble-mediated printing.
Figure 15:
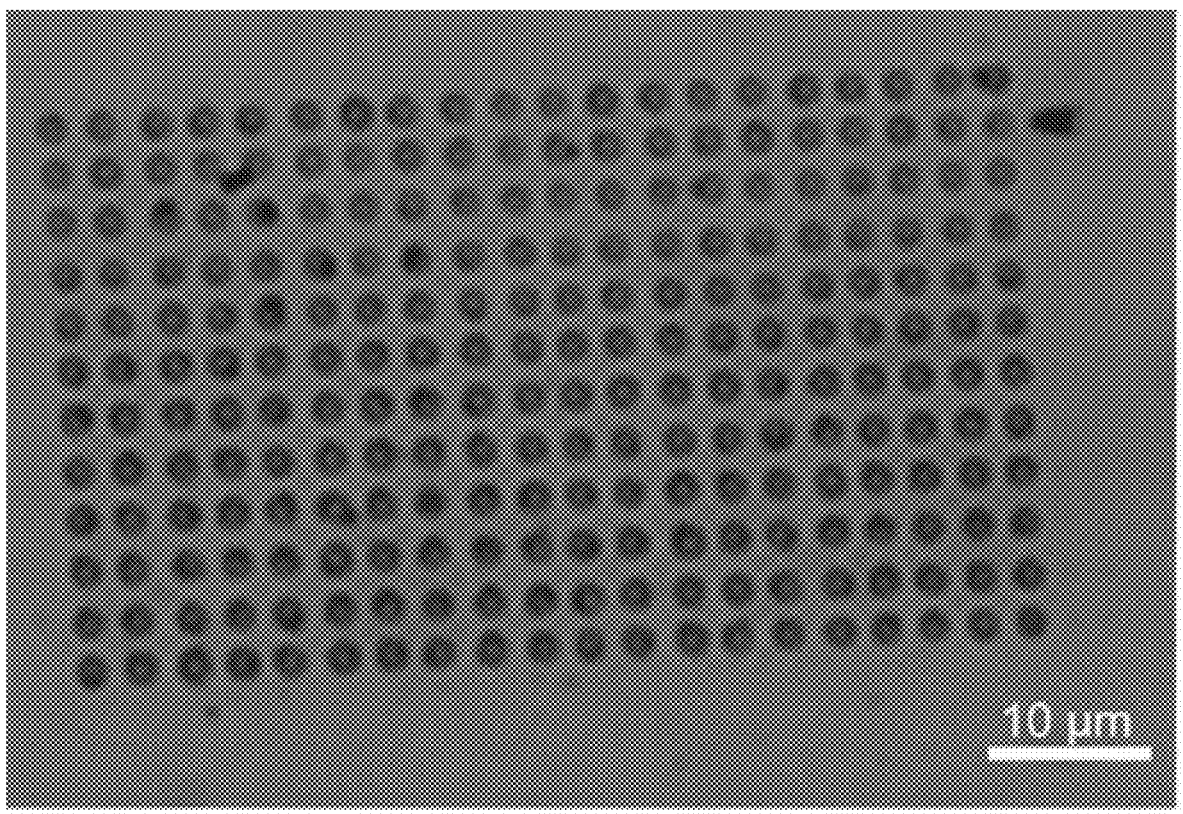
FIG. 15 is a bright-field optical image of an Ag ring array fabricated by microbubble-mediated printing.
Figure 16:
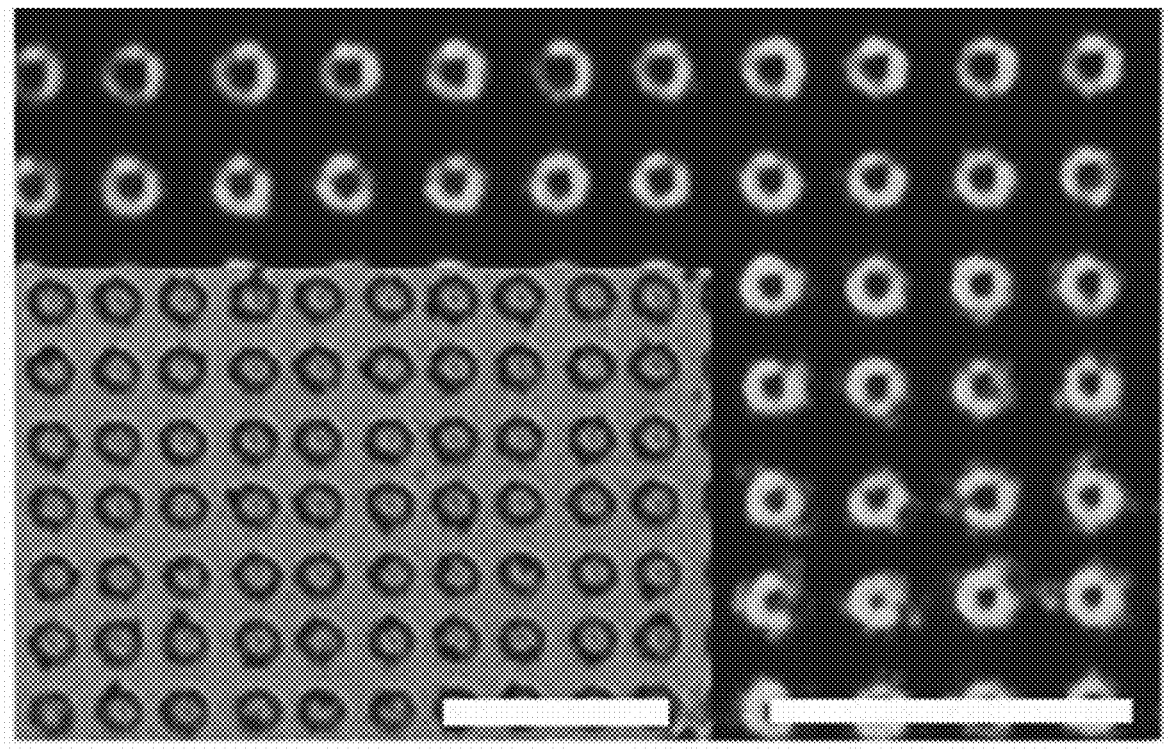
FIG. 16 is a dark-field optical image of an Ag ring array fabricated at a laser power of 0.75 mW/$\mu m^2$. The inset shows the bright-field optical image. Scale bar is 10 µm.
Figure 17:
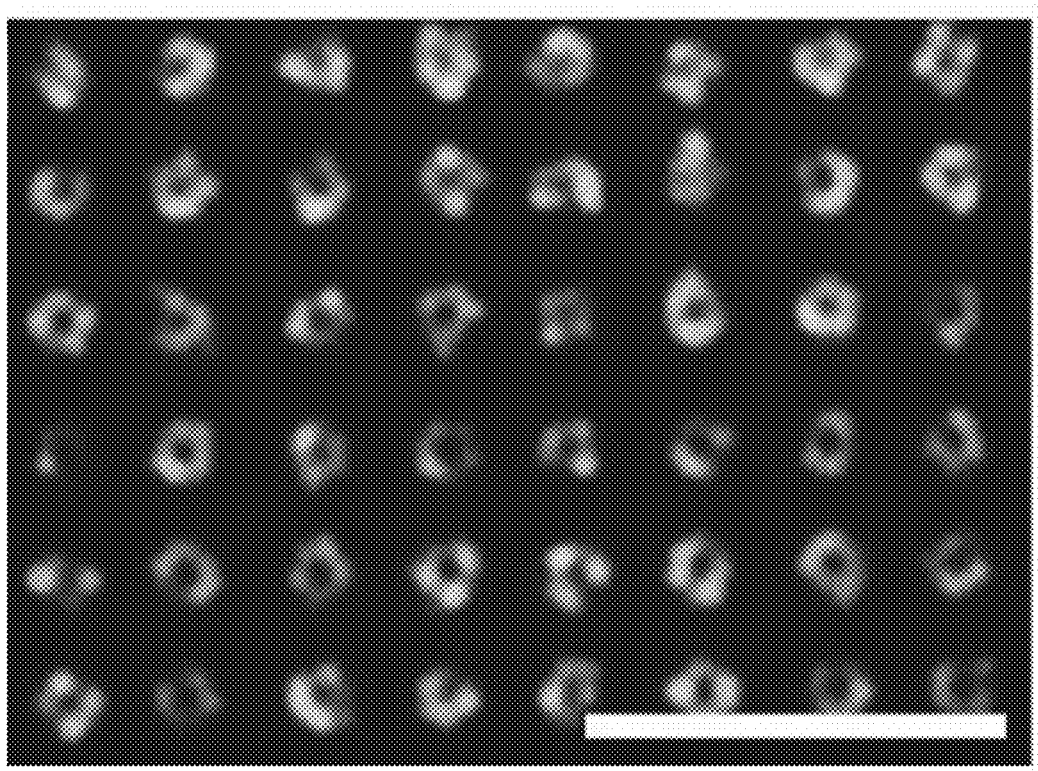
FIG. 17 is a dark-field optical image of an array of Ag rings fabricated using an incident laser power of 0.55 mW/$\mu m^2$. Scale bar is 10 µm.
Figure 18:
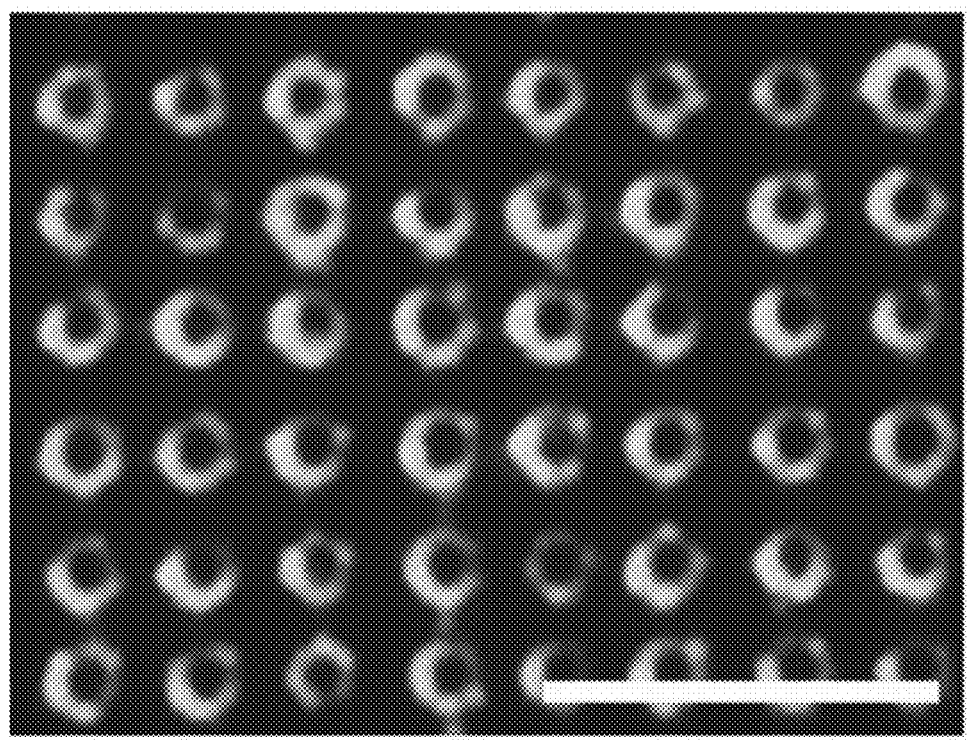
FIG. 18 is a dark-field optical image of an array of Ag rings fabricated using an incident laser power of 0.81 mW/$\mu m^2$. Scale bar is 10 µm.
Figure 19:
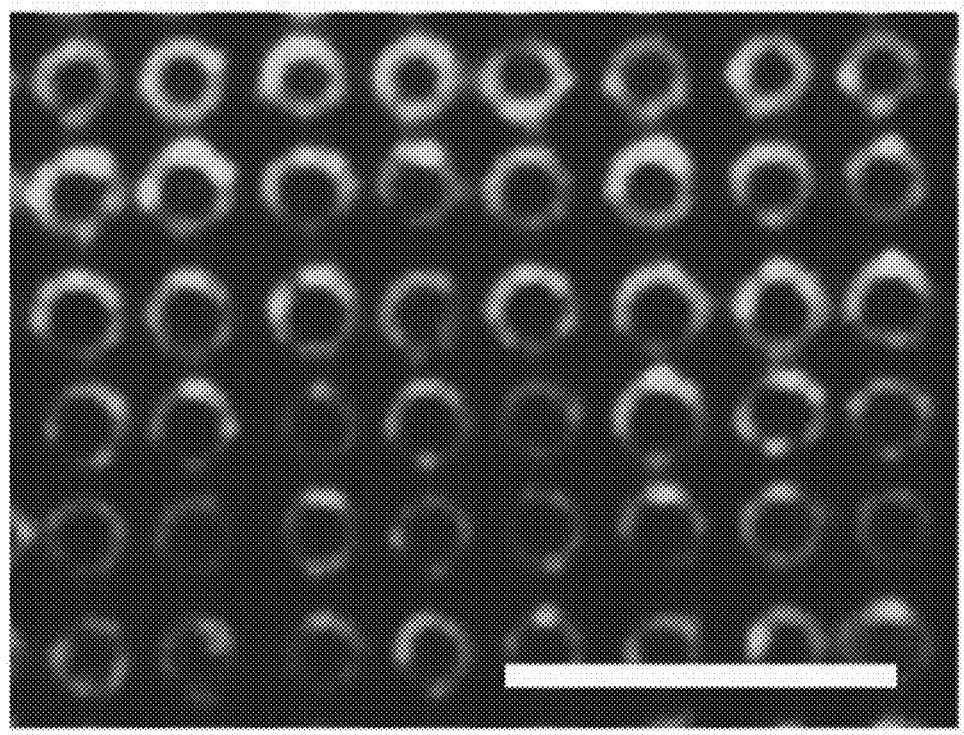
FIG. 19 is a dark-field optical image of an array of Ag rings fabricated using an incident laser power of 0.95 mW/$\mu m^2$. Scale bar is 10 µm.

The Ag precursor ink has a low precipitation temperature of ~85° C., which facilitates the simultaneous reduction and patterning of Ag structures on the Au nanoisland substrate. At relatively lower laser power (<0.5 mW/μm²), conventional photothermal heating at the Au nanoisland substrate leads to continuous Ag lines with a power-dependent linewidth (FIG. 10). The uniform hot-spot distribution at the Au nanoisland substrate sustains a stable temperature increase over a large area, which leads to the consistent linewidth of individual Ag lines. Complex patterns such as gammadion arrays and inverted U-structure arrays with sub-micron linewidth (~0.8 μm) were also fabricated with the direct-printing technique at the lower laser power (FIG. 11-FIG. 13). With an increased power (>0.5 mW/μm²), the laser beam generates microbubbles. The Ag precursor is thermally reduced and deposited along the bubble interfaces to form an Ag ring in a single step. By repeatedly generating isolated individual bubbles at pre-determined locations, an array of Ag rings on the substrate can be created. To limit the growth of the bubble to create small rings of 1-2 μm in diameter, a short stage-waiting time of 350 ms is used at each location. The high-density uniform particles and hot spots at the Au nanoisland substrate enables the consistent fabrication of the uniform Ag rings. An Ag ring array (60 μm×50 μm) with a 3 μm inter-ring spacing along x and y directions is shown in FIG. 14 and FIG. 15. As shown in FIG. 16-FIG. 19, the ring sizes can be controlled by the laser power.

Precise control of the Ag ring structures and optical responses relies on the ability to instantaneously nucleate and immobilize Ag nanoparticles at high spatial resolution. However, the low viscosity (2 mPa·s) of the precursor Ag ink usually limits the printing resolution to several micrometers (Walker S B et al. *J. Am. Chem. Soc.* 2012, 134, 1419). In bubble-mediated printing, the plasmon-enhanced localized thermal field over the Au nanoisland substrate confines the active reaction area at the sub-micron scale to improve the resolution (Enders M et al. *J. Phys. Chem. C.* 2016, 120, 6723). The bubble also concentrates the $Ag^+$ ions at the three-phase contact line via Marangoni convection. The ions are subsequently reduced to Ag according to equation (1).

$$[Ag(NH_3)_2]^+[C_2H_3O_2]^- \rightarrow Ag \qquad (1)$$

High temperatures (>100° C.) arise from the photothermal effects associated with the dense and uniform plasmonic hot spots at the Au nanoisland substrate (Lin L et al. *Nano Lett.* 2016, 16, 701). The high temperature and ion concentration lead to instantaneous (<100 ms) nucleation of Ag. According to classical nucleation theory, the nucleation rate R is given by:

$$R = N_s Z j e^{\frac{-\Delta G}{k_B T}} \qquad (2)$$

where $N_s$ is the density of $Ag^+$ ions, Z is the Zeldovich factor, j is the rate at which molecules attach for the nucleus to grow, $\Delta G$ is the critical free energy of nucleation, $k_B$ is the Boltzmann constant, and T is the absolute temperature. With the reaction primarily confined to the three-phase contact line, the free energy change for the heterogeneous nucleation is given by (Sear R P. *J. Phys. Condens. Matter.* 2007, 19, 033101):

$$\Delta G_{hereto} = \Delta G f(\theta) \qquad (3)$$

$$f(\theta) = \frac{1}{2} - \frac{3}{4} \cos \theta + \frac{1}{4} \cos^3 \theta \qquad (4)$$

where θ is the contact angle. The reduced free energy barrier at the bubble/substrate interface leads to the faster nucleation. The higher ion concentration at the interface reduces the critical nucleus radius, leading to the higher-resolution Ag structures (Sear R P. *J. Phys. Condens. Matter.* 2007, 19, 033101).

To explain the physics behind the Ag ring formation, the force balance on a single Ag particle following the nucleation event was considered. The particle dynamics is governed by an interplay among the surface tension ($F_s$), pressure ($F_p$) and drag force ($F_d$) (Lin L et al. *Nano Lett.* 2016, 16, 701; Zhao C L et al. *Lab Chip.* 2014, 14, 384). The particle accumulation at the bubble interface is also intertwined with the bubble growth dynamics.

The bubble growth dynamics were explored using an analytical model. Briefly, the laser-induced heat at the Au nanoisland substrate generates and grows the bubble. The heat dissipation is factored through an efficiency term ($\eta$) in the model used herein. To model the bubble and Ag ring formation, it was assumed that: (i) the surrounding liquid is at the saturation temperature ($T_{sat}$), (ii) the bubble assumes a hemispherical geometry throughout its growth, and (iii) the laser-generated heat is partly dissipated in the medium. When the liquid is at the saturation temperature, the laser-generated heat is assumed to be used for liquid-to-vapor phase change as per:

$$\dot{q}_{vap} = \dot{m} h_{fg} \tag{5}$$

where $\dot{q}_{vap}$ is the heat associated with bubble formation, $\dot{m}$ is the mass conversion rate of liquid to vapor, and $h_{fg}$ is the latent heat of vaporization. Then, $$\dot{q}_{vap} = \eta P \pi r^2 = \rho \frac{d}{dt}\left(\frac{2}{3}\pi R_b^3\right) h_{fg} \tag{6}$$

where $\eta$ is the efficiency of the process, P is the laser intensity (W/m$^2$), r is the radius of the laser beam (m), $R_b$ is the radius of the bubble, and $\rho$ is the density.

The governing differential equation becomes:

$$R_b^2 \frac{dR_b}{dt} - \frac{\eta P r^2}{2 \rho h_{fg}} = 0 \tag{7}$$

Integrating equation (7) with the initial conditions, $R_b = 0$ when $t = 0$, leads to:

$$R_b^3 = \left(\frac{3 \eta P r^2}{2 \rho h_{fg}}\right) t \tag{8}$$

To non-dimensionalize equation (8), the following scaling was used:

$$R^* = \frac{R_b}{r} \text{ and } t^* = \frac{t}{t'} \tag{9}$$

Substituting these scales into equation (8) gives:

$$R^{*3} = \left(\frac{3 \eta P}{2 \rho r h_{fg}}\right) t' t^* \tag{10}$$

Now, time scale t' was chosen so that the coefficient of t* becomes 1. Thus:

$$t' = \frac{2 \rho h_{fg}}{3 \eta P} \tag{11}$$

Therefore, the following scaling variables can be used to non-dimensionalize the radius of the bubble ($R_b$) and the time (t):

$$R^* = \left(\frac{1}{r}\right) R_b \text{ and } t^* = \left(\frac{3 \eta P}{2 \rho r h_{fg}}\right) t \tag{12}$$

Figure 20:
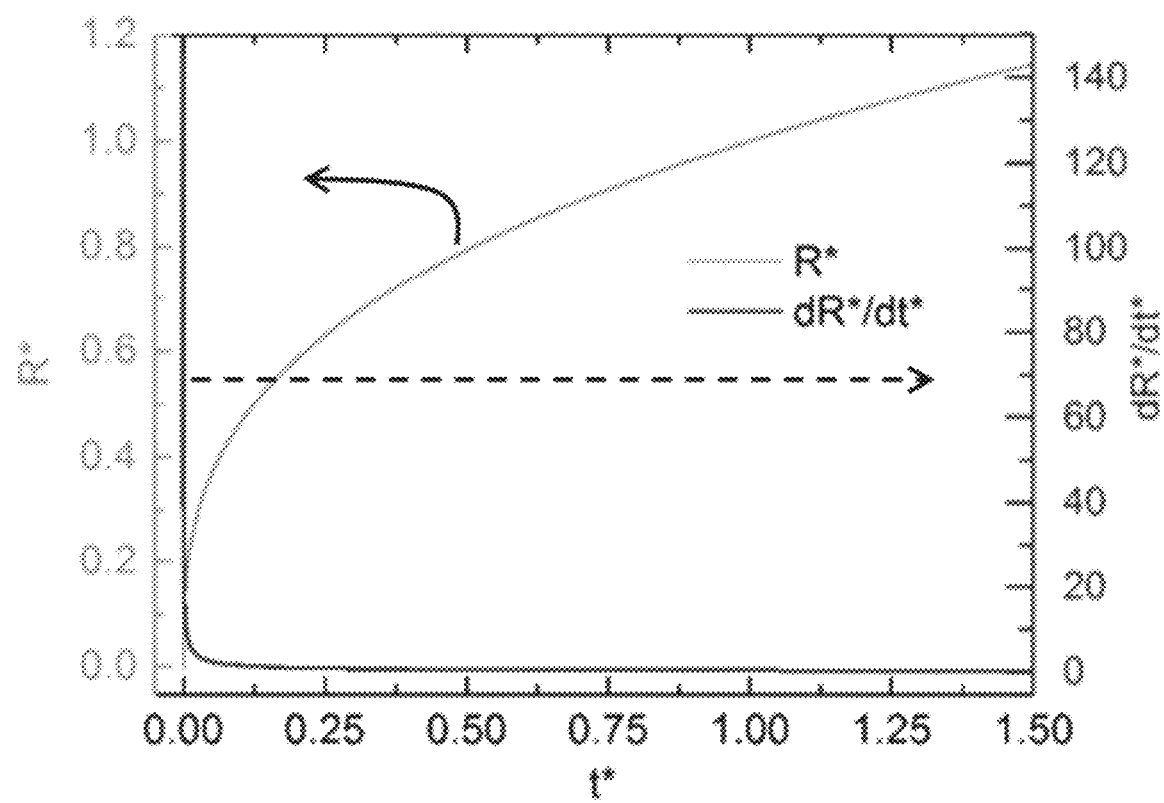
FIG. 20 shows the calculated temporal evolution of the bubble radius and the growth rate in the non-dimensionalized form.

As plotted in FIG. 20, the evolution of the bubble radius and the growth rate in the non-dimensionalized form can be thus described as:

$$R^* = t^{*1/3} \text{ and } \frac{dR^*}{dt^*} = \frac{1}{3 t^{*2/3}} \tag{13}$$

Figure 21:
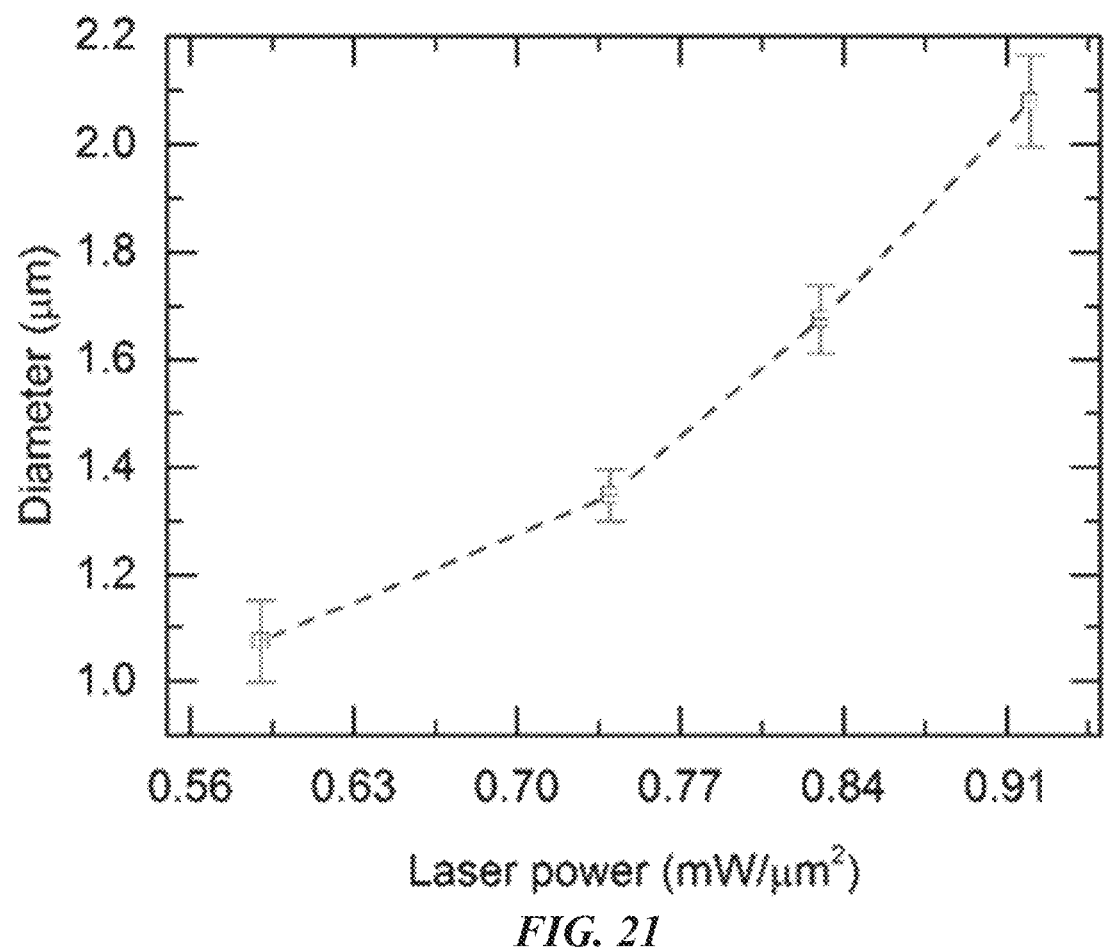
FIG. 21 is the measured ring diameter as a function of the incident laser power.
Figure 22:
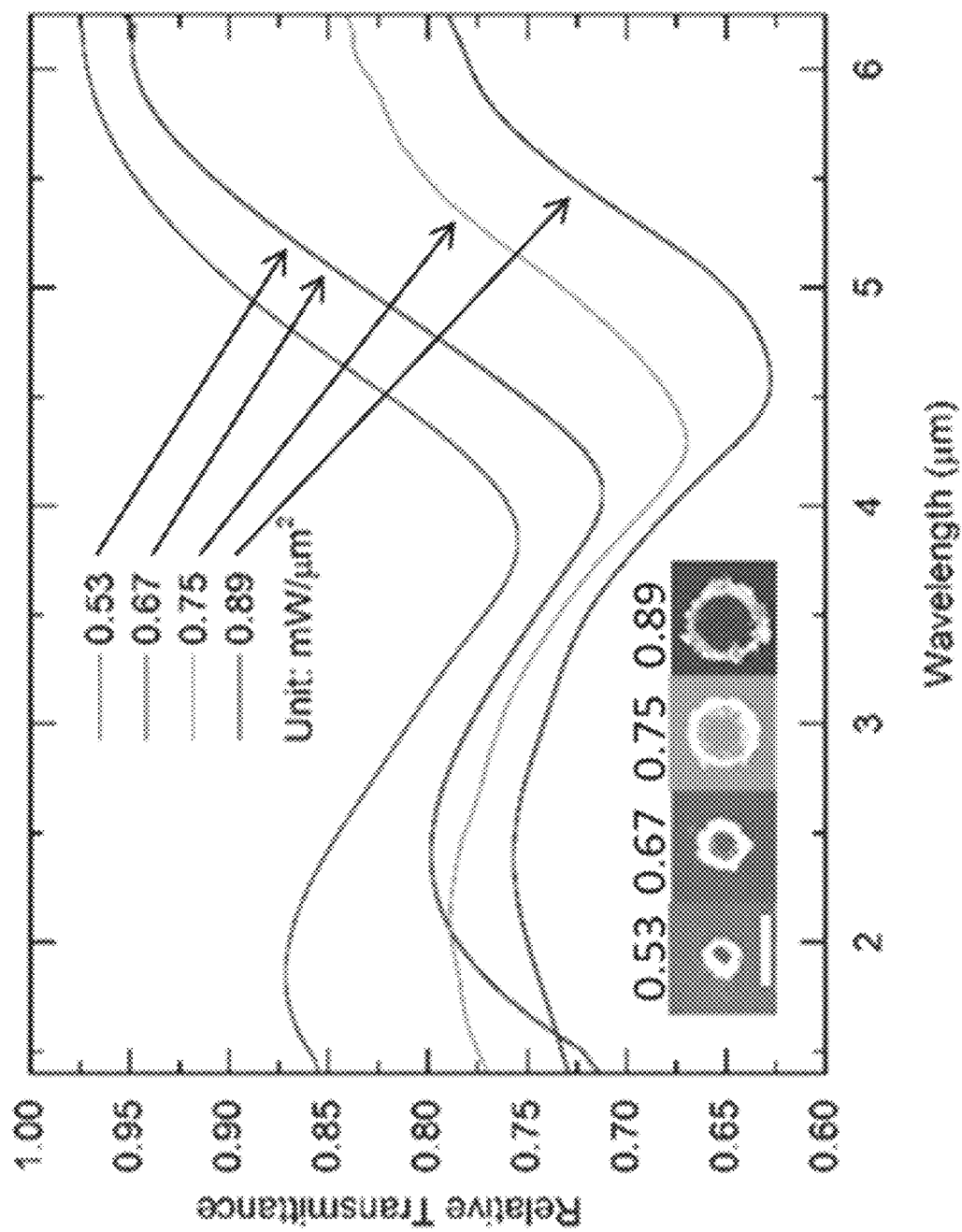
FIG. 22 is the relative transmittance spectra of the arrays of Ag rings fabricated at the variable laser power. The spectra were normalized with respect to that of the Au nanoisland (AuNI) substrate as background. The inset show representative SEM images of four individual rings that increase their diameters (1.08 µm, 1.35 µm, 1.67 µm and 2.02 µm) when the incident laser power changes from 0.53 mW/µm² to 0.89 mW/µm².
Figure 23:
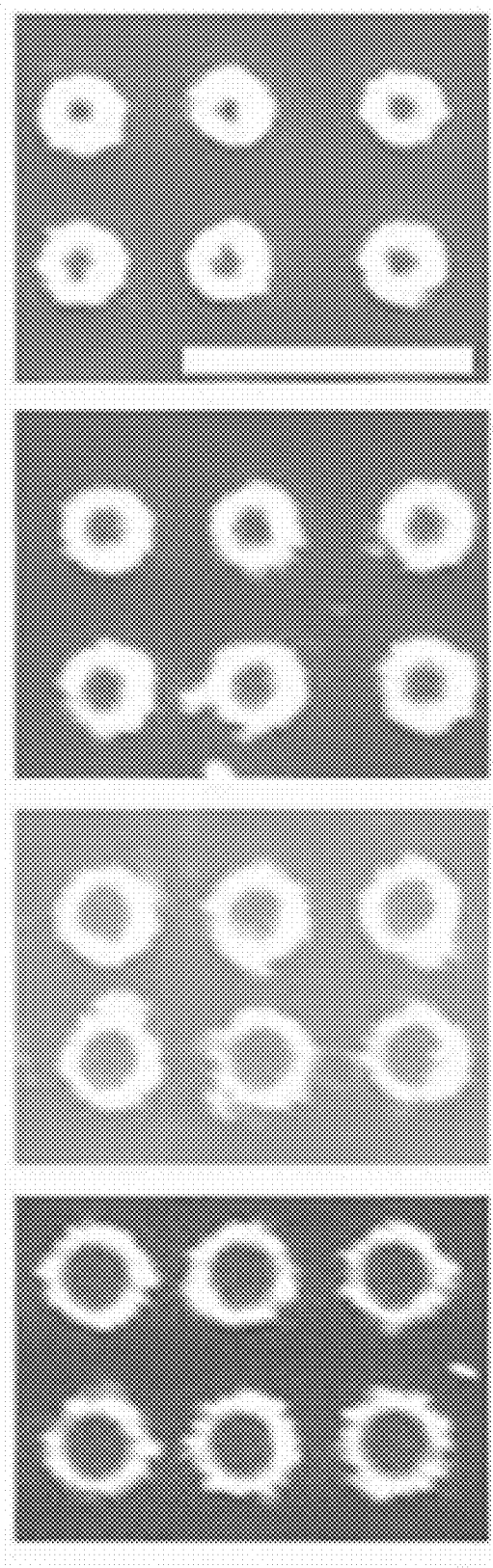
FIG. 23 is SEM images of different Ag ring arrays fabricated with varied incident laser power. Scale bar is 4 µm.
Figure 24:
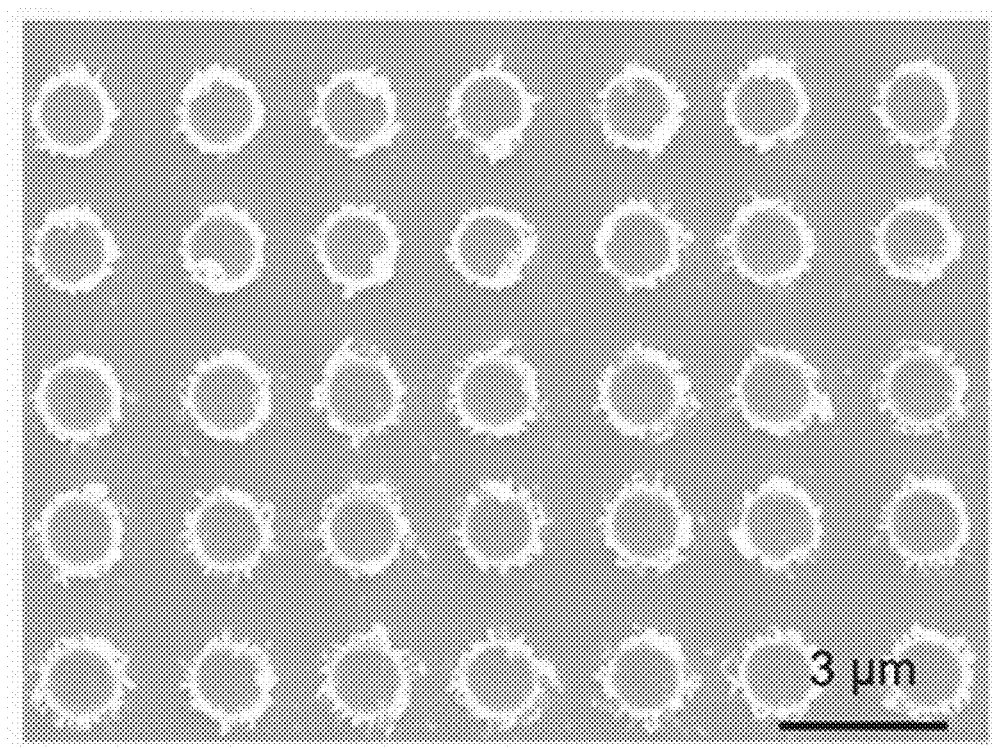
FIG. 24 is a SEM image of the third Ag ring array from the top shown in FIG. 23.
Figure 25:
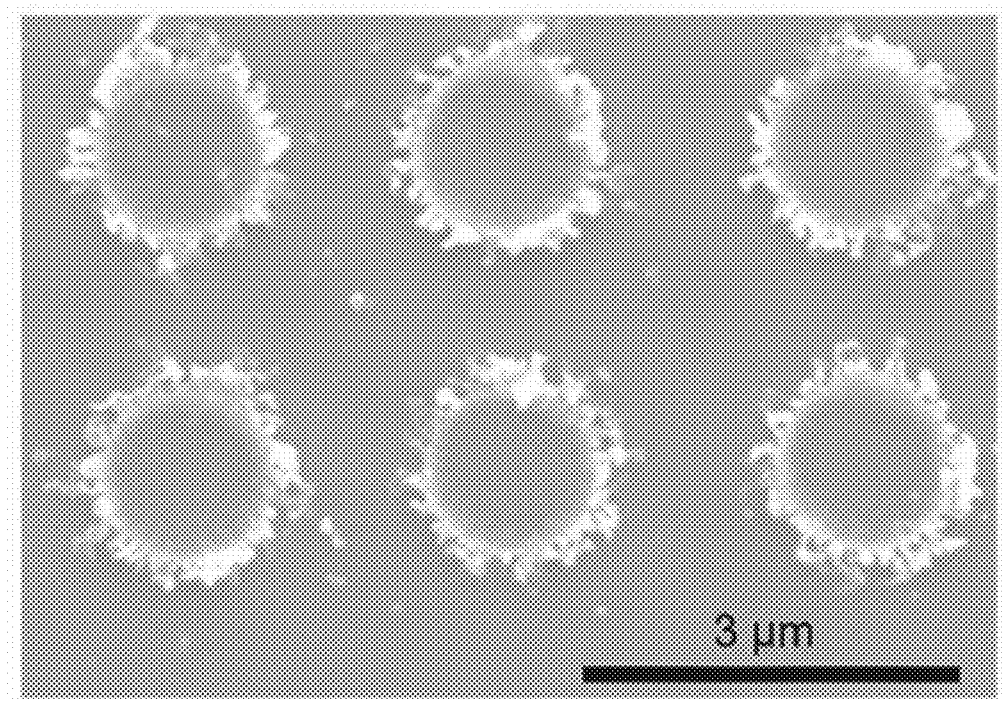
FIG. 25 is a SEM image of the third Ag ring array from the top shown in FIG. 23.
Figure 26:
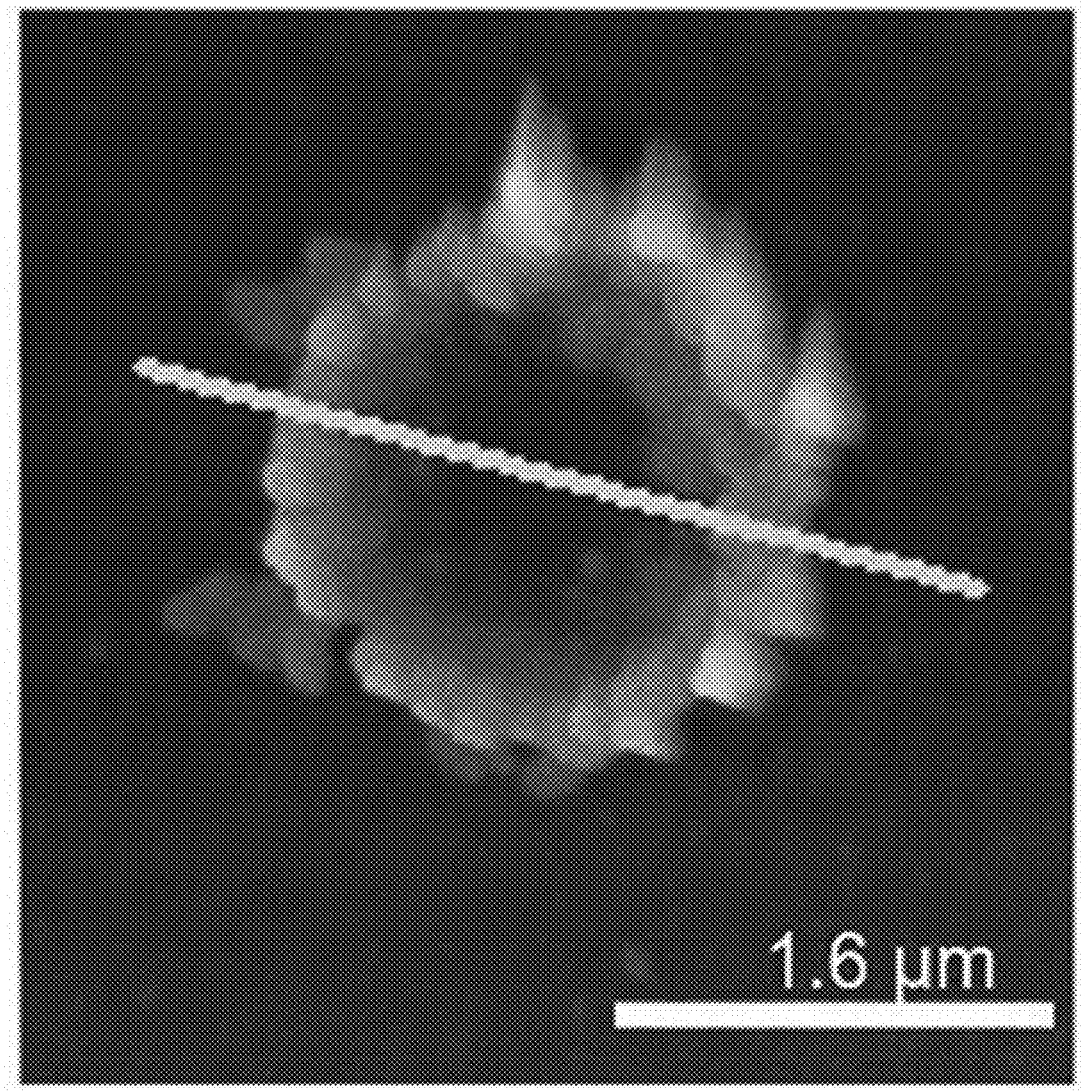
FIG. 26 is an AFM image of a typical Ag ring showing a diameter of 1.7 µm.
Figure 27:
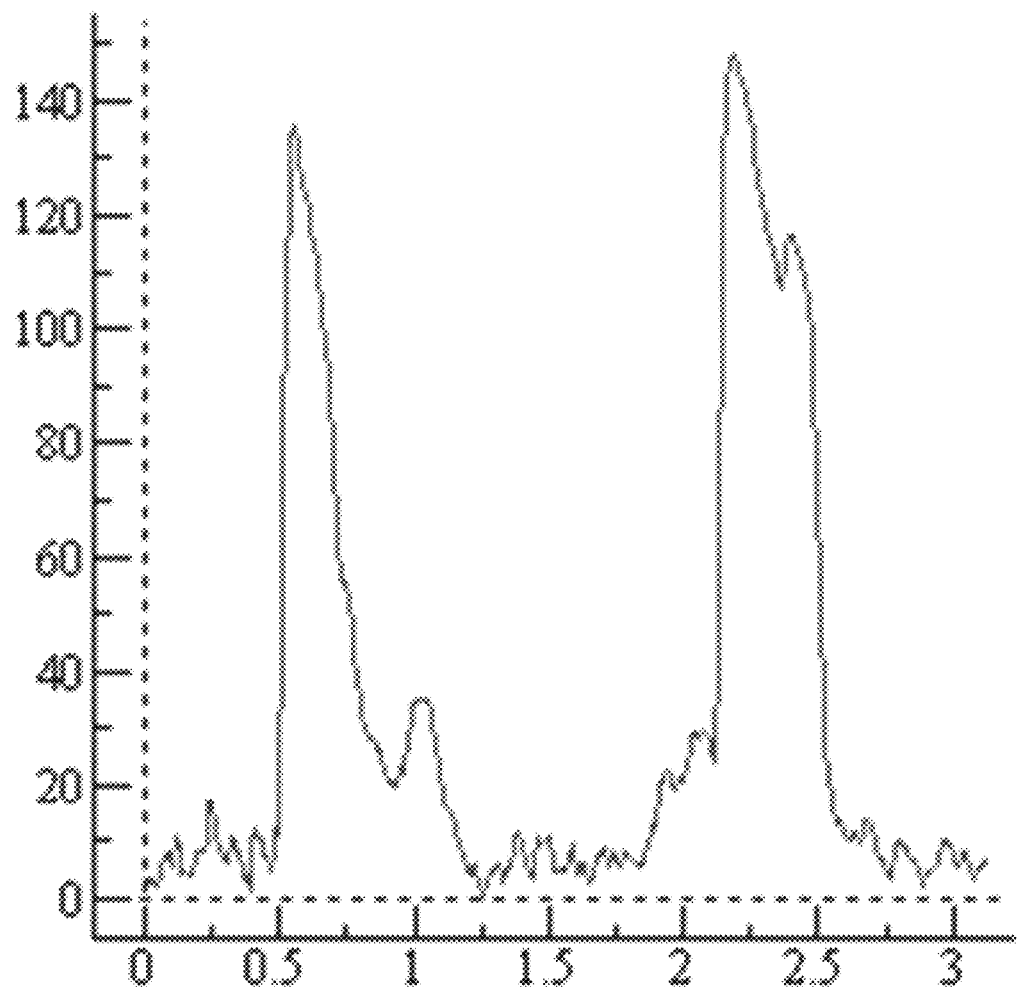
FIG. 27 is the sectional analysis of the Ag ring shown in FIG. 26 showing a diameter of 1.7 µm and a height of ~145 nm.
Figure 28:
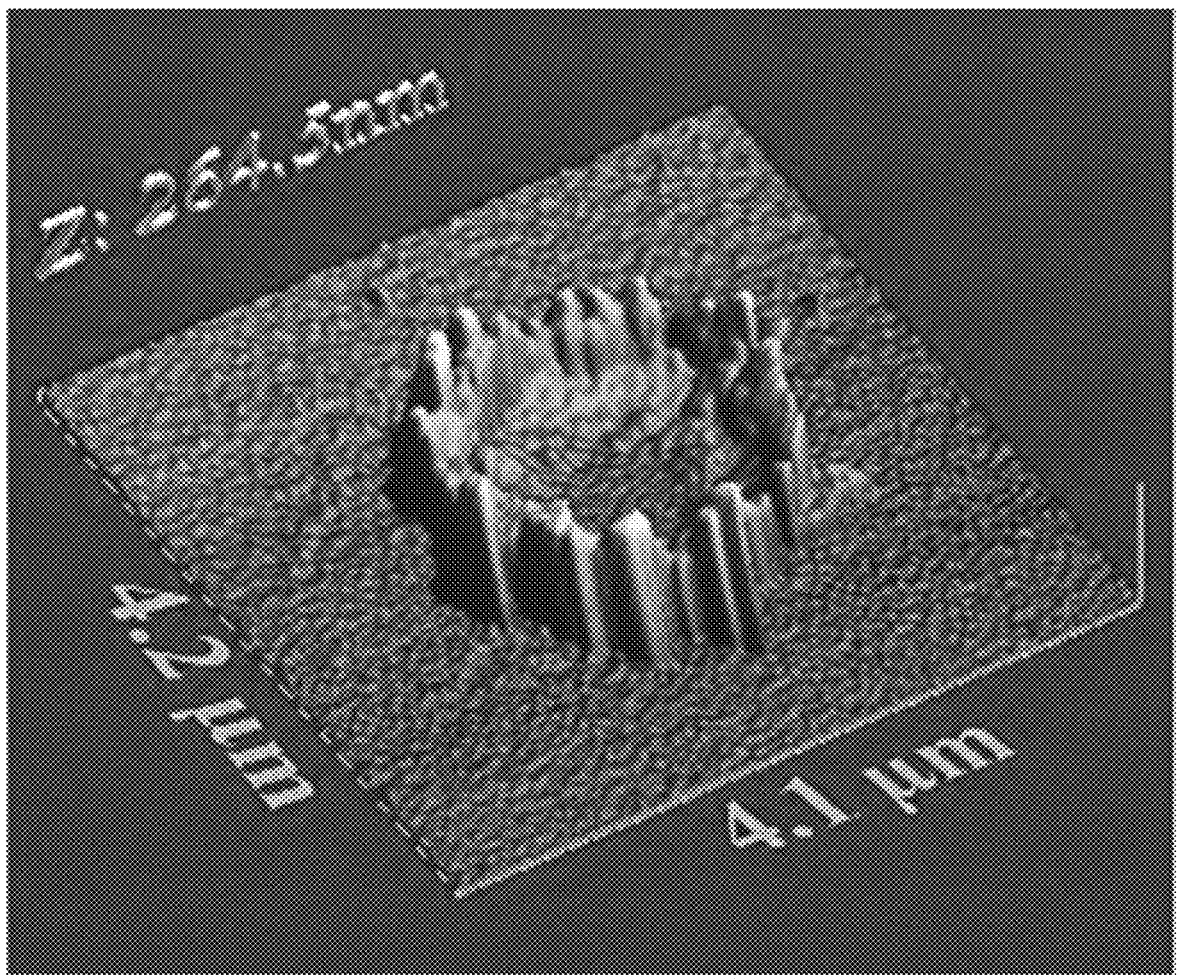
FIG. 28 is an AFM image of the Ag ring of FIG. 26 showing a diameter of 1.7 µm and a height of ~145 nm.

Using these equations, the bubble growth rate and the ring diameter evolution were delineated, which are plotted in FIG. 20-FIG. 21. The bubble has a high initial growth rate, which subsequently decreases drastically (FIG. 20). The Ag nanoparticles are pushed towards the bubble surface due to the high inertial thrust imparted at the instant when the bubble is formed. This explains the absence of Ag nanoparticles around the point of laser incidence and the formation of the Ag rings, as shown in FIG. 16-FIG. 19. The near-instantaneous formation of Ag ring in the silver ink solution without exposure to the ambient atmosphere limits the plausibility of silver oxidation, thereby improving the sample's shelf life. An increase in the Ag ring radius was observed when the laser power was increased (FIG. 21 and Inset of FIG. 22). Experimental measurements on the power dependence of the ring radius can be explained by the analytical increase of the bubble radius as a function of t* in FIG. 20, which is also proportional to the laser power P as per the scaling in Equation (12).

Figure 29:
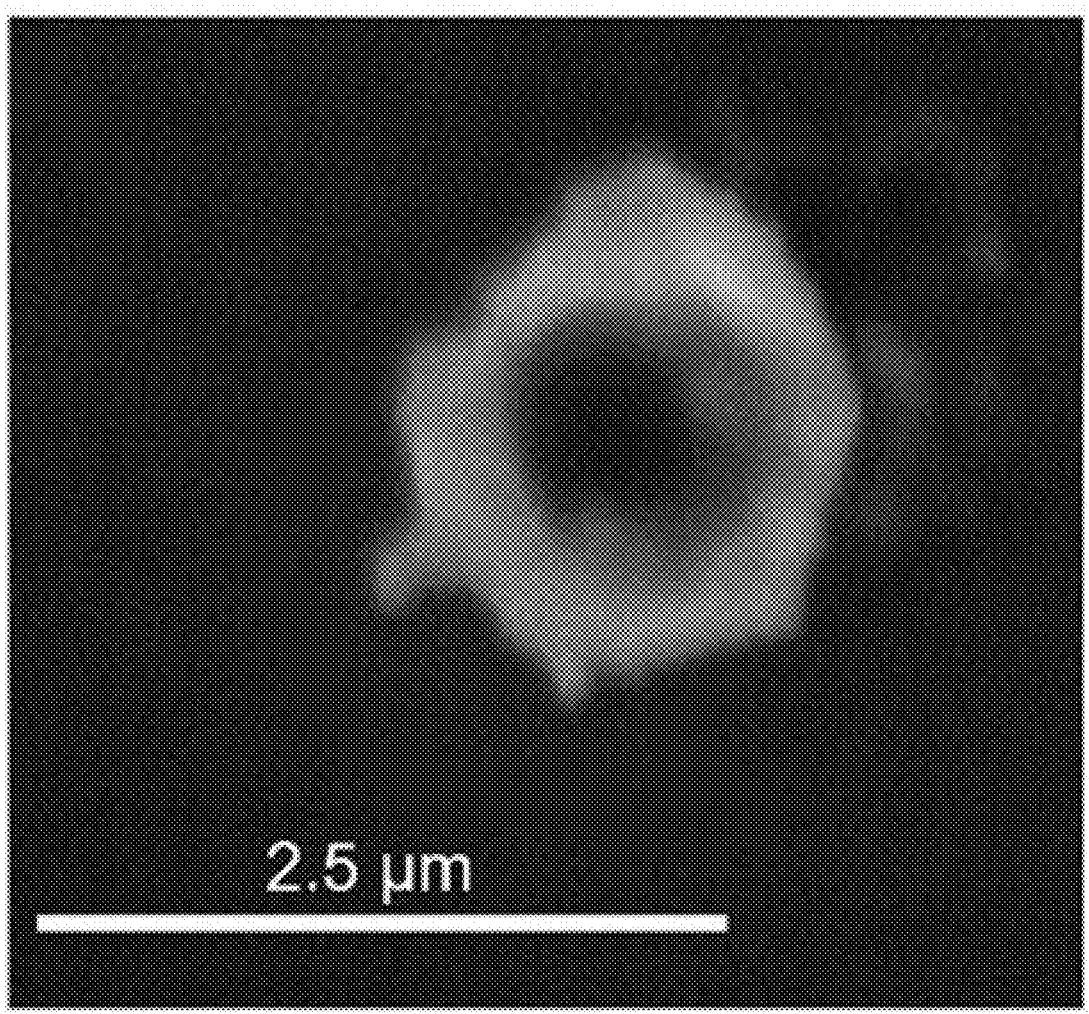
FIG. 29 is a SEM image of an Ag ring on the Au nanoisland substrate.
Figure 30:
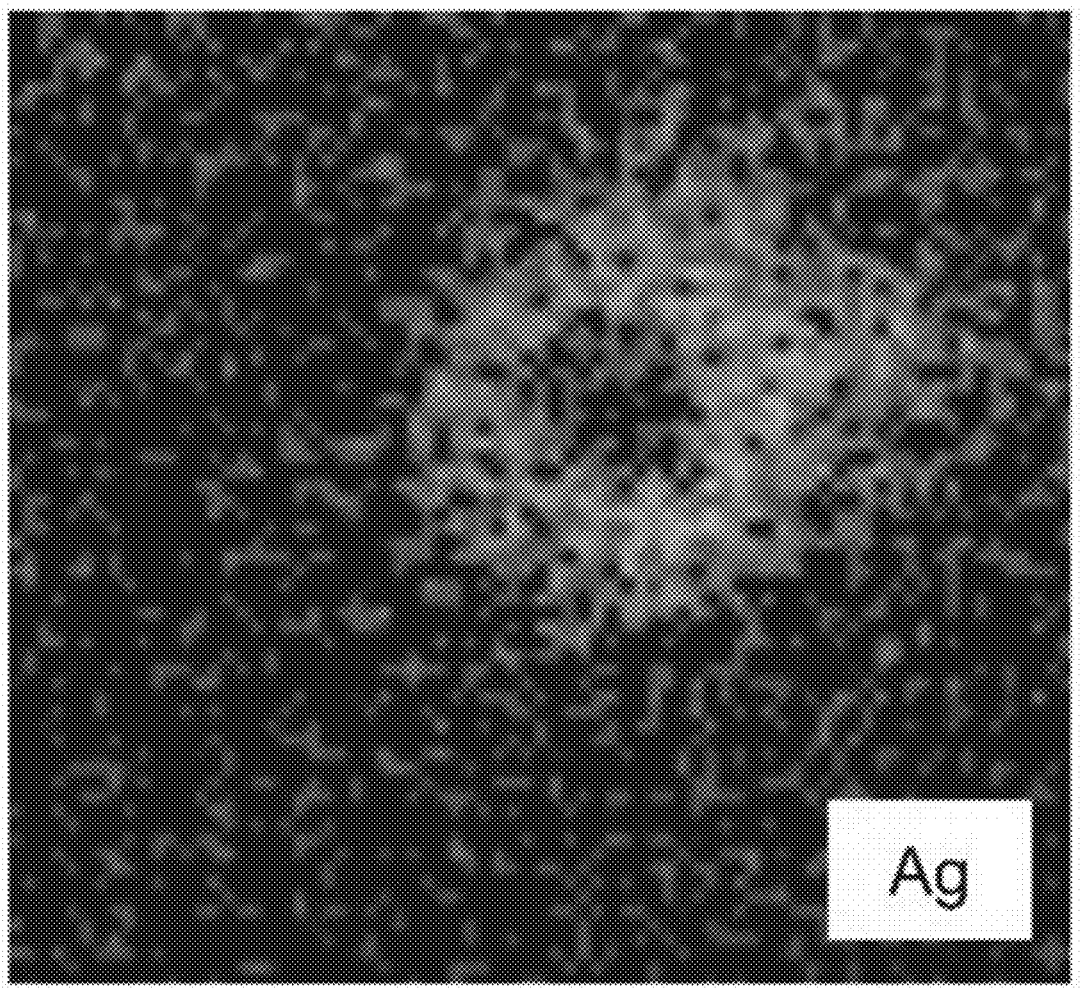
FIG. 30 is the EDS Ag mapping of the Ag ring on the Au nanoisland substrate shown in FIG. 29, which shows that the ring is composed of Ag.
Figure 31:
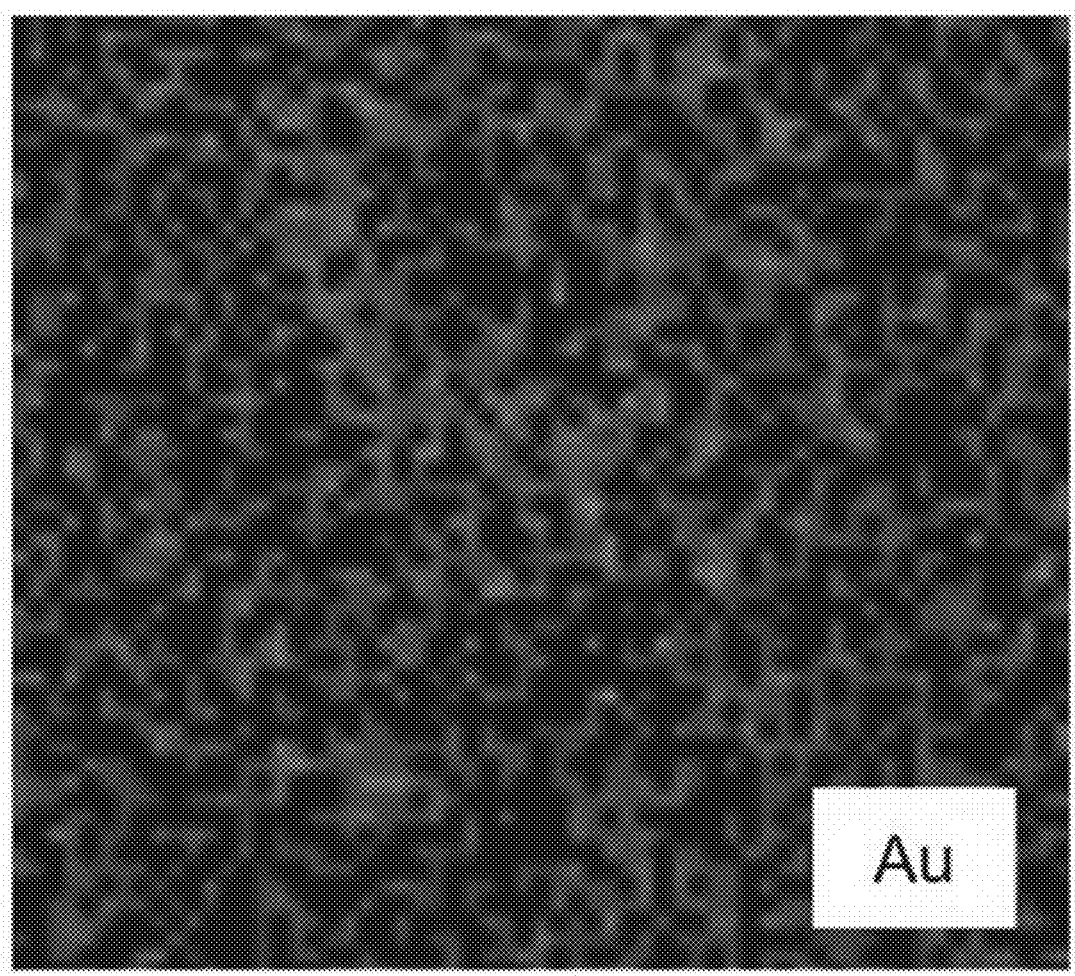
FIG. 31 is the EDS Au mapping of the Ag ring on the Au nanoisland substrate shown in FIG. 29, which shows that the Au nanoparticles are spread out everywhere.

The ability to tune the properties of the Ag rings is important for many of their applications (Aksu S et al. *Adv. Opt. Mater.* 2013, 1, 798). A correlation between the incident laser power and the resultant ring diameter, which can be modulated between 1.08±0.07 µm and 2.02±0.08 µm (FIG. 21), was experimentally established. The increased ring diameter at the elevated laser power can be attributed to the increased bubble size due to the larger amount of vapor generated. A further increase of the laser power causes unstable bubble growth, resulting in a large variation ($\sigma > 15\%$) in the Ag ring diameter. Additional scanning electron microscopy (SEM) and atomic force microscopy (AFM) images of the ring arrays are shown in FIG. 23-FIG. 28. The ring composition was analyzed by EDS mapping. As shown in FIG. 29-FIG. 31, Ag is concentrated along the ring and Au is spread out all over the substrate.

The infrared transmission spectra of the variable arrays of Ag rings (60 µm×50 µm) on the Au nanoisland substrates were measured. Due to the symmetric nature of the Ag ring, there is no dependence on the polarization of the incident infrared beam. As shown in FIG. 22, all the arrays exhibit transmission dips in the mid-infrared regime, which arises from the surface plasmon resonances at the rings. The resonant wavelength varies from 3.8 µm to 4.6 µm as the Ag ring diameter increases, as shown in the SEM images in the inset of FIG. 22. A further analysis of the SEM images shows that the ring diameter increases from 1.08 µm to 2.02 µm and the ring width is between 130 nm and 200 nm.

Electromagnetic simulations were performed using the finite-difference time-domain (FDTD) method to better understand the experimental optical spectra of the Ag rings.

Figure 32:
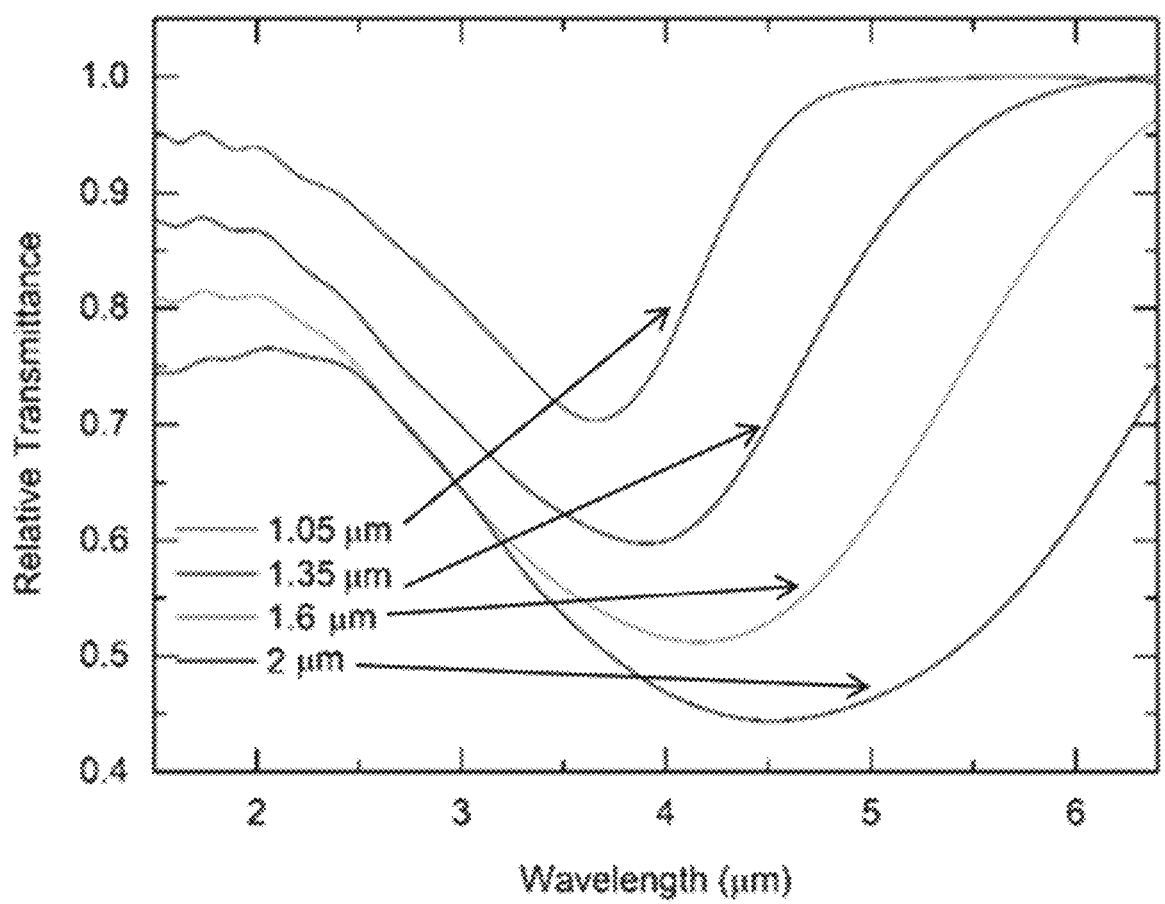
FIG. 32 is the FDTD-simulated relative transmittance spectra for the Ag rings in FIG. 22.
Figure 33:
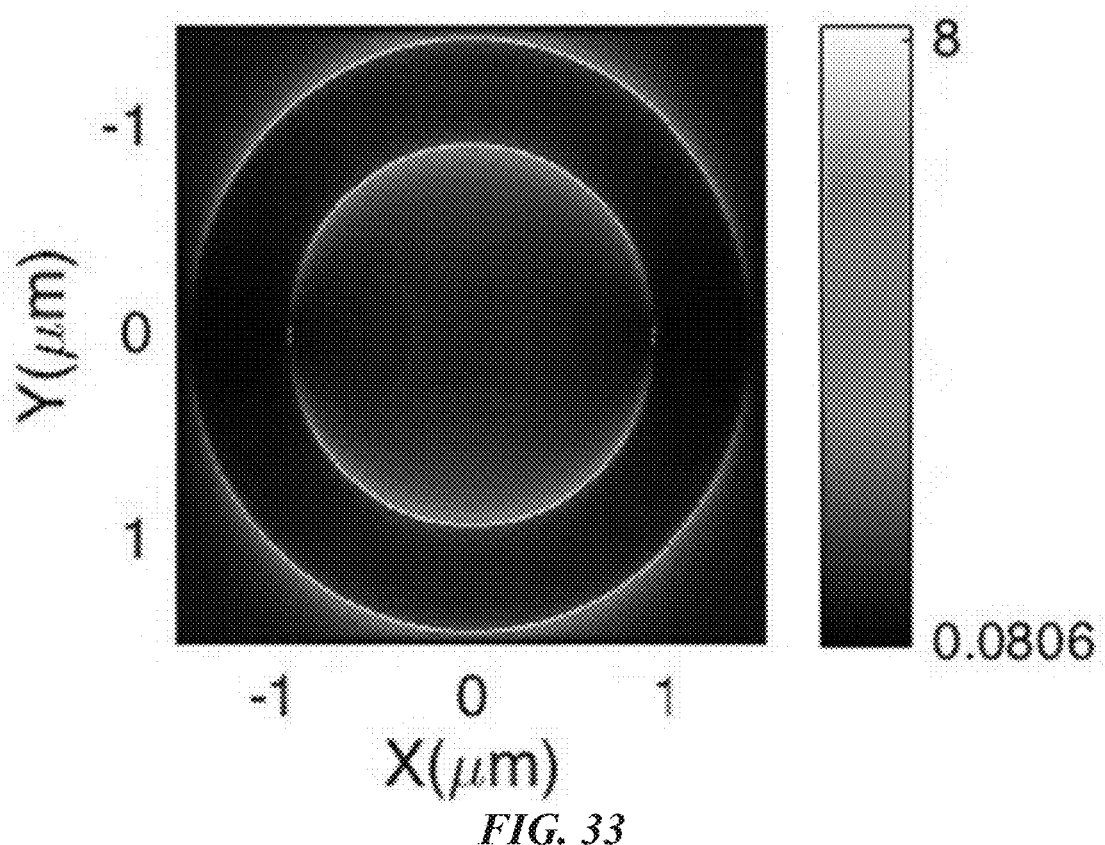
FIG. 33 is the simulated electric-field distribution at a 2 µm Ag ring upon the excitation of dipolar surface plasmon resonance mode.

As shown in FIG. 32, the resonant peak wavelength, bandwidth and symmetry of the simulated spectra are comparable to the experimental data (FIG. 22). A further study of the electric-field distribution at a single Ag ring indicates that the resonance arises from the dipolar plasmon mode (FIG. 33). The resonance tunability of the Ag rings is expected to benefit SEIRS and other sensing applications where a good match between the resonant wavelength and the wavelength of the vibrational mode of the molecular analytes is preferred.

Figure 34:
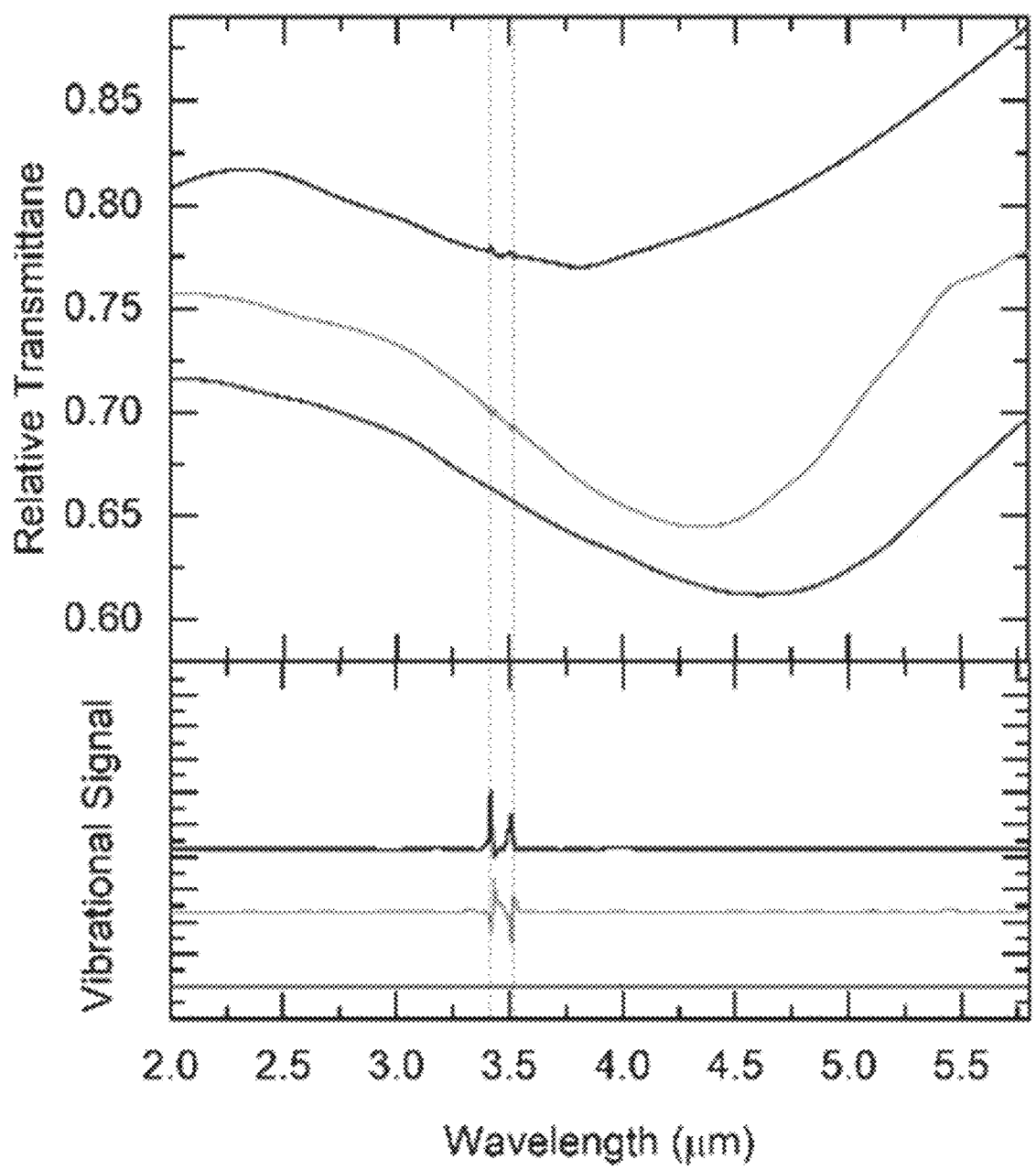
FIG. 34 is the SEIRS of TNT on the three types of the Ag ring-Au nanoisland substrates, which exhibit the different detuning between the plasmonic and molecular excitations. The spectra correspond to ring sizes of 1.08 µm, 1.67 µm, and 2.02 µm from top to bottom, respectively. The lower panel shows the baseline-corrected spectra, which clearly reveal the molecular resonances. The baseline was obtained via a second-derivative method. The detuning variation results in the different signal enhancements and line-shapes. The incident laser power was 0.7 mW and the laser beam had a diameter of 2 µm. The Raman acquisition time was 1 s.

With the visible and infrared surface plasmon resonances that arise from the Au nanoislands and Ag rings, the Ag ring-Au nanoisland substrate presents an opportunity to achieve dual-mode surface-enhanced optical spectroscopies. SEIRS and SERS of TNT and R6G, respectively, were demonstrated. As shown in FIG. 34, the aromatic (3.43 µm) and aliphatic (3.51 µm) C—H stretch bands of TNT on the Ag ring-Au nanoisland substrate are enhanced via SEIRS (Bagheri S et al. ACS Photonics. 2015, 2, 779). The signal enhancements highly depend on the match between vibrational ($\omega_{vib}$)) and plasmonic frequencies ($\omega_p$). No vibrational signal is observed when there is a large frequency mismatch. To further elucidate the plasmon-molecular vibration coupling, the baseline-corrected SEIRS spectra was obtained. As shown in lower panel of FIG. 34, clear Fano-line sharp features appear in the spectra due to the coupling between the vibrational and plasmonic excitations, confirming the SEIRS effect.

Figure 35:
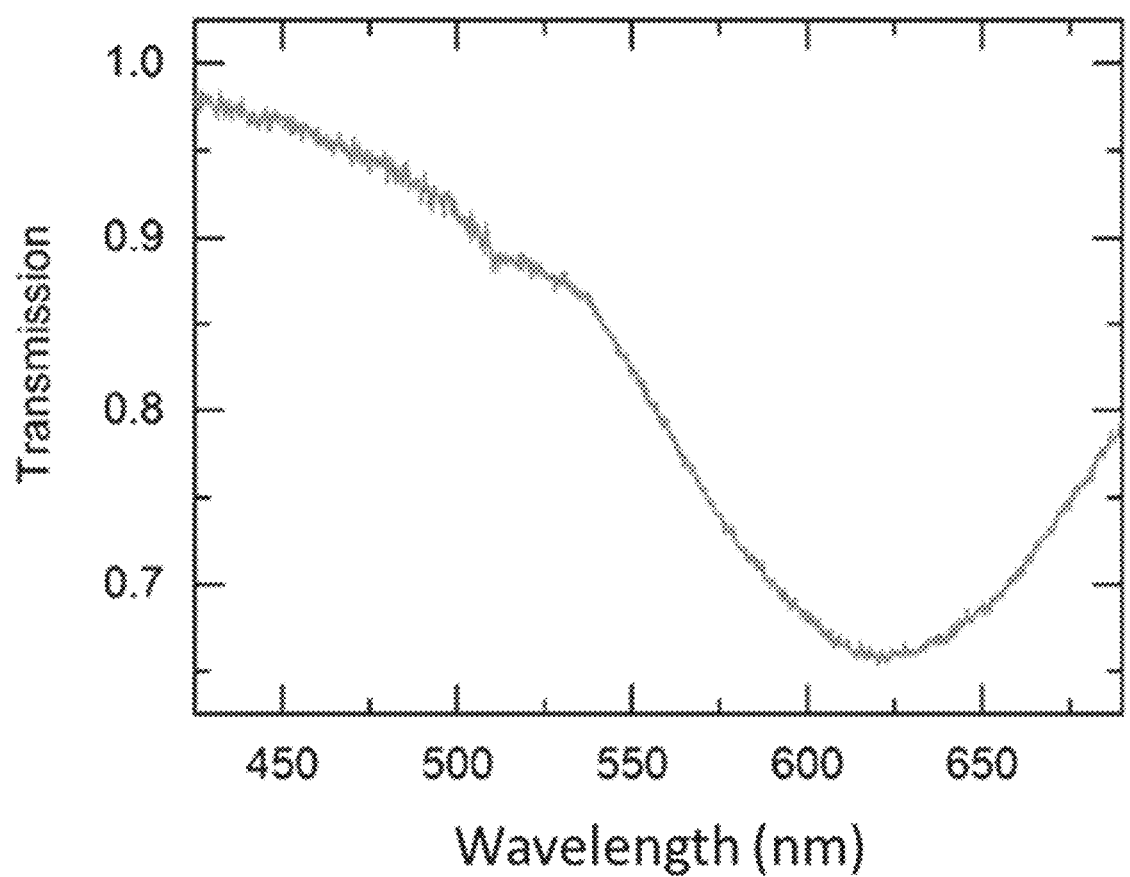
FIG. 35 is the transmission spectrum of the Ag ring-Au nanoisland substrate with 2.02 µm Ag rings in the visible regime. The plasmon resonance is clearly observed as a transmission dip in the spectrum.
Figure 36:
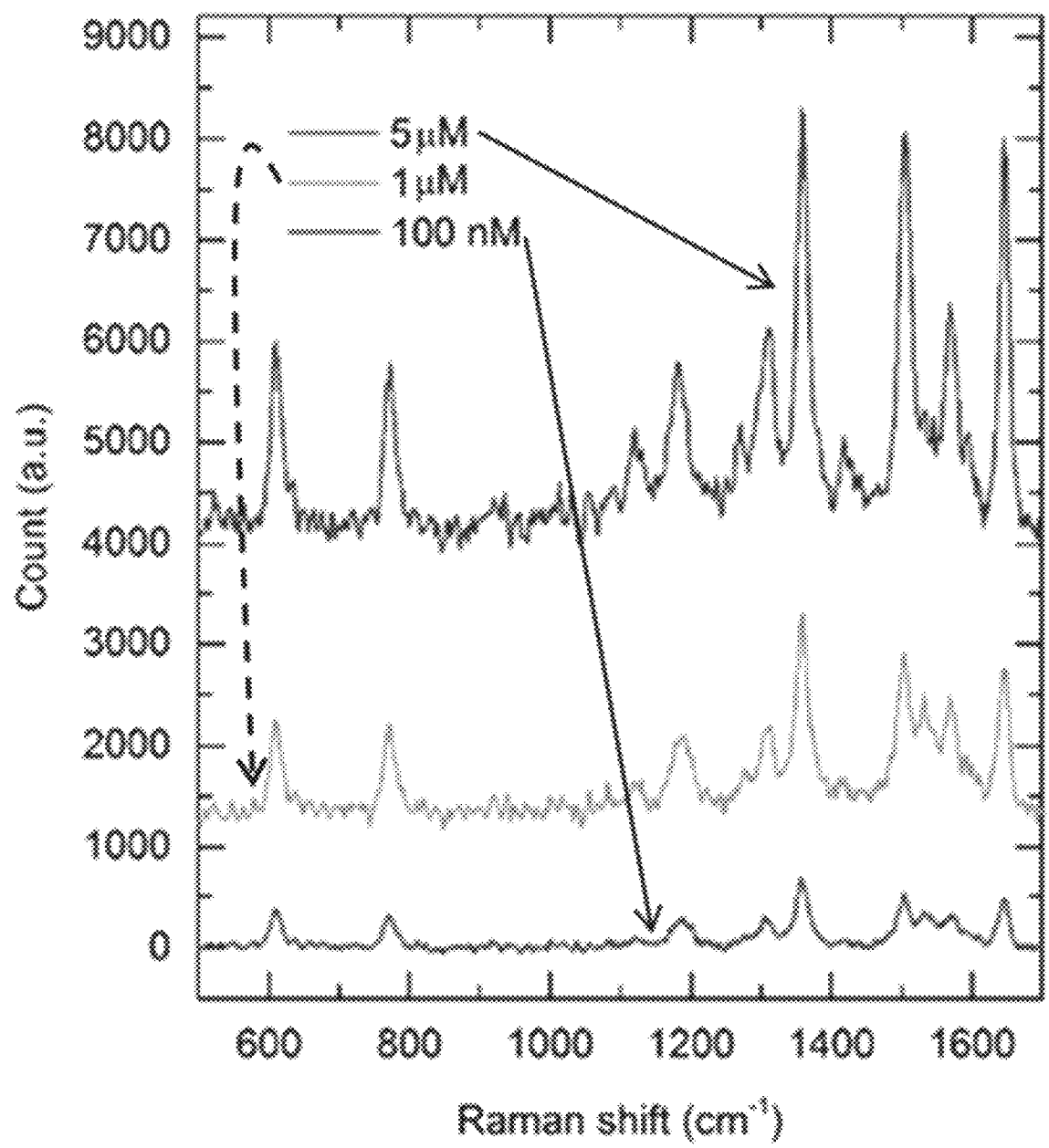
FIG. 36 is the SERS spectra of R6G of variable concentrations on the Ag ring-Au nanoisland substrate. The incident laser power was 0.7 mW and the laser beam had a diameter of 2 µm. The Raman acquisition time was 1 s.
Figure 37:
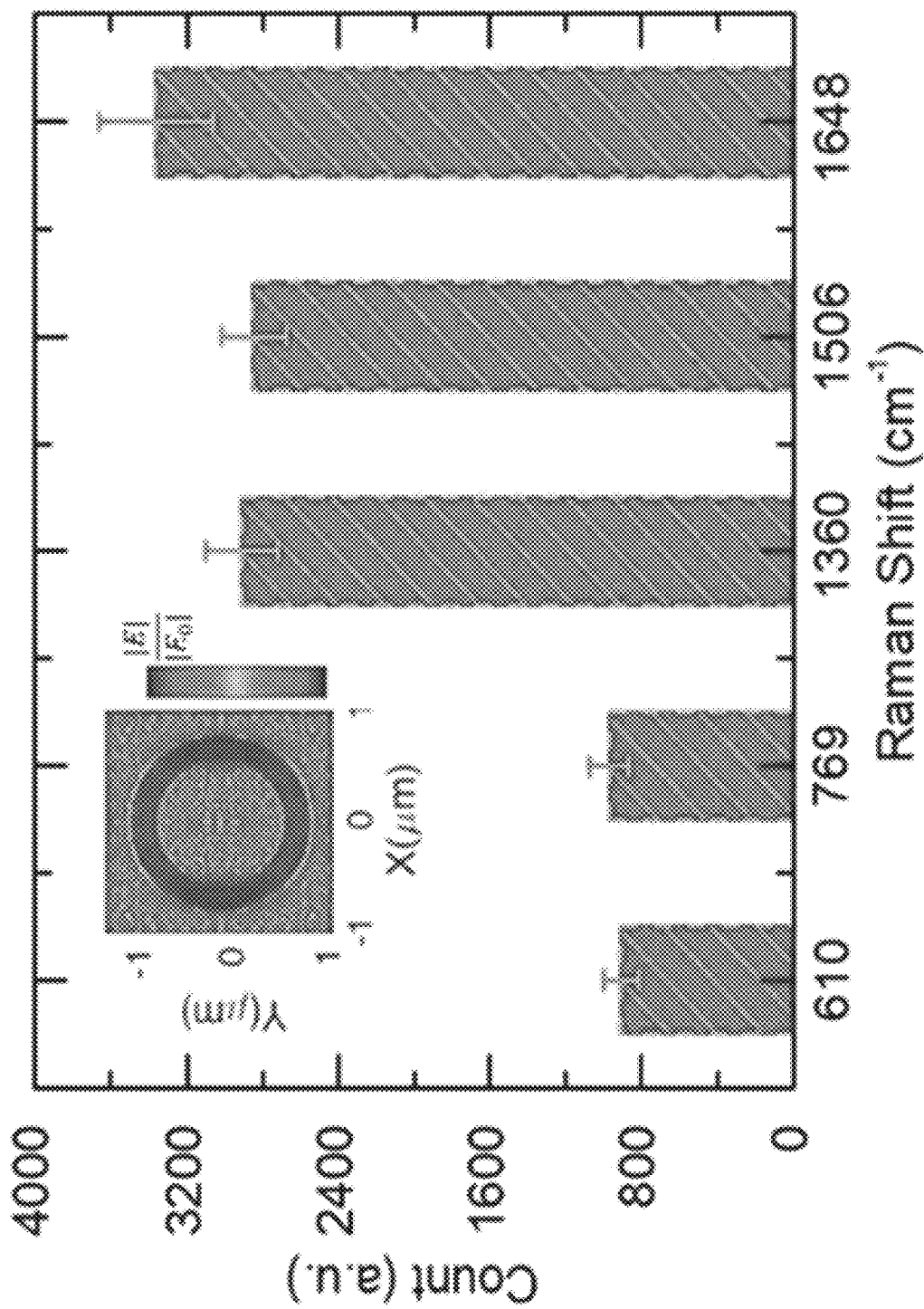
FIG. 37 is the SERS signal counts of the different R6G modes based on multiple spectra taken at various random locations on the sample. The R6G concentration is 1 µM. Inset shows the simulated field distributions at the Ag ring-Au nanoisland substrate, which shows the higher field enhancement at the ring interface. The incident laser power was 0.7 mW and the laser beam had a diameter of 2 µm. The Raman acquisition time was 1 s.
Figure 38:
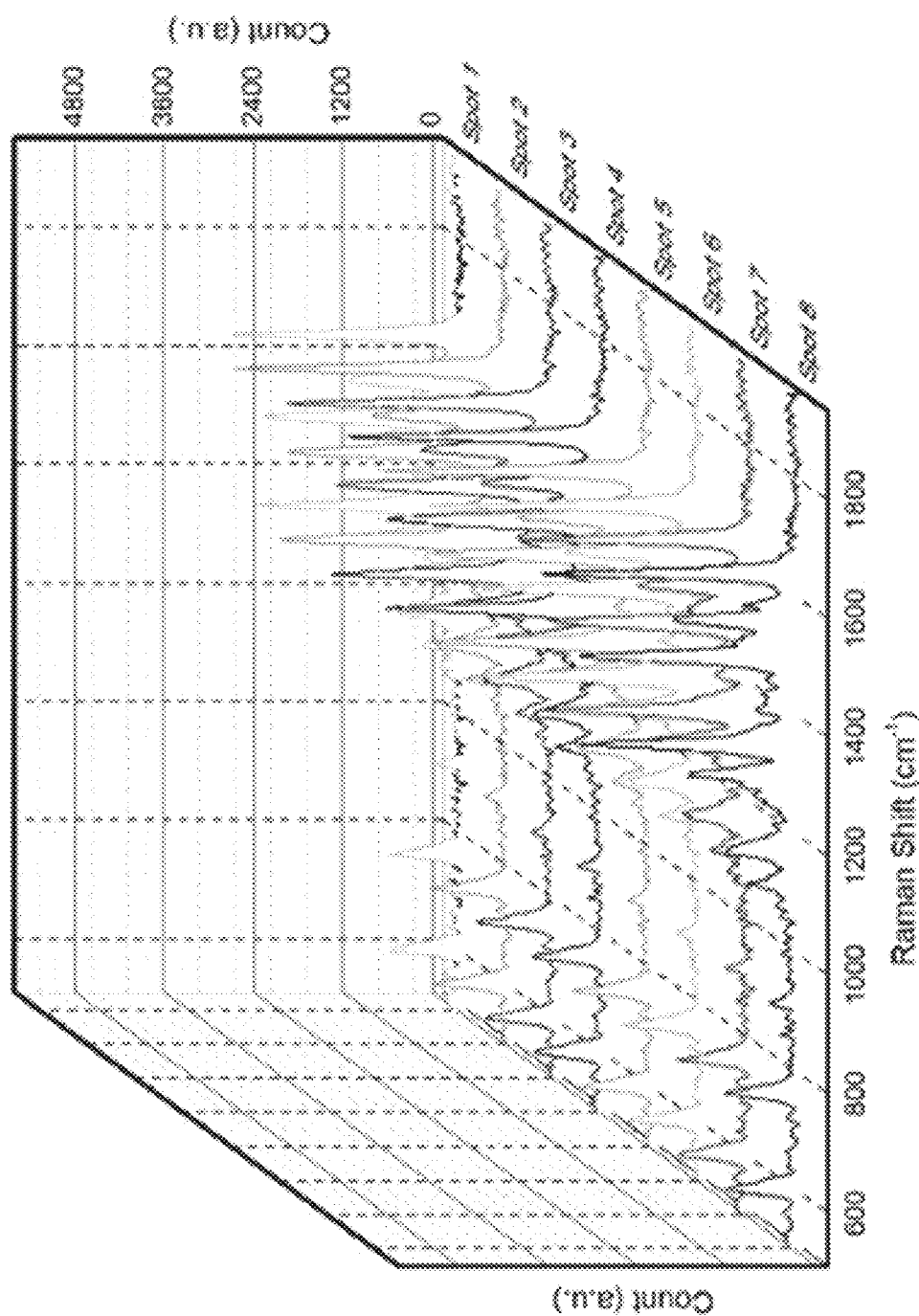
FIG. 38 is multiple SERS spectra of 1 µM R6G taken at various random spots on the hybrid substrate (Ag ring size=2.02 µm) to demonstrate the uniform Raman signals across the sample.
Figure 39:
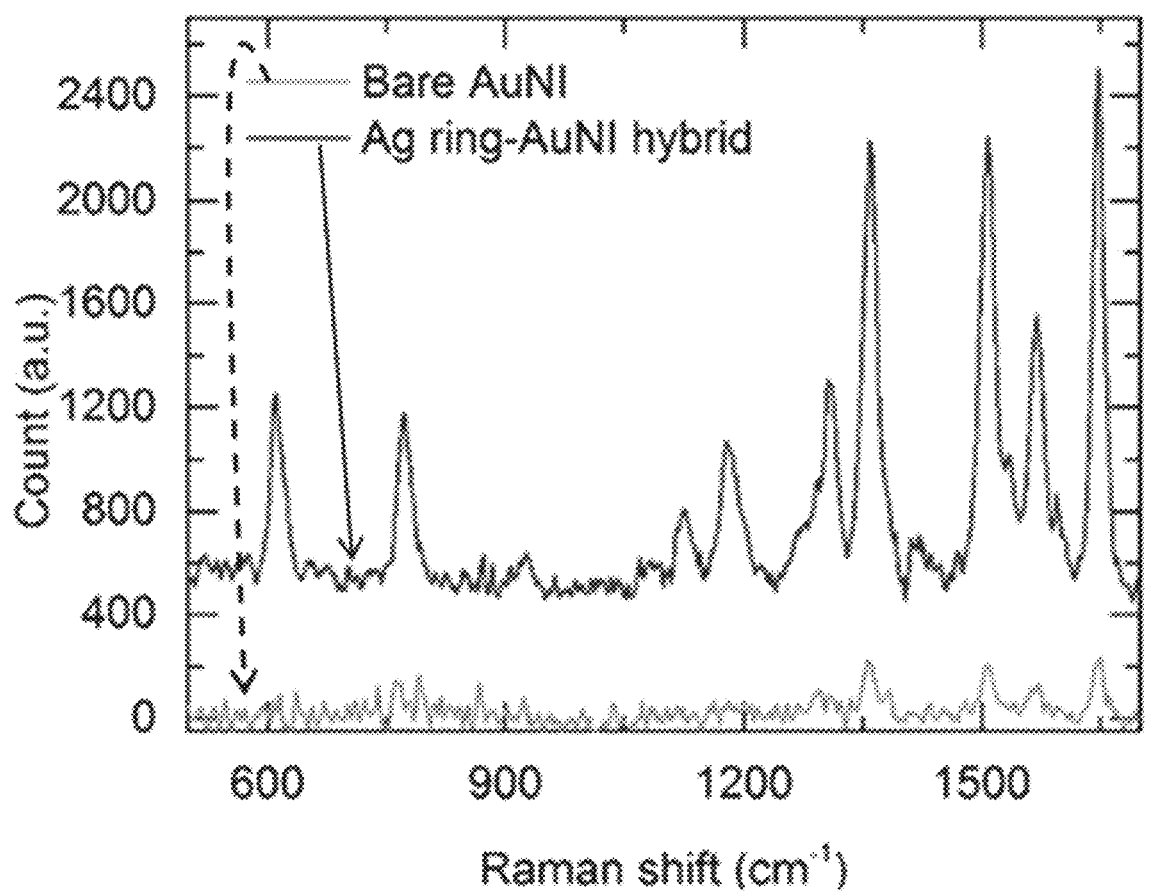
FIG. 39 is the SERS spectra for 1 µM R6G on the hybrid Ag ring-Au nanoisland (AuNI) substrate vs. the bare Au nanoisland substrate.
Figure 40:
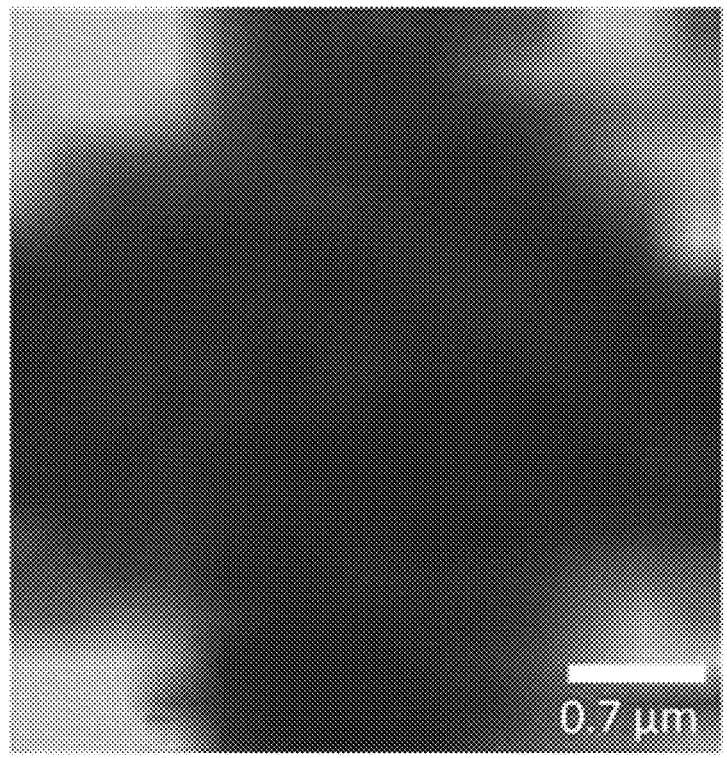
FIG. 40 is the high-resolution Raman mapping of R6G over the Ag ring/Au nanoisland hybrid substrate. The panel shows the inter-ring region, with the rings present at the edges.
Figure 41:
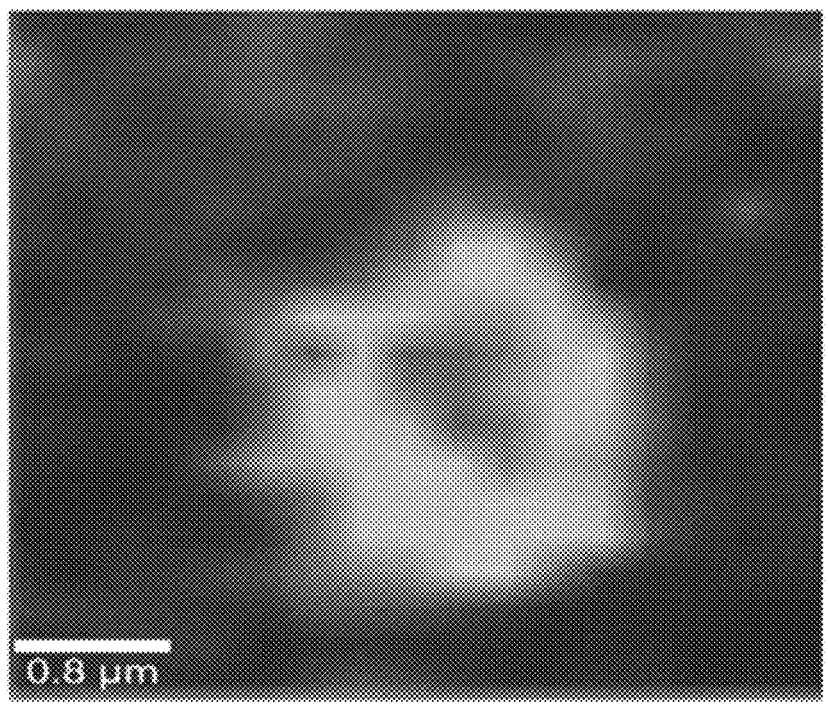
FIG. 41 is the high-resolution Raman mapping of R6G over the Ag ring/Au nanoisland hybrid substrate. The panel shows the high-resolution image of a single Ag-ring, clearly demonstrating the signal enhancement at Ag ring/Au nanoisland interface.
Figure 42:
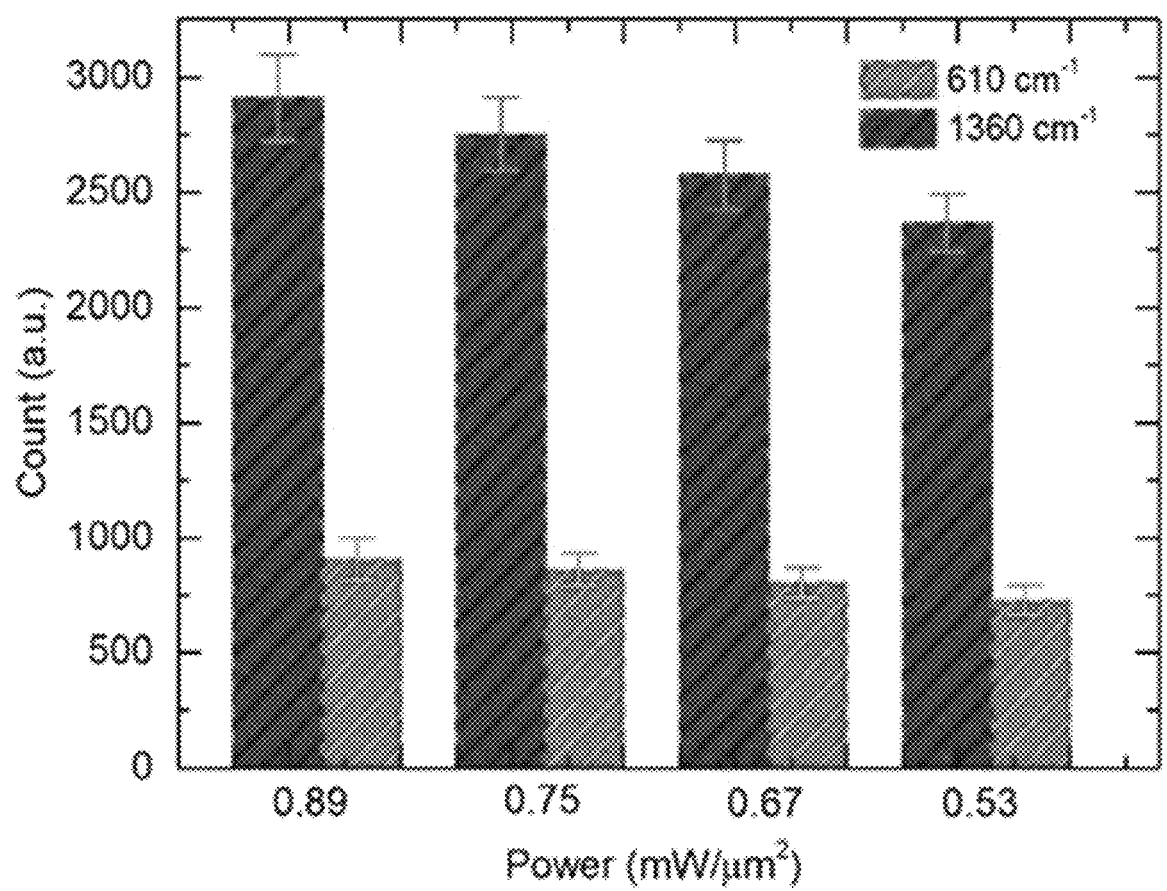
FIG. 42 is the Raman counts of 1 µM R6G at 610 cm$^{-1}$ and 1360 cm$^{-1}$ as a function of the Ag ring size. The ring size decreases from 2.02±0.08 µm to 1.08±0.07 µm as the power reduces.
Figure 43:
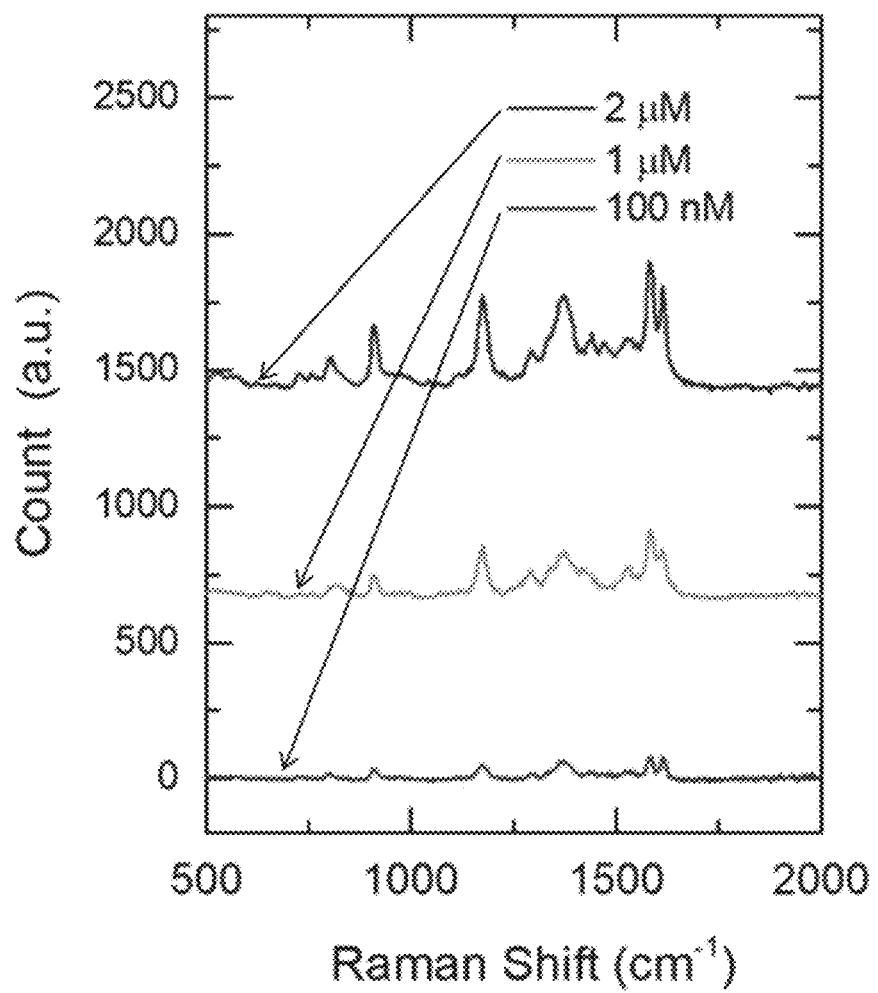
FIG. 43 is the concentration dependent SERS spectra of crystal violet (CV) molecules on the 2.02 µm Ag ring substrate. The standard modes such as the ring breathing mode (914 cm$^{-1}$), C—H stretch mode (1177 cm$^{-1}$), C—N stretch mode (1370 cm$^{-1}$) are clearly seen.

The SERS spectra of R6G molecules drop-casted on the Ag ring-Au nanoisland substrate were also measured. FIG. 35 shows the transmission spectrum of the substrate. FIG. 36 shows the concentration-dependent SERS spectra with 532 nm incident laser, where distinguishable Raman modes are observed even at the lowest concentration of $10^{-7}$ M. Many standard modes such as C—C—C ring in-plane bending (610 $cm^{-1}$), C—C stretching (1360 $cm^{-1}$ and 1506 $cm^{-1}$) and C—H bending (769 $cm^{-1}$ and 1648 $cm^{-1}$) appear in the spectra (Jensen L et al. J. Phys. Chem. A. 2006, 110, 5973). Further, the Raman enhancement stability across the substrate was evaluated by measuring multiple spectra at random locations all over the substrate (FIG. 37 and FIG. 38). In general, randomly distributed Au nanoislands on the substrates do not possess high E-field enhancement. Additional steps, such as bubble-mediated molecule concentration, are often applied to improve the SERS performances on such substrates (Kang Z W et al. Nanoscale. 2016, 8, 10266). However, for the hybrid Ag ring-Au nanoisland substrate, a high E-field enhancement at the Ag-ring/Au nanoisland interface was observed, as shown in the inset of FIG. 37. The field enhancement arises from the intense hot spots at the multiple Ag—Au junctions with the sub-20 nm gaps. In comparison to the bare Au nanoisland substrate, a 10-fold increase in the SERS count was observed for the Ag ring-Au nanoisland substrate (FIG. 39). The high-resolution Raman mapping with the 610 $cm^{-1}$ peak signal also confirmed the enhancement at the interfaces (FIG. 40 and FIG. 41). The compatibility with 532 nm laser for both fabrication and Raman sensing can be beneficial for device miniaturization via reduced cost and improved throughput. The influence of the ring size on the Raman counts was also investigated (FIG. 42). The laser was centered on the Ag ring to obtain the spectra. An increase in the counts was observed with increasing radius since the overlap area between Ag ring/Au nanoisland increases from ~95 µm$^2$ to ~360 µm$^2$ as the radius increases from 1.08 to 2.02 µm. In addition, sensing of CV at various concentrations was also demonstrated (FIG. 43).

Figure 44:
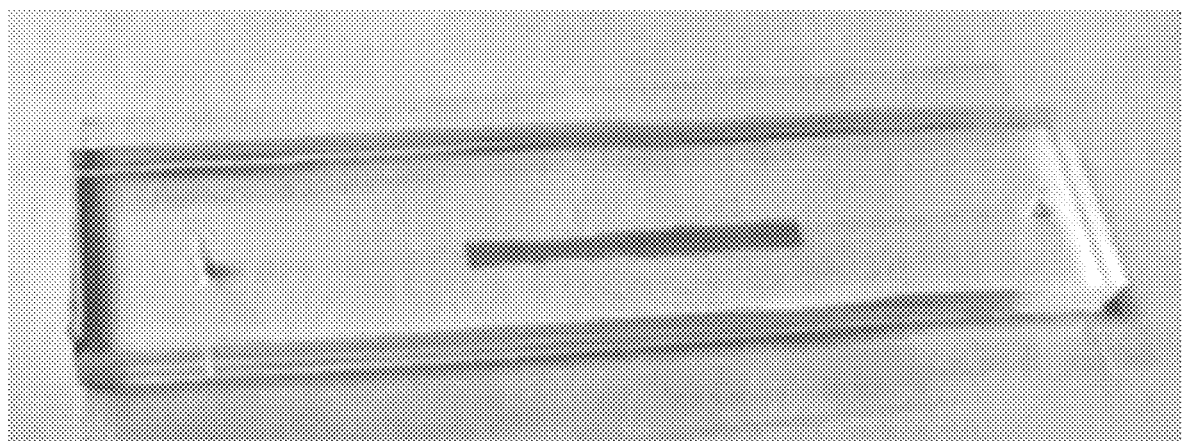
FIG. 44 is a photo of a microfluidic chip comprising a network of Au nanoislands confined within a microfluidic channel.
Figure 45:
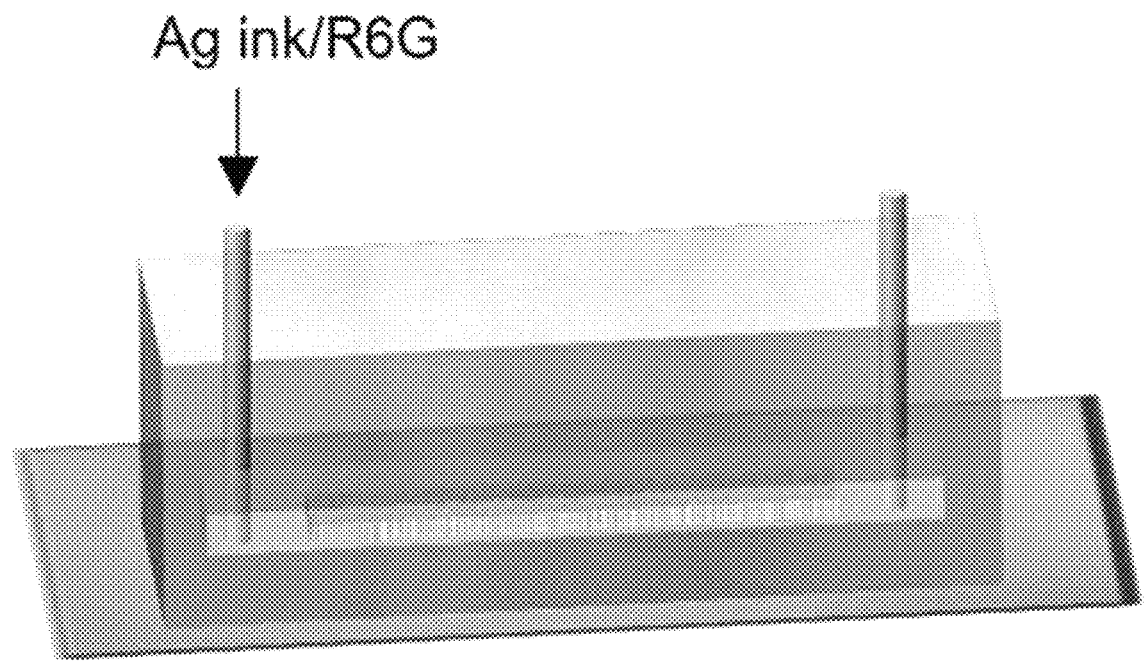
FIG. 45 is a schematic of the one-inlet, one-outlet microfluidic setup wherein the silver precursor ink and R6G are introduced sequentially. The microfluidic channel width and height are 500 µm and 80 µm, respectively.
Figure 46:
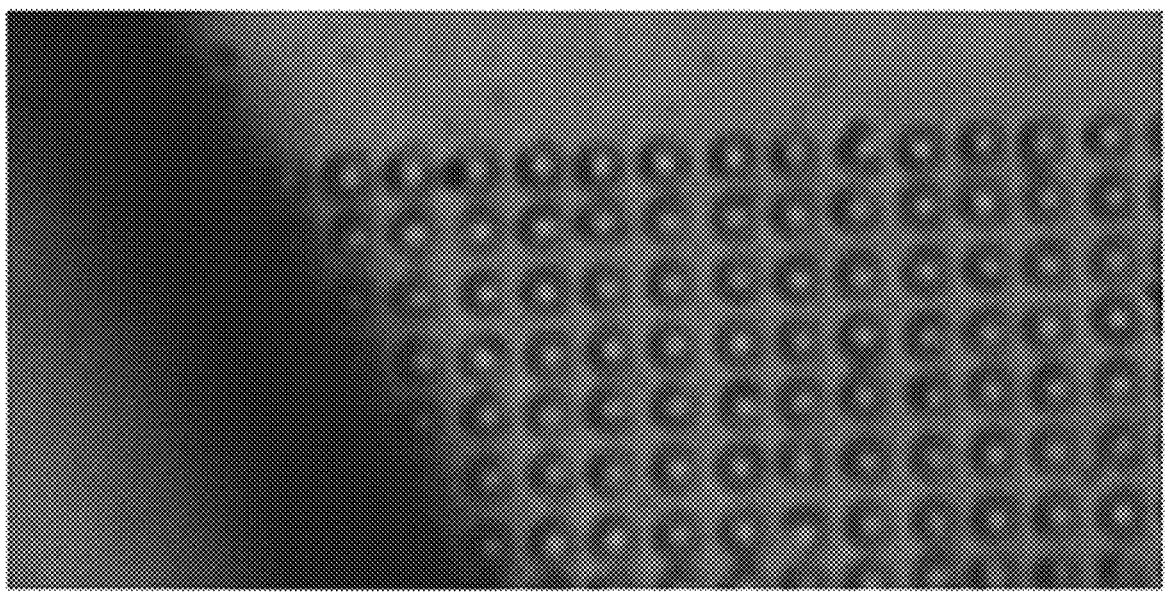
FIG. 46 is a bright-field optical image showing the fluid flow over the Ag ring array within the microfluidic chip shown in FIG. 44.

The applicability of plasmonic sensors can be greatly enhanced by their integration with microfluidic systems (Tokel O et al. Chem. Rev. 2014, 114, 5728; Xie Y et al. ACS Nano. 2014, 8, 12175). The "point-and-shoot" method was also used for in-situ fabrication of Ag rings within a microfluidic channel. Due to the non-invasive remote control of light, the light-based synthesis allows Ag rings to be fabricated without any constraints to the channel design and hence is compatible with various on-chip applications (Chiou P Y et al. Nature. 2005, 436, 370). FIG. 44 shows a photo of the microfluidic chip where the Au nanoislands are confined within the polydimethylsiloxane (PDMS) channel to directly contact the PDMS on the glass substrate for strong adhesion. FIG. 45 shows a schematic of the one-inlet, one-outlet microfluidic setup wherein the silver precursor ink and R6G are introduced sequentially. The microfluidic channel width and height are 500 µm and 80 µm, respectively. The Ag precursor ink was introduced to the microfluidic channel via the inlet. The fabrication of Ag rings was performed at a laser power of 0.75 mW/µm$^2$ to yield Ag rings with 1.84±0.11 µm diameters. Despite the channel constraint, the laser-generated microbubble induces sufficient flows to concentrate the $Ag^+$ ions at the bubble interfaces to form the Ag rings (FIG. 46) (Xie Y L et al. Lab Chip. 2013, 13, 1772).

Figure 47:
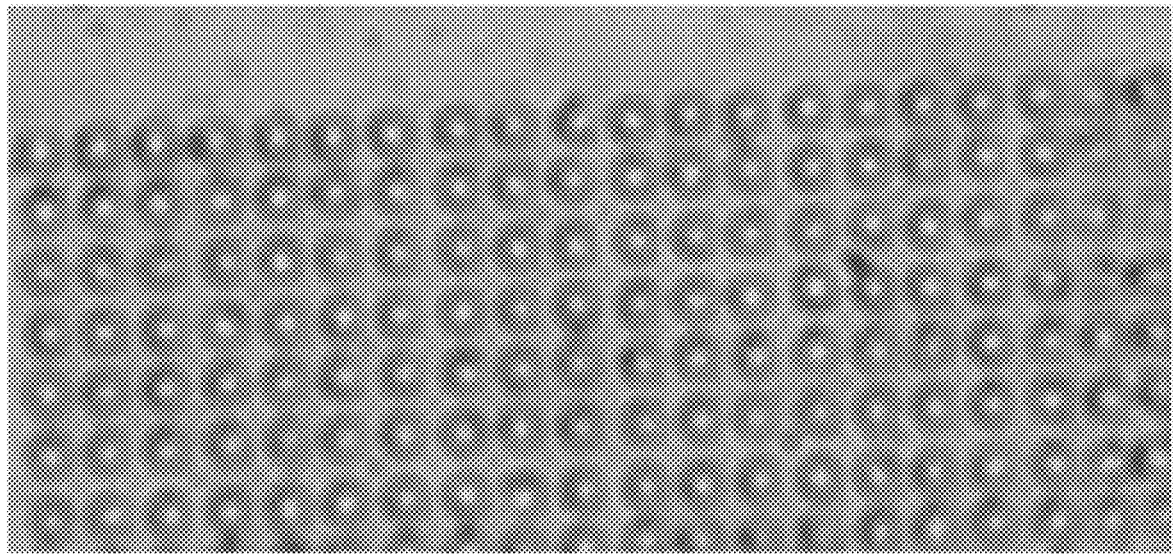
FIG. 47 is a representative optical image of an Ag ring array within the microfluidic device at a flow rates of 0 0.2 µl/min.
Figure 48:
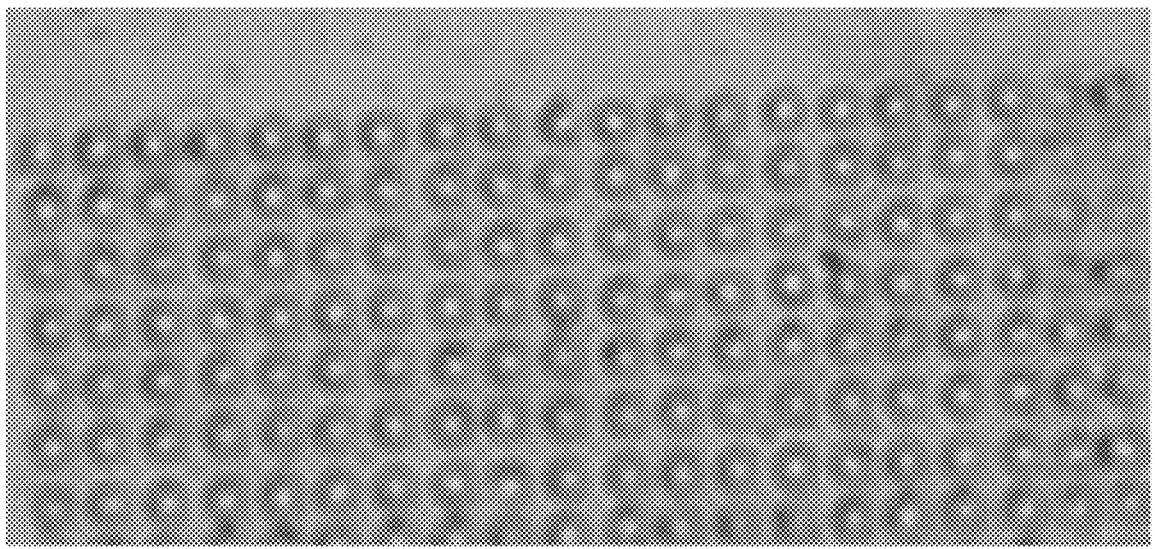
FIG. 48 is a representative optical image of the Ag ring array within the microfluidic device at a flow rate of 0.2 µl/min.
Figure 49:
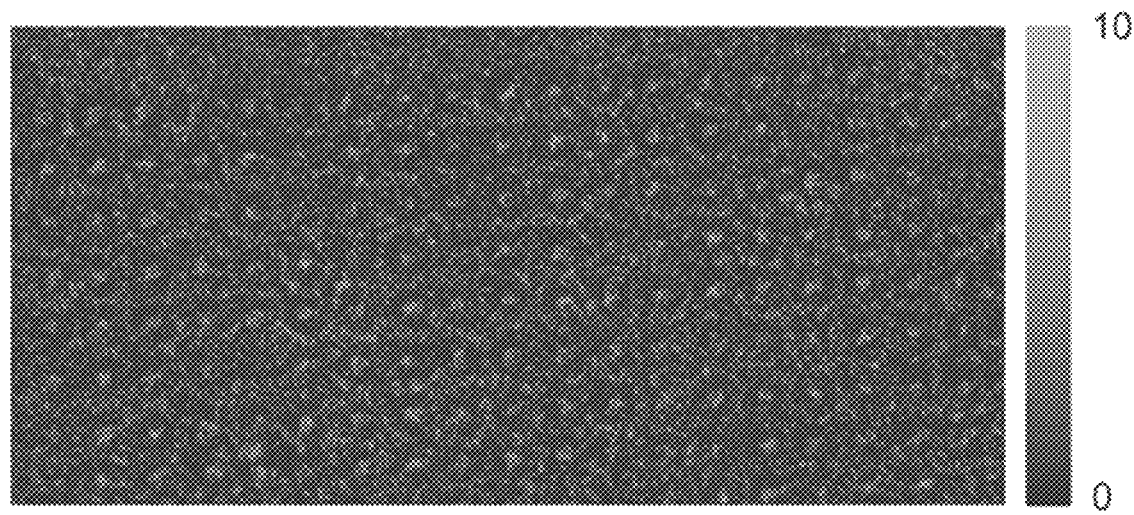
FIG. 49 is the difference in the gray level of the optical images of FIG. 47 and FIG. 48 plotted using Matlab.
Figure 50:
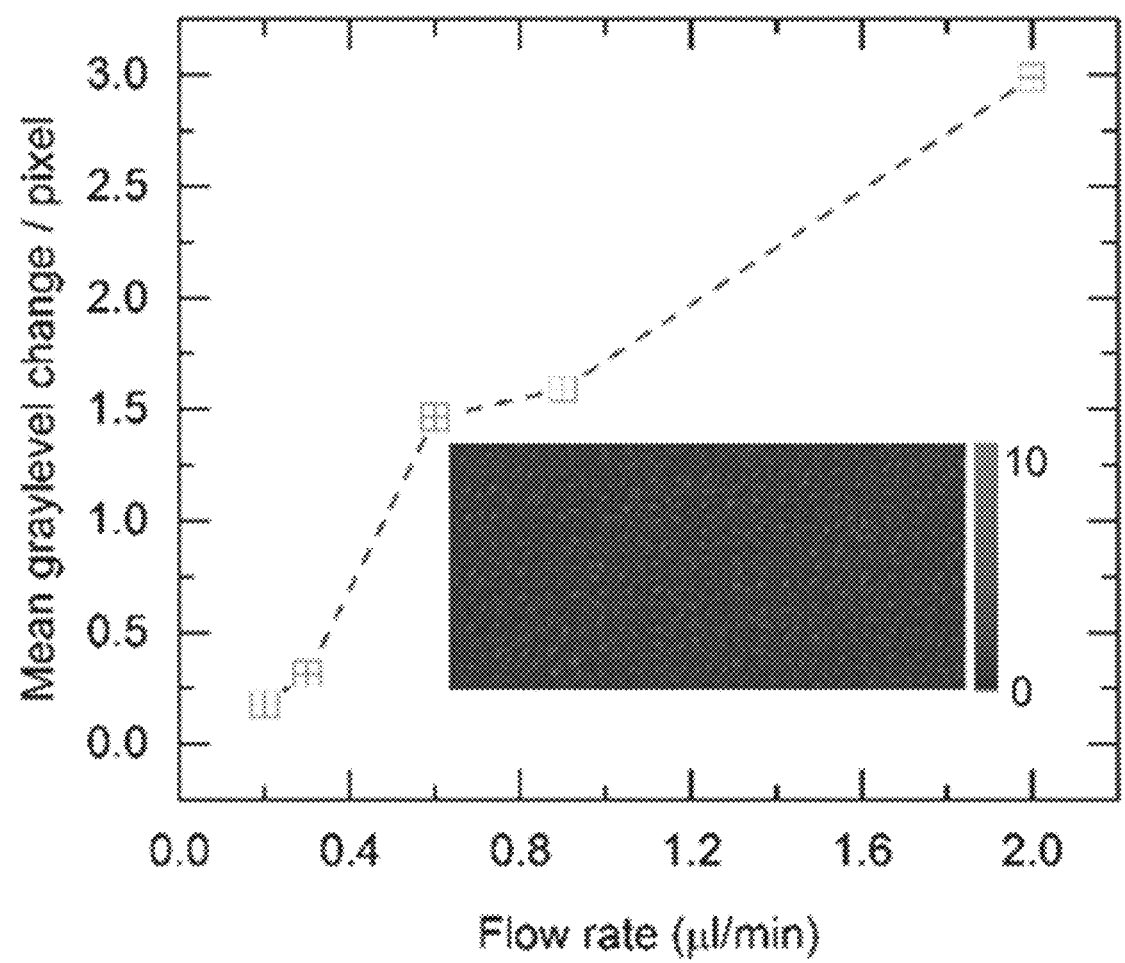
FIG. 50 is a plot of the mean pixel change of the optical images taken at various flow rates to demonstrate the stability of the fabricated Ag rings. Inset shows a typical difference image.

Image processing was used to analyze the stability of in-situ fabricated Ag rings in a microfluidic channel. A series of optical images of the Ag ring arrays at the various flow rates were recorded. For a pair of the images (m×n pixels) taken at the same location before flow ($0^{th}$ image) and after flow with a rate of x µl/min, the images were converted to grayscale. The conversion provides two sets of images corresponding to pre-flow and post-flow, comprised of grayscale pixels. Then, the differences in the gray level were analyzed using a pixel-by-pixel approach. The mean pixel-to-pixel change is obtained by averaging all the values in the difference-image matrix as per the equation:

$$\Delta GL_{avg} = \frac{1}{m+n}\sum_{i=0}^{m}\sum_{j=0}^{n} GL_{x,i,j} - GL_{0,i,j} \tag{14}$$

where m+n is a measure of the total pixel count in the image. $GL_{x,i,j}$ corresponds to the gray level of $(i,j)^{th}$ pixel of the image taken after the x µl/min fluid flow. FIG. 47 and FIG. 48 shows a pair of optical images for the Ag ring arrays before flow (0 µl/min) and after flow of 0.2 µl/min, respectively, with the resultant difference image shown in FIG. 49. The typical mean difference is ≤3 at the various flow rates, demonstrating the high stability of the Ag rings (Inset of FIG. 50 and FIG. 49).

Figure 51:
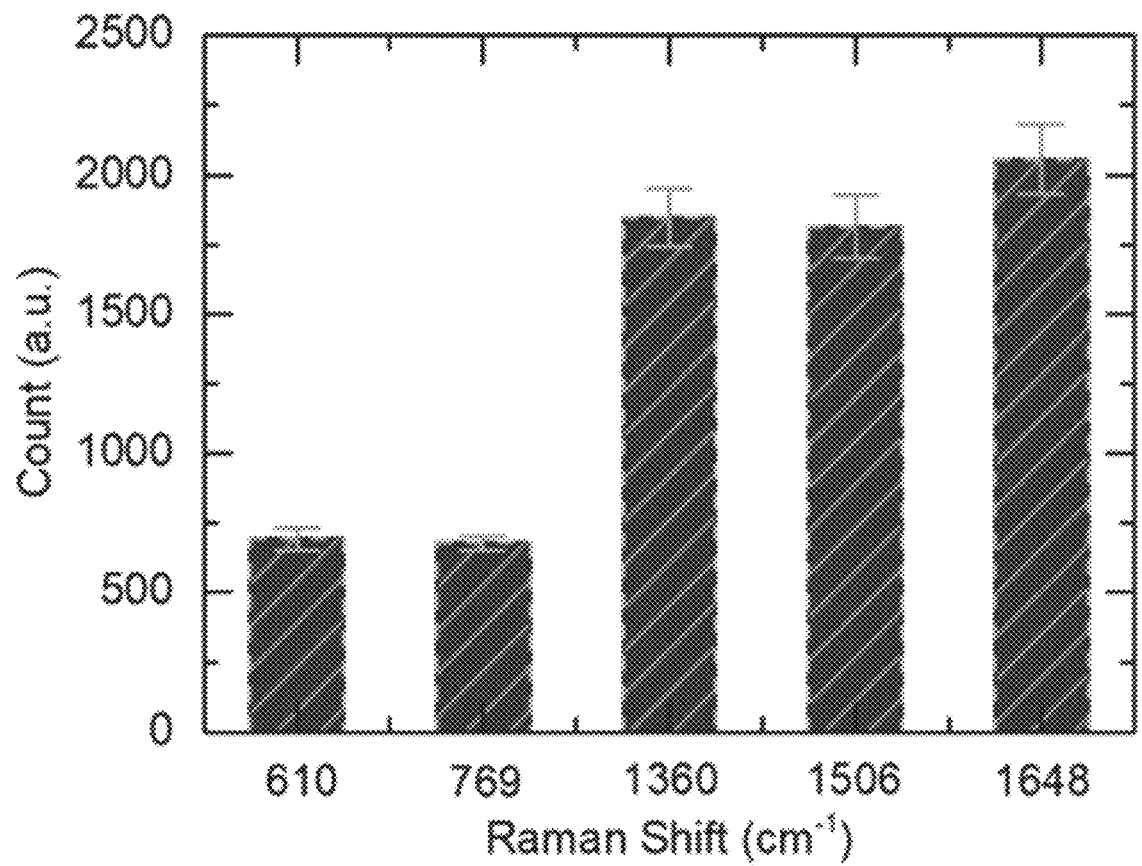
FIG. 51 is the SERS signal counts of the different R6G modes based on many spectra taken at various random locations on the sample with 1.8 µm Ag ring.
Figure 52:
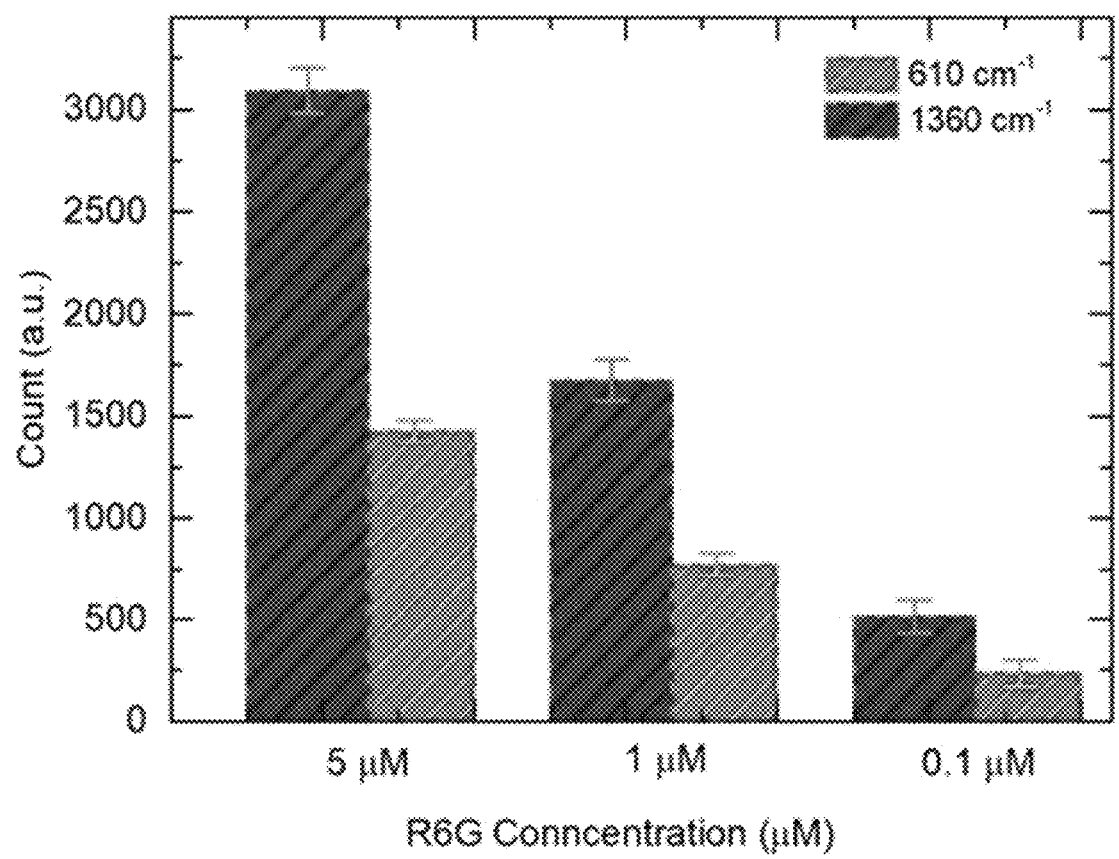
FIG. 52 is the SERS signal counts in the microfluidic chamber as a function of R6G concentration on the sample with 1.8 µm Ag ring.

In-situ SERS of R6G molecules based on the Ag ring-Au nanoisland substrate in the microfluidic channel was also demonstrated. The channel was thoroughly cleaned with DI water prior to the introduction of R6G solution. FIG. 51 shows the SERS signal counts of the different R6G (1 µM) modes based on many spectra taken at various random locations of the substrate within the channel, revealing the spatially uniform and repeatable measurements. Further, the SERS spectra at various concentrations of R6G from 5 µM to 100 nM were obtained (FIG. 52). A similar decreasing trend with reducing concentration was observed. However, the standard deviation of the counts was reduced by ~35% owing to the even distribution of analyte molecule.

In summary, the laser-induced bubble printing enables point-and-shoot" strategies to achieve fabrication of optically active Ag rings and on-demand targeted surface-enhanced optical spectroscopy. The technique is applicable to microfluidic systems with spatial constraints. Stable microbubbles over an Au nanoisland (AuNI) substrate were generated using a continuous-wave laser at low power (~0.5 mW/μm$^2$). Analytical modeling of bubble generation process substantiated the evolution of ring morphology and its power dependence. The tunable Ag rings exhibit surface plasmon resonances in the mid-IR regime from 3.8-4.6 μm, while the Au nanoisland substrate shows a visible region response. The ring fabrication benefits from the low-temperature reducible Ag precursor ink, the Au nanoisland substrate that provides highly localized temperature increase upon the laser irradiation, and the high inertial thrust imparted at the instant when the bubble is formed. The high temperature and convection-mediated Ag$^+$ ion concentration at the three-phase line enables ultra-fast Ag particle synthesis and immobilization at high spatial resolution. The Ag ring over the Au nanoisland imparts intensified surface-enhanced Raman spectroscopy (SERS) activity owing to amplified hot spots at the Ag ring/Au nanoisland interface. With their tunable plasmon resonances in the visible and infrared regimes, the hybrid Ag ring-Au nanoisland substrates have been applied for SERS and SEIRS of R6G, CV and TNT, respectively. Further, this technique was used to perform in-situ fabrication and SERS sensing in microfluidic channels. This in-situ approach towards optically active structures can synergize multiple surface-enhanced optical spectroscopies to facilitate POC applications. With its simplicity, high efficiency, and integrability in fabrication of micro/nanostructures, this "point-and-shoot" approach paves the way towards device miniaturization, portability and multi-functionality.

Example 2

The fabrication of optically active structures using direct-write printing has been challenging and has limited the incorporation of printing technologies. The traditional printing techniques are limited by one or more of the following: resolution, multi-step fabrication process and accessibility within spatially constrained scenarios such as microfluidic devices. Traditional laser-based technique such as two-photon lithography can enable microfluidic access, but are constrained by multi-step fabrication process and expensive lasers.

With the capability to concentrate the light into nanoscale, localized surface plasmons open a huge potential to optical signal amplification and enhance the photothermal conversion efficiency. Herein, a method deemed "reactive bubble printing" (RBP) is described, which utilizes a plasmonic-microbubble based approach to simultaneously reduce and print silver nanoparticles with sub-micron resolution from a precursor ink. A microbubble generated by a continuous-wave laser acts as a micro-reactor to concentrate the precursor ions and thermally reduce Ag from the precursor along the bubble/water interface and yield a ring morphology. Ag rings with tunable radius from 1-2 μm were fabricated. Further, by the rational design via computer programming, various spatial arrangements and ring arrays were achieved which exhibit optical activity in the mid IR and visible wavelengths. With its advantage of combining the fabrication and printing step, near-instantaneous reduction from the precursor and nano/microscale reaction confinement, RBP reduces the number of fabrication steps and complexity. In addition, RBP is compatible with spatially constrained microfluidic devices, which is crucial for point-of-care (POC) diagnostic and therapeutic applications. Further, complex structures, such as inverse-opal configurations, can be achieved using the methods described herein to realize high-surface area catalysis.

Any printing and direct-write technique is an interplay of the resolution, throughput, number of processing steps and its versatility. The RBP technique achieves sub-micron resolution via a single-step immobilization process. The reduction in the number of fabrication and post-processing steps can reduce the manufacturing costs. For instance, the conventional technique such as e-beam writing and two-photon lithography require at least 3-4 steps to fabricate nano/microscale metallic ring architecture. The fabrication process is achieved using a continuous-wave laser, which are much cheaper in comparison to femtosecond lasers which are typically used for direct-write printing via two-photo lithography. Finally, RBP is able to achieve fabrication in spatially constrained microfluidic channels, which is a challenge for most of the e-beam and inkjet based systems. This addresses the versatility concerns and is highly sought-after for POC applications.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method comprising:
   illuminating a first location of an optothermal substrate with electromagnetic radiation;
      wherein the optothermal substrate converts at least a portion of the electromagnetic radiation into thermal energy; and
      wherein the optothermal substrate is in thermal contact with a liquid sample comprising a plurality of thermally reducible metal ions, the liquid sample having a first temperature;
   thereby:
      generating a confinement region at a location in the liquid sample proximate to the first location of the optothermal substrate,
      wherein at least a portion of the confinement region has a second temperature that is greater than the first temperature such that the confinement region is bound by a temperature gradient;

trapping at least a portion of the plurality of thermally reducible metal ions within the confinement region; and thermally reducing the trapped portion of the plurality of thermally reducible metal ions;

thereby:

depositing a metal particle comprising the reduced metal ions on the optothermal substrate at the first location.

2. The method of claim 1, wherein the electromagnetic radiation has a power density of from 0.2 mW/μm² to 1.2 mW/μm².

3. The method of claim 1, wherein the electromagnetic radiation is provided by a light source and the light source is a laser.

4. The method of claim 3, wherein the light source is configured to illuminate a mirror and the mirror is configured to reflect the electromagnetic radiation from the light source to illuminate the first location of the optothermal substrate.

5. The method of claim 1, wherein the optothermal substrate comprises a plasmonic substrate, a metal film, a metal oxide film, or a combination thereof.

6. The method of claim 1, wherein the optothermal substrate comprises a plasmonic substrate, wherein the plasmonic substrate comprises a plurality of plasmonic particles, and wherein the plurality of plasmonic particles comprise a metal selected from the group consisting of Au, Ag, Pd, Cu, Cr, Al, and combinations thereof.

7. The method of claim 6, wherein the electromagnetic radiation comprises a wavelength that overlaps with at least a portion of the plasmon resonance energy of the plasmonic substrate and the confinement region is generated by plasmon-enhanced photothermal effects.

8. The method of claim 1, wherein the optothermal substrate comprises a metal film comprising a metal selected from the group consisting of Al, Ti, Cr, Mn, Fe, Co, Ni, Cu, Mo, Pd, Ag, Cd, Pt, Au, and combinations thereof; or wherein the optothermal substrate comprises a metal oxide film comprising an oxide of a metal selected from the group consisting of Al, Ti, Cr, Mn, Fe, Co, Ni, Cu, Mo, Pd, Ag, Cd, Pt, Au, In, Sn, Zn, and combinations thereof.

9. The method of claim 1, wherein the concentration of the plurality of thermally reducible metal ions in the liquid sample is from 10 wt % to 60 wt %.

10. The method of claim 1, wherein the plurality of thermally reducible metal ions comprise ions of a metal selected from the group consisting of Al, Ti, Cr, Mn, Fe, Co, Ni, Cu, Mo, Pd, Ag, Cd, Pt, Au, Rh, Ir, and combinations thereof such that the deposited metal particle comprises a metal selected from the group consisting of Al, Ti, Cr, Mn, Fe, Co, Ni, Cu, Mo, Pd, Ag, Cd, Pt, Au, Rh, Ir, and combinations thereof.

11. The method of claim 1, wherein the deposited metal particle has a shape that is substantially linear, gammadion, U-shaped, or a combination thereof; wherein the deposited metal particle is formed from one or more linear segments and each of the one or more linear segments has an average line thickness of from 200 nm to 2 μm; wherein the deposited metal particle has an average height of from 100 nm to 250 nm; or a combination thereof.

12. The method of claim 1, wherein illuminating the first location of the optothermal substrate further:

generates a bubble at a location in the liquid sample proximate to the first location of the optothermal substrate, the bubble having a gas-liquid interface with the liquid sample, and the bubble being within the confinement region;

such that:

trapping at least a portion of the plurality thermally reducible metal ions within the confinement region comprises trapping at least a portion of the plurality of thermally reducible metal ions at the gas-liquid interface of the bubble and the liquid sample; and the deposited metal particle comprises a substantially ring shaped particle having an average inner diameter, an average outer diameter, an average wall thickness defined by the difference between the average outer diameter and the average inner diameter, and an average height.

13. The method of claim 12, wherein the substantially ring shaped particle has an average inner diameter of from 250 nm to 3 μm; an average outer diameter of from 700 nm to 4 μm; an average a wall thickness of from 150 nm to 800 nm; an average height of from 100 nm to 250 nm; or a combination thereof.

14. The method of claim 1, further comprising illuminating a second location of the optothermal substrate thereby:

generating a second confinement region at a location in the liquid sample proximate to the second location of the optothermal substrate, wherein at least a portion of the second confinement region has a third temperature that is greater than the first temperature such that the second confinement region is bound by a temperature gradient;

trapping at least a second portion of the plurality of thermally reducible metal ions within the second confinement region; and thermally reducing the trapped second portion of the plurality of thermally reducible metal ions to thereby deposit a second metal particle comprising the reduced metal ions on the optothermal substrate at the second location.

15. The method of claim 14, wherein illuminating the second location of the optothermal substrate further:

generates a second bubble at a location in the liquid sample proximate to the second location of the optothermal substrate, the second bubble having a gas-liquid interface within the sample, and the second bubble being within the second confinement region;

such that:

trapping at least a second portion of the plurality thermally reducible metal ions within the second confinement region comprises trapping at least a second portion of the plurality of thermally reducible metal ions at the gas-liquid interface of the second bubble and the liquid sample; and the second deposited metal particle comprises a second substantially ring shaped particle.

16. The method of claim 14, wherein the optothermal substrate is translocated to illuminate the second location; wherein the electromagnetic radiation is provided by a light source, and the light source is translocated to illuminate the second location; wherein the electromagnetic radiation is provided by a light source, the light source being configured to illuminate a mirror and the mirror is configured to reflect the electromagnetic radiation from the artificial light source to illuminate the optothermal substrate, and the mirror is translocated to illuminate the second location; or a combination thereof.

17. The method of claim 1, further comprising annealing the deposited metal particle.

18. A patterned substrate made using the method of claim 1.

19. A method of use of the patterned substrate of claim 18, wherein the patterned substrate is used for single-particle sensing, functional optical devices, surface-enhanced Raman spectroscopy (SERS), surface-enhanced infrared Raman spectroscopy (SEIRS), catalysis, sensing in a microfluidic device, or a combination thereof.

20. A microfluidic device comprising a channel defining a path for fluid flow from a fluid inlet to a fluid outlet, and the patterned substrate of claim 18 disposed within the channel.

21. A method of detecting an analyte comprising flowing fluid along the channel of the microfluidic device of claim 20, thereby contacting the analyte with the patterned sample, and spectroscopically detecting the analyte in contact with the patterned sample.

22. The method of claim 21, wherein the analyte comprises Rhodamine 6G, Crystal Violet, 2,4,6-trinitrotoluene, or a combination thereof; wherein spectroscopically detecting the analyte comprises surface-enhanced Raman spectroscopy (SERS), surface-enhanced infrared Raman spectroscopy (SEIRS), or a combination thereof; or a combination thereof.

23. A microfluidic device comprising a channel defining a path for fluid flow from a fluid inlet to a fluid outlet and a patterned substrate disposed within the channel, wherein the patterned substrate is made in situ within the channel by the method of claim 1.

24. A method of detecting an analyte comprising flowing fluid along the channel of the microfluidic device of claim 23, thereby contacting the analyte with the patterned sample, and spectroscopically detecting the analyte in contact with the patterned sample.

25. The method of claim 24, wherein the analyte comprises Rhodamine 6G, Crystal Violet, 2,4,6-trinitrotoluene, or a combination thereof; wherein spectroscopically detecting the analyte comprises surface-enhanced Raman spectroscopy (SERS), surface-enhanced infrared Raman spectroscopy (SEIRS), or a combination thereof; or a combination thereof.

26. A method of use of the patterned substrate of claim 18, wherein the patterned substrate has an inverse-opal configuration and the patterned sample is used for catalysis.

27. A system comprising:
an optothermal substrate in thermal contact with a liquid sample comprising a plurality of thermally reducible metal ions, the liquid sample having a first temperature; and
a light source configured to illuminate the optothermal substrate at a first location, wherein the optothermal substrate converts at least a portion of the electromagnetic radiation into thermal energy;
thereby:
generating a confinement region at a location in the liquid sample proximate the first location of the optothermal substrate, wherein at least a portion of the confinement region has a second temperature that is greater than the first temperature such that the confinement region is bound by a temperature gradient;
trapping at least a portion of the plurality of thermally reducible metal ions within the confinement region; and
thermally reducing the trapped portion of the plurality of thermally reducible metal ions;
thereby:
depositing a metal particle comprising the reduced meal ions on the optothermal substrate at the first location.

* * * * *